US008103016B2

(12) United States Patent
Nakayama

(10) Patent No.: US 8,103,016 B2
(45) Date of Patent: Jan. 24, 2012

(54) NETWORK SYSTEM AND AUDIO SIGNAL PROCESSOR

(75) Inventor: Kei Nakayama, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1167 days.

(21) Appl. No.: 11/901,198

(22) Filed: Sep. 13, 2007

(65) Prior Publication Data

US 2008/0232380 A1 Sep. 25, 2008

(30) Foreign Application Priority Data

Sep. 13, 2006 (JP) ................................ 2006-248287

(51) Int. Cl.
*H04B 3/00* (2006.01)

(52) U.S. Cl. .............. 381/77; 381/81; 381/85; 381/110; 381/119

(58) Field of Classification Search .................... 381/77, 381/81, 85, 110, 119
See application file for complete search history.

(56) References Cited

U.S. PATENT DOCUMENTS 4,596,013 A * 6/1986 Tashiro et al. ................ 370/452
6,611,537 B1 * 8/2003 Edens et al. .................. 370/503

FOREIGN PATENT DOCUMENTS

DE 19 751 302 A1 5/1998
JP 2003-348684 A 12/2003

OTHER PUBLICATIONS

European Search Report mailed Feb. 17, 2010, for EP Application No. 07116235.8, five pages.
Cobra Net™ (2006). Located at <http://www.balcom.co.jp/cobranet.htm...>, last visited Mar. 21, 2006, four pages.
Conrad, C. (Nov. 30, 2004). "EtherSound (TM) in a Studio Environment", News and Press Room Latest News, located at <http://www.ethersound.com/news/getnews.php?enews_key=101>, last visited Mar. 21, 2006, four pages.
Super MAC™ Sony Pro Audio Lab, Oxford (2006). Sony Pro Audio Lab, located at <http://www.sonyoxford.co.uk/pub/supermac/>, last visited Mar. 21, 2006, four pages.

* cited by examiner

*Primary Examiner* — Andy Huynh
(74) *Attorney, Agent, or Firm* — Morrison & Foerster LLP

(57) ABSTRACT

An audio network system that performs transport of audio signals among nodes by cascading a plurality of nodes each including two sets of transmission I/Fs and reception I/Fs, and circulating among the nodes in each fixed period an audio transport frame generated by a master node, is configured such that the master node generates the audio transport frame in an S-th period based on the audio transport frame in an (S−k)-th period, and each of the other nodes delays the audio signals written by another node after the audio transport frame is generated by the master node until the audio transport frame is transmitted to the self node, by k period(s) with respect to the other audio signals, for use in signal processing.

4 Claims, 20 Drawing Sheets

F I G. 1 A
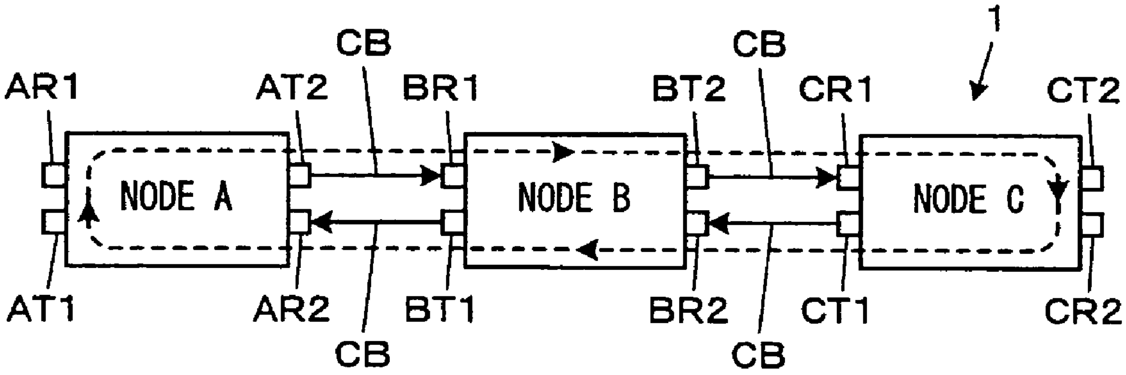
F I G. 1 B
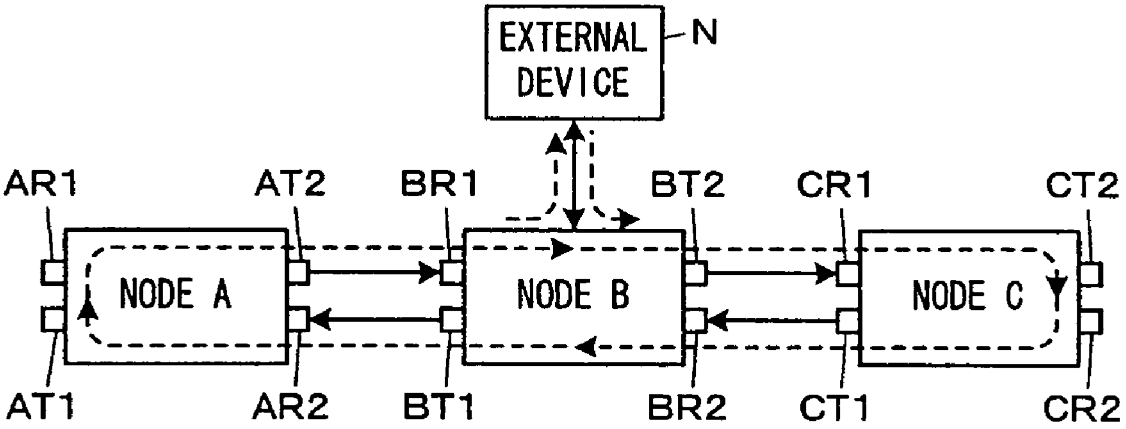

F I G. 2
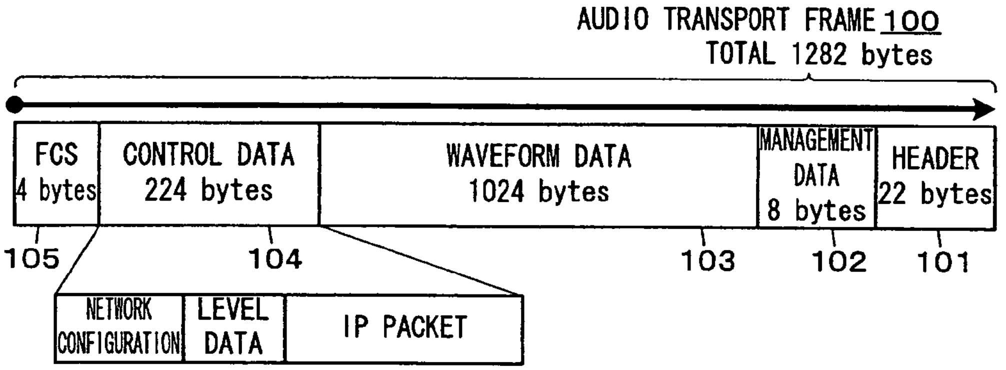
F I G. 3
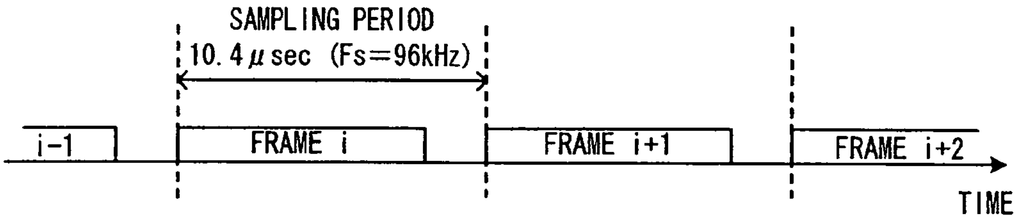
F I G. 4
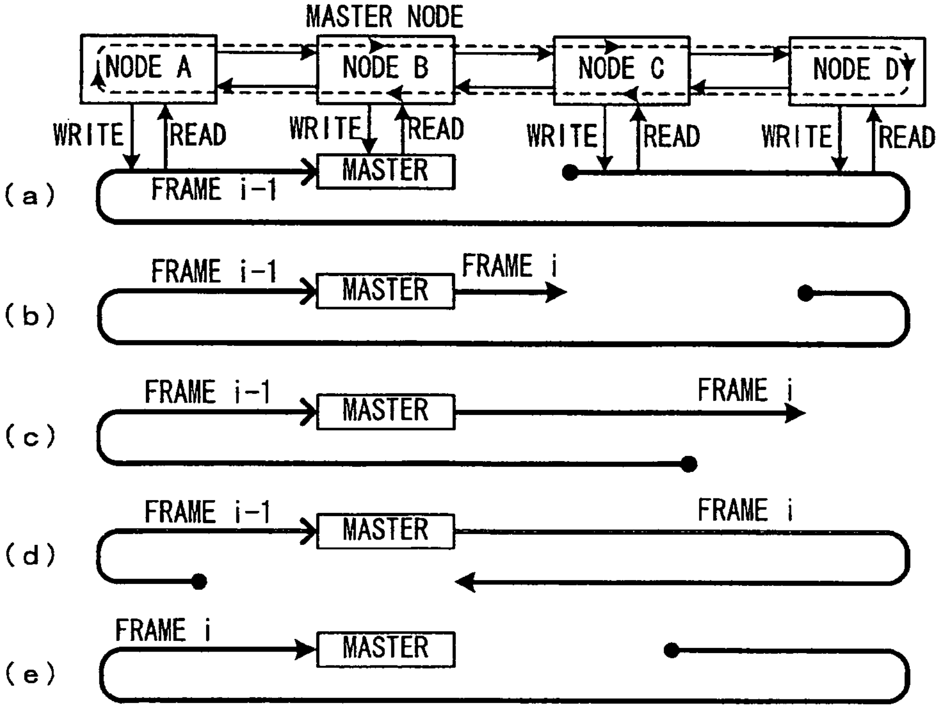

F I G . 5
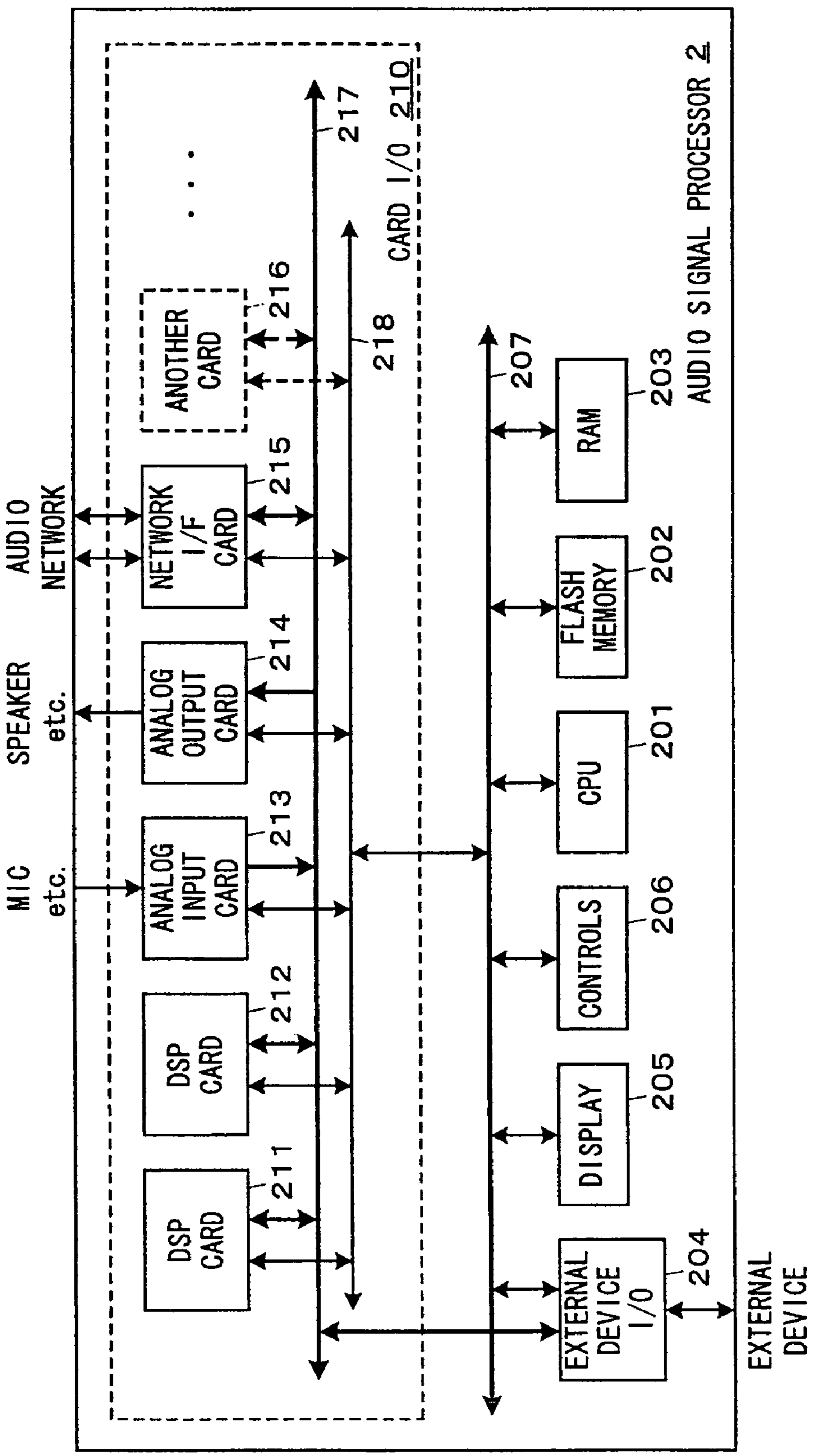

PRESENCE CONFIRMATION FRAME

| PRESENCE CONFIRMATION (RESPONSE) | ID OF PROCESSOR | ALREADY BELONGING TO SYSTEM OR NOT | (CONFIRMED CONNECTION STATE) |
|---|---|---|---|

TOPOLOGY TABLE

| DEVICE ID | A | B | C | D | E | F |
|---|---|---|---|---|---|---|
| MASTER PRIORITY | 0 | 10 | 1 | 1 | 0 | 3 |
| DELAY TIME | — | — | — | — | — | — |
| SYSTEM INCORPORATION | NOT | NOT | NOT | NOT | NOT | NOT |

F I G. 1 6
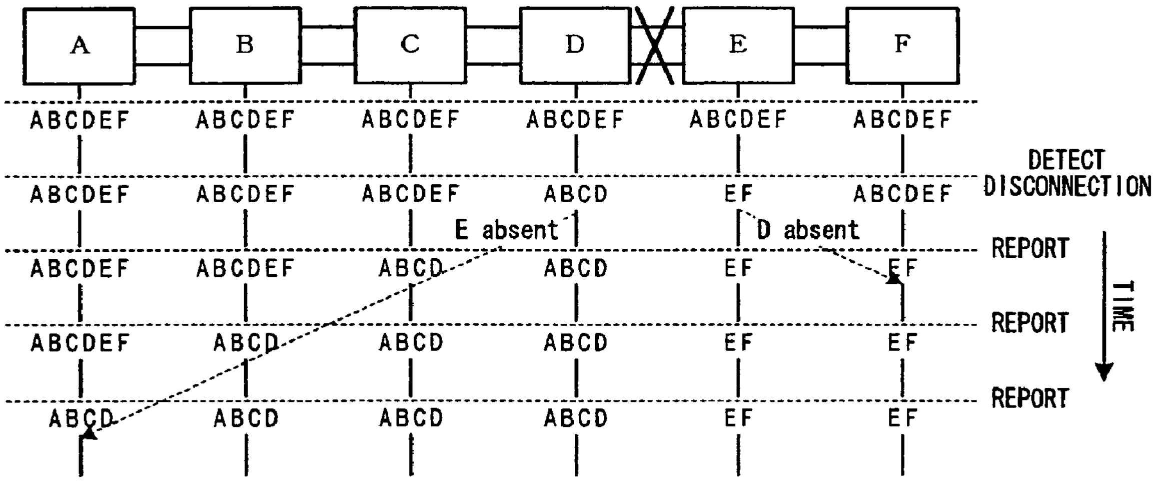
F I G. 1 7
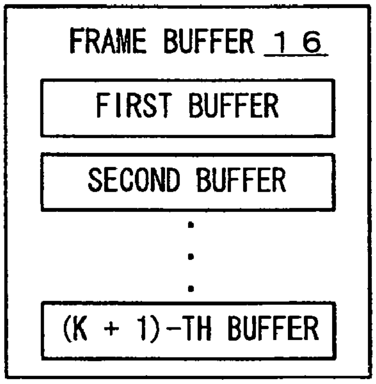

F I G. 1 8
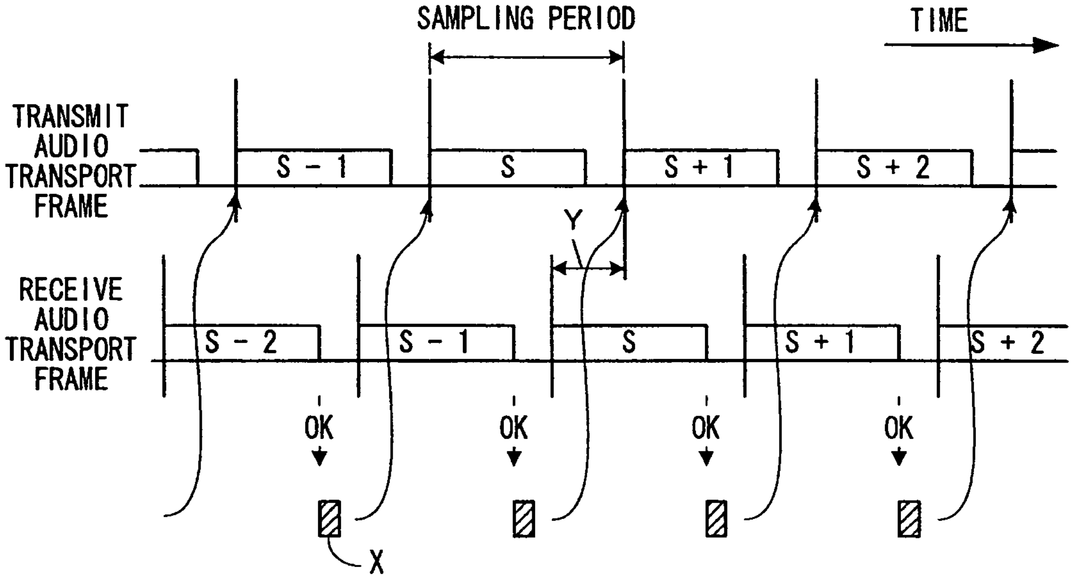
F I G. 1 9
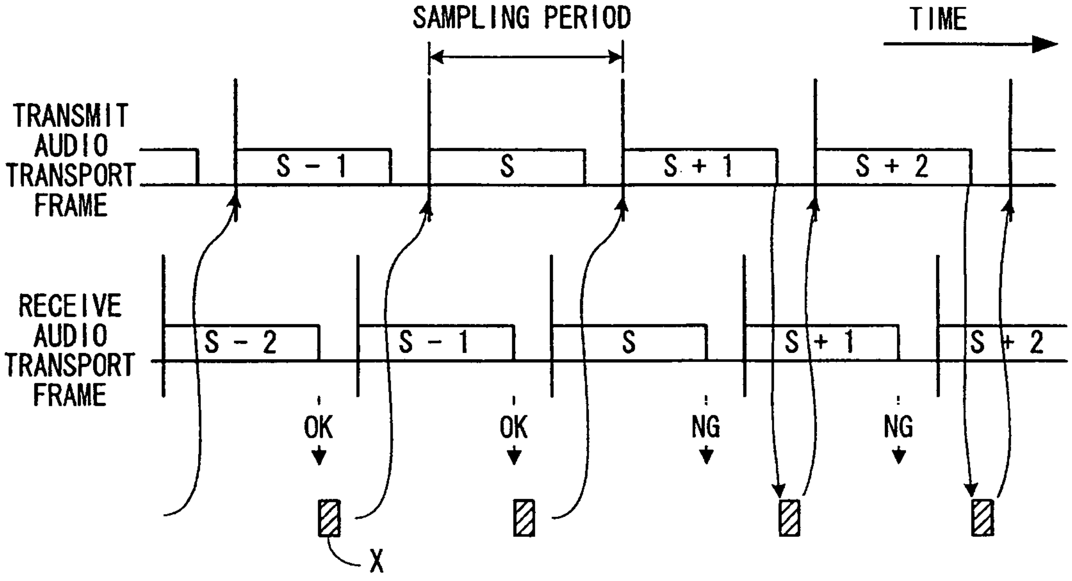

FIG. 20

| | AUDIO TRANSPORT FRAME | DATA OF PORTION WRITTEN BY SLAVE NODE | DATA OF PORTION WRITTEN BY MASTER NODE |
|---|---|---|---|
| | S − 1 TRANSMISSION | DATA IN (S − 3)-TH PERIOD | DATA IN (S − 1)-TH PERIOD |
| | S − 1 RECEPTION | DATA IN (S − 1)-TH PERIOD | DATA IN (S − 1)-TH PERIOD |
| | S TRANSMISSION | DATA IN (S − 2)-TH PERIOD | DATA IN S-TH PERIOD |
| GENERATE | S RECEPTION | DATA IN S-TH PERIOD | DATA IN S-TH PERIOD |
| | S + 1 TRANSMISSION | DATA IN (S − 1)-TH PERIOD | DATA IN (S + 1)-TH PERIOD |
| GENERATE | S + 1 RECEPTION | DATA IN (S + 1)-TH PERIOD | DATA IN (S + 1)-TH PERIOD |
| | S + 2 TRANSMISSION | DATA IN S-TH PERIOD | DATA IN (S + 2)-TH PERIOD |
| GENERATE | S + 2 RECEPTION | DATA IN (S + 2)-TH PERIOD | DATA IN (S + 2)-TH PERIOD |
| | S + 3 TRANSMISSION | DATA IN (S + 1)-TH PERIOD | DATA IN (S + 3)-TH PERIOD |
| | S + 3 RECEPTION | DATA IN (S + 3)-TH PERIOD | DATA IN (S + 3)-TH PERIOD |

FIG. 21

| | AUDIO TRANSPORT FRAME | DATA OF PORTION WRITTEN BY SLAVE NODE | DATA OF PORTION WRITTEN BY MASTER NODE | |
|---|---|---|---|---|
| | S − 1 TRANSMISSION | DATA IN (S − 3)-TH PERIOD | DATA IN (S − 1)-TH PERIOD | |
| | S − 1 RECEPTION | DATA IN (S − 1)-TH PERIOD | DATA IN (S − 1)-TH PERIOD | |
| | S TRANSMISSION | DATA IN (S − 2)-TH PERIOD | DATA IN S-TH PERIOD | |
| GENERATE | S RECEPTION | DATA IN S-TH PERIOD | DATA IN S-TH PERIOD | ←ABNORMAL |
| | S + 1 TRANSMISSION | DATA IN (S − 1)-TH PERIOD | DATA IN (S + 1)-TH PERIOD | |
| GENERATE | S + 1 RECEPTION | DATA IN (S + 1)-TH PERIOD | DATA IN (S + 1)-TH PERIOD | ←ABNORMAL |
| | S + 2 TRANSMISSION | DATA IN (S − 1)-TH PERIOD | DATA IN (S + 2)-TH PERIOD | |
| GENERATE | S + 2 RECEPTION | DATA IN (S + 2)-TH PERIOD | DATA IN (S + 2)-TH PERIOD | |
| | S + 3 TRANSMISSION | DATA IN (S − 1)-TH PERIOD | DATA IN (S + 3)-TH PERIOD | |
| | S + 3 RECEPTION | DATA IN (S + 3)-TH PERIOD | DATA IN (S + 3)-TH PERIOD | |

FIG. 23

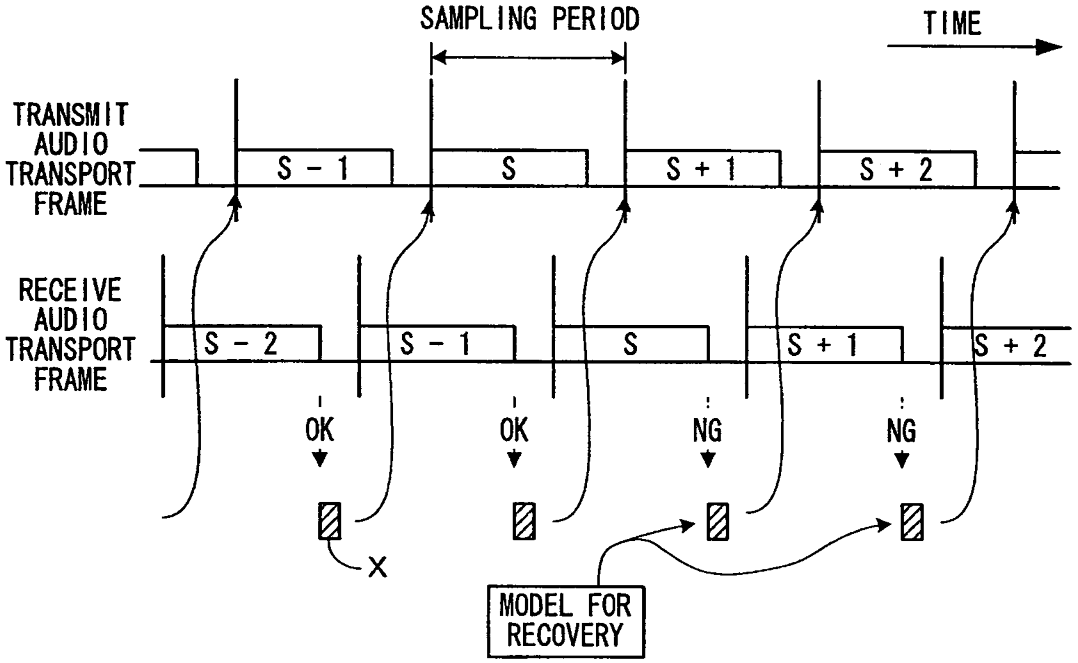

FIG. 24

| | AUDIO TRANSPORT FRAME | DATA OF PORTION WRITTEN BY SLAVE NODE | DATA OF PORTION WRITTEN BY MASTER NODE | |
|---|---|---|---|---|
| | S − 1 TRANSMISSION | DATA IN (S − 3)-TH PERIOD | DATA IN (S − 1)-TH PERIOD | |
| | S − 1 RECEPTION | DATA IN (S − 1)-TH PERIOD | DATA IN (S − 1)-TH PERIOD | |
| GENERATE { | S TRANSMISSION | DATA IN (S − 2)-TH PERIOD | DATA IN S-TH PERIOD | |
| | S RECEPTION | DATA IN S-TH PERIOD | DATA IN S-TH PERIOD | ←ABNORMAL |
| | S + 1 TRANSMISSION | DATA IN (S − 1)-TH PERIOD | DATA IN (S + 1)-TH PERIOD | |
| | S + 1 RECEPTION | DATA IN (S + 1)-TH PERIOD | DATA IN (S + 1)-TH PERIOD | ←ABNORMAL |
| GENERATE FROM MODEL → | S + 2 TRANSMISSION | DATA FROM MODEL (ALL "F") | DATA IN (S + 2)-TH PERIOD | |
| | S + 2 RECEPTION | DATA IN (S + 2)-TH PERIOD | DATA IN (S + 2)-TH PERIOD | |
| GENERATE FROM MODEL → | S + 3 TRANSMISSION | DATA FROM MODEL (ALL "F") | DATA IN (S + 3)-TH PERIOD | |
| | S + 3 RECEPTION | DATA IN (S + 3)-TH PERIOD | DATA IN (S + 3)-TH PERIOD | |

F I G. 26
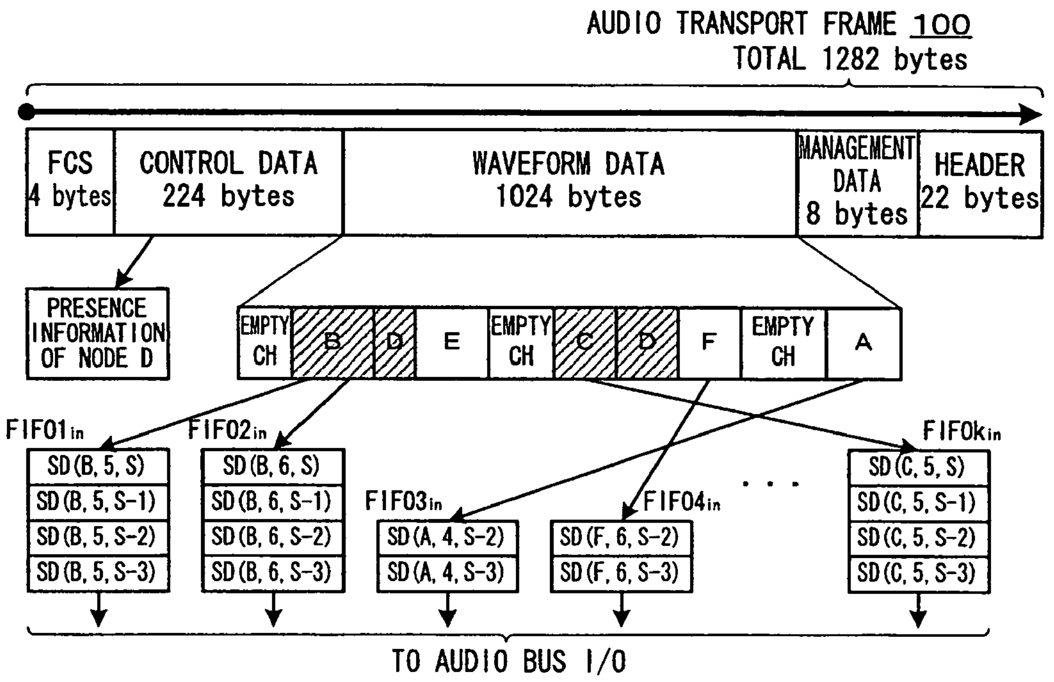
F I G. 27
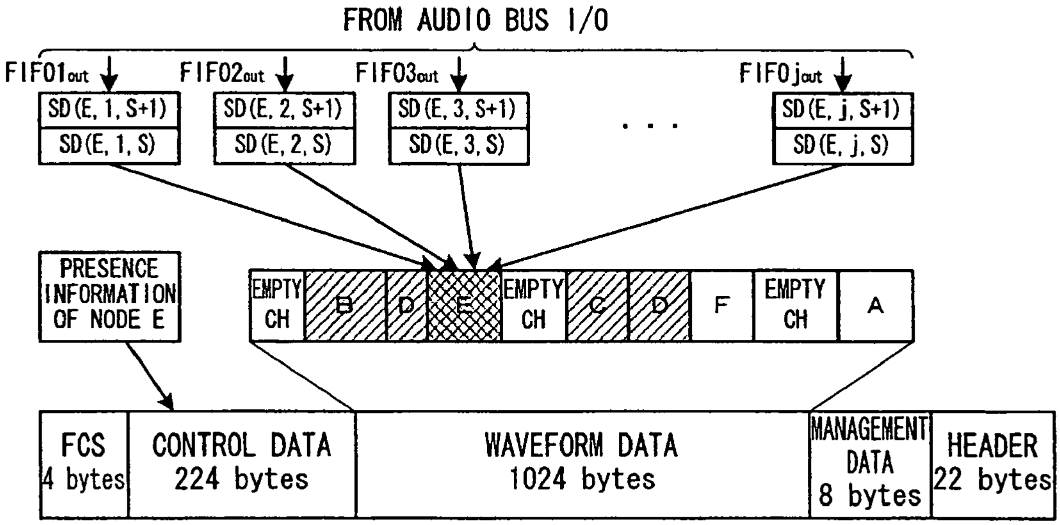

F I G. 28
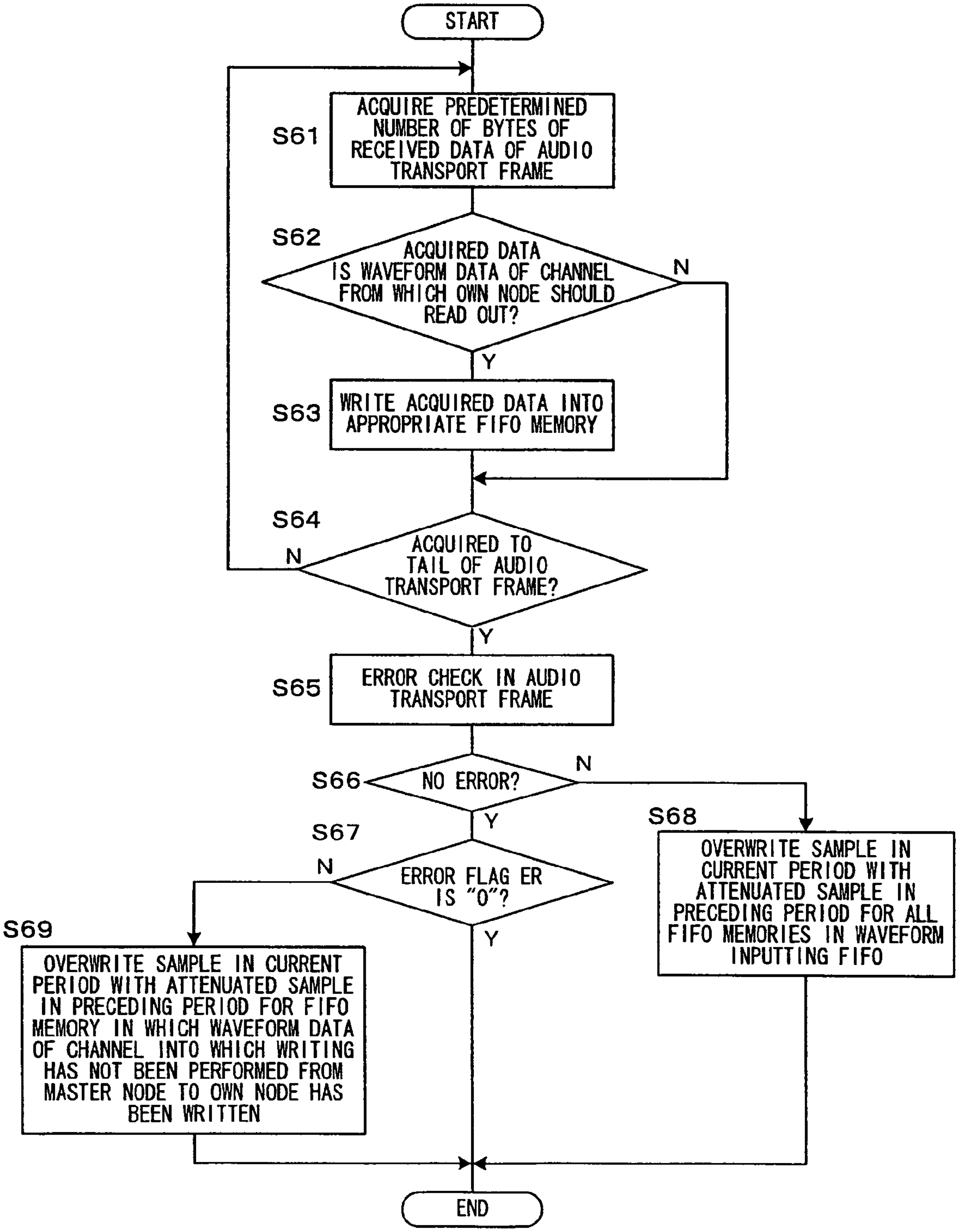

NETWORK SYSTEM AND AUDIO SIGNAL PROCESSOR

BACKGROUND OF THE INVENTION

1. Field of the Invention

The present invention relates to a network system for transporting audio signals between a plurality of nodes, and an audio signal processor constituting such a network system.

2. Description of the Related Art

Conventionally, an audio network system has been known for transporting audio signals between a plurality of nodes, and is used in concerts, dramas, music production, private broadcasting, and so on. Known examples of such an audio network system include CobraNet (trademark), SuperMAC (trademark), and EtherSound (trademark) as described in the following references 1 to 3.

Reference 1: "CobraNet™", [online], Balcom Co. [Retrieved on Mar. 21, 2006] Internet <URL: http://www.balcom-.co.jp/cobranet.htm>

Reference 2: "SuperMAC™-Sony Pro Audio Lab, Oxford", [online], Sony Pro Audio Lab, [Retrieved on Mar. 21, 2006] Internet <URL: http://www.sonyoxford.co.uk/pub/supermac/>

Reference 3: Carl Conrad, "EtherSound™ in a studio environment", [online], Digigram S. A., [Retrieved on Mar. 21, 2006] Internet <URL: http://www.ethersound.com/news/getnews.php?enews_key=101>

In addition, it is generally desired to be able to connect audio equipment having various functions such as analog input, analog output, digital input, digital output, mixing, effect addition, recording/reproducing, remote control, or combination thereof to the audio network system.

SUMMARY OF THE INVENTION

However, such a conventional audio network system has the following problems.

Specifically, the number of lines for use in transport of audio signals is limited to the upper limit of the network band, while the number of lines capable of physically transporting changes depending on the configuration of the network, so that it is not always able to obtain the theoretically calculated upper limit band width. For example, since the time required for data to arrive varies depending on the number of nodes from the node at the transmission source to the node at the tail and the next transmission is performed only after the data arrives all of the nodes, the more the number of nodes constituting the network exist, the more time is required for transfer of the data in the network, resulting in band losses.

Therefore, the topology for connection of equipment in the network system should be designed in consideration of how many channels the waveform data is transmitted/received from which node to which node in advance, thus causing a problem of difficulties in designing it.

On the other hand, there is another known data transfer method that forms a ring transmission route in the network, circulates a frame through the transmission route, and writes necessary data in the frame to perform data transfer, as found not in the real time audio network system but in the RPR (Resilient Packet Ring) method. The transport method using such a ring transmission route shall be called a "ring transport method."

However, in the case where such a ring transport method is employed, each of the nodes existing on the transmission route will write data into the frame and read data from the frame at a timing of the frame flashing through the self node.

Accordingly, the data read from the same audio transport frame by a node in the system may be in different sampling period depending on relative position of the node to the other node which has written the data in the transmission route. This causes a problem that when a certain node reads out a plurality of data written by a plurality of nodes from the frame to process them, the sampling periods which the plurality of data are in may be different and it is difficult for the node to synchronize the data each other.

The invention solves the above-described problems, and it is an object to make it possible that in the case where audio signals are transported among a plurality of processors, the transported waveform data are easily synchronized each other in the sampling period domain, while easily ensuring a transport bandwidth for waveform data corresponding to a fixed number of channels in the network.

To attain the above objects, a network system of the present invention is a network system configured such that a plurality of nodes each including receivers and transmitters are connected in series by communication cables to form a loop transmission route along which an audio transport frame periodically circulates in a single direction, the audio transport frame generated by a master node in the plurality of nodes, the audio transport frame including a plurality of storage regions for audio signals, wherein each of the nodes other than the master node of the network system includes: a wordclock generator that generates a wordclock based on a reception timing of the audio transport frame received by the receiver, a signal processor that processes audio signals in synchronization with the wordclock generated by the wordclock generator; a reader that reads out, when the receiver receives an audio transport frame, audio signals from a predetermined storage region of the audio transport frame, and supplies the audio signals to the signal processor, and/or a writer that writes audio signals in an S-th period supplied from the signal processor into a predetermined storage region of the audio transport frame in the S-th period received by the receiver; and a transmission controller that supplies the audio transport frame in the S-th period from/to which reading-out by the reader and/or writing by the writer have been performed, to the transmitter after a lapse of a predetermined time from the reception of the audio transport frame by the receiver, and controls the transmitter to transmit the audio transport frame, wherein the master node includes: a buffer that stores the audio transport frame received by the receiver; a wordclock generator that generates a wordclock at constant period; a signal processor that processes audio signals in synchronization with the wordclock generated by the wordclock generator; an audio transport frame generator that generates the audio transport frame in the S-th period based on the audio transport frame in an (S−k)-th period earlier than the S-th period by k period(s) (where k is an integer of 1 or more) stored in the buffer at the constant period; a transmission controller that supplies the audio transport frame generated by the audio transport frame generator to the transmitter, and controls the transmitter to transmit the audio transport frame in synchronization with the wordclock; and a reader that reads out, when the receiver receives an audio transport frame in the (S−k)-th period, audio signals from a predetermined storage region of the audio transport frame or an audio transport frame in the S-th period generated by the audio transport frame generator based on the received audio transport frame, and supplies the audio signals to the signal processor, and/or a writer that writes audio signals in the S-th period supplied from the signal processor into a predetermined storage region of the audio transport frame in the (S−k)-th period or the audio transport frame in the S-th period; and wherein the reader of the each node delays, if the audio signals read out from the storage region of the audio transport frame in the S-th period received by the receiver are written by another node in the transmission route from the master node to the node, the audio signals by k period(s) and does not delay, if the audio signals read out are not written by another node in the transmission route, the audio signal before supplying the audio signal to the signal processor.

In such a network system, it is preferable that the k is a fixed value.

Further, it is preferable that any of the nodes is provided with a setting device that sets the value of k common to the each node, and wherein he transmission delay of audio signals, from a timing one node writes the audio signals in the audio transport frame to a timing another node reads out the audio signals from the audio transport frame and supplies the audio signals to the processor in the node, becomes longer as the device sets the value of k larger.

Further, it is preferable that one of the plurality of node is an audio signal processor, said audio signal processor including: receivers and transmitters, wherein the audio processor includes, as devices operating when at lest the audio signal processor functions as a processor other than the master node in the network system: a signal processor that processes audio signals; a reader that reads out, when the receiver receives an audio transport frame, audio signals from a predetermined storage region of the audio transport frame, and supplies the audio signals to the signal processor; and a transmission controller that supplies the audio transport frame in the S-th period from which reading-out by the reader has been performed, to the transmitter after a lapse of a predetermined time from the reception of the audio transport frame by the receiver, and causes the transmitter to transmit the audio transport frame, and wherein the reader of the each node delays, if the audio signals read out from the storage region of the audio transport frame in the S-th period received by the receiver are written by another node in the transmission route from the master node to the node, the audio signals by k period(s) and does not delay, if the audio signals read out are not written by another node in the transmission route, the audio signal before supplying the audio signal to the signal processor.

The above and other objects, features and advantages of the invention will be apparent from the following detailed description which is to be read in conjunction with the accompanying drawings.

BRIEF DESCRIPTION OF THE DRAWINGS

FIG. 1A and FIG. 1B are diagrams showing the outline of an audio network system that is an embodiment of a network system of the invention;

FIG. 2 is an illustration showing a configuration example of the audio transport frame transported through a transmission route shown in FIG. 1A and FIG. 1B;

FIG. 3 is a chart showing a transport timing of the audio transport frame shown in FIG. 2;

FIG. 4 is an illustration showing the transporting state of the audio transport frame shown in FIG. 2 on the audio network system;

FIG. 5 is a diagram showing the hardware configuration of an audio signal processor that is each of the nodes constituting the audio network system shown in FIG. 1A and FIG. 1B;

FIG. 16 is a chart, corresponding to FIG. 11, showing the procedure of changing the topology table in the case of the example shown in FIG. 14;

FIG. 17 is a diagram showing the configuration of a frame buffer in a master node;

FIG. 18 is a chart showing a timing example of transmitting/receiving and generating the audio transport frame in the same master node;

FIG. 19 is a similar chart showing an example when the S-th audio transport frame and frames subsequent thereto could not be normally received;

FIG. 20 is a chart showing data written in each audio transport frame to be transmitted/received by the master node for the case where the periodic update value k is 2 shown in FIG. 18;

FIG. 21 is a chart showing data written in each audio transport frame to be transmitted/received by the master node for the case where the periodic update value k is 2 shown in FIG. 19;

FIG. 23 is a chart showing another timing example of transmitting/receiving and generating the audio transport frame in case similar to that in FIG. 19;

FIG. 24 is a chart showing data written in each audio transport frame for the case shown in FIG. 23;

FIG. 26 is an illustration showing the condition of reading waveform data from the audio transport frame in a slave node;

FIG. 27 is an illustration similarly showing the condition of writing waveform data into the audio transport frame;

FIG. 28 is a flowchart of the processing to prevent data at the occurrence of an error and data of a model from being supplied for signal processing, executed by a data extracting unit 11, a waveform inputting FIFO 12, and a control circuit 41;

DETAILED DESCRIPTION OF THE PREFERRED EMBODIMENTS

Figure 6:
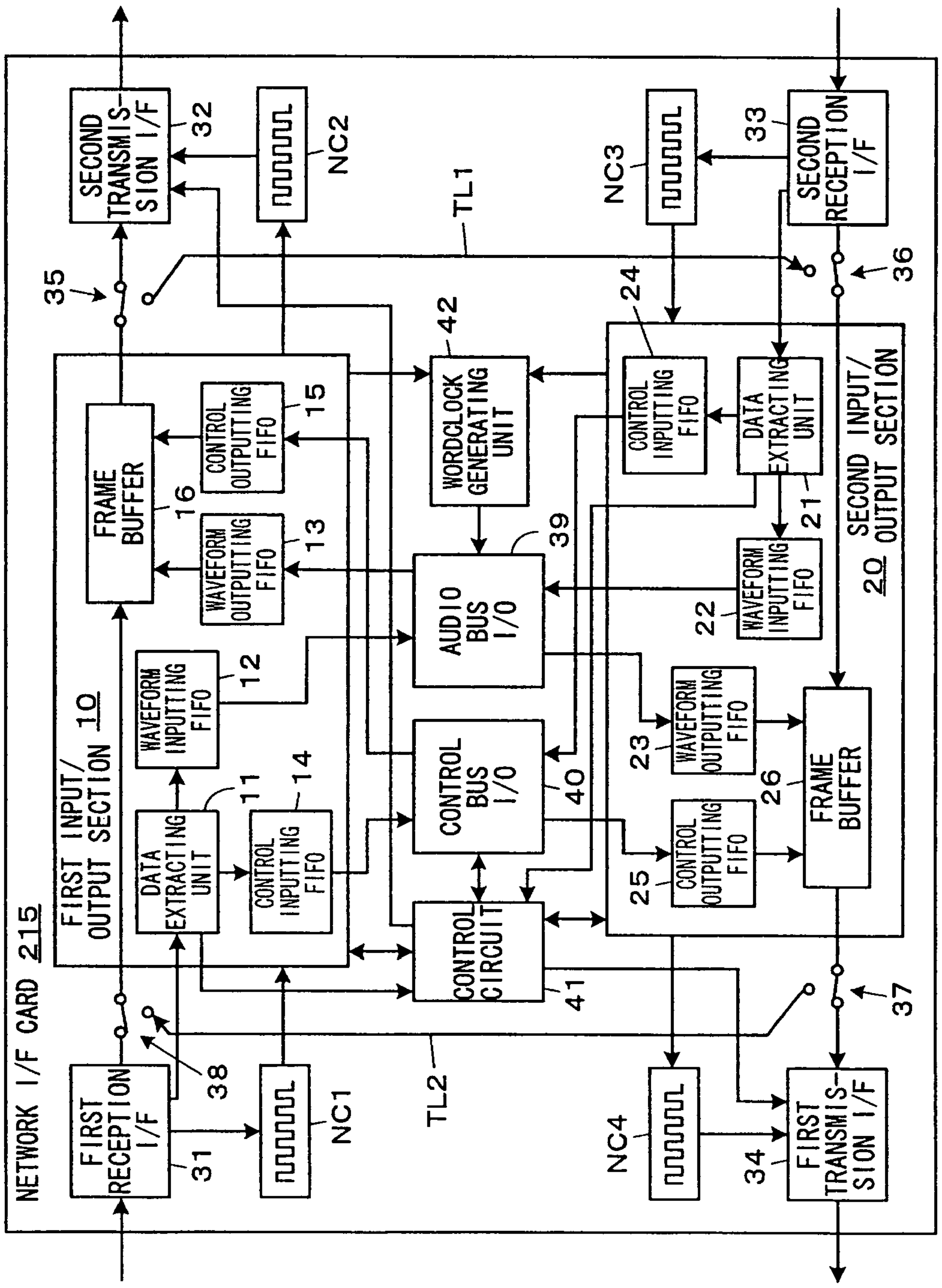
FIG. 6 is a diagram showing the configuration of a network I/F card shown in FIG. 5 in more detail.

Hereinafter, preferred embodiments to embody the invention will be concretely described based on the drawings.

1. Outline of Audio Network System of Embodiment of the Invention

1.1 Entire Configuration

FIG. 1A and FIG. 1B show the outline of an audio network system that is an embodiment of a network system of the invention.

As shown in FIG. 1A, the audio network system 1 is constructed by connecting nodes A to C by communication cables CB in sequence, each of the nodes A to C includes two sets of reception interfaces (I/Fs) being receivers and transmission I/Fs being transmitters each of which performs communication in a singe direction. Although an example composed of three nodes is shown, any number of nodes may be employed.

In the node A, a reception I/F AR1 and a transmission I/F AT1 are one set of I/Fs, and a reception I/F AR2 and a transmission I/F AT2 are another set of I/Fs. For the nodes B and C, the same relation also applies to I/Fs with a first character of symbol "B" or "C" in place of "A."

The connection between the nodes is established by connecting one set of reception I/F and transmission I/F to one set of transmission I/F and reception I/F of another node via the communication cables CB, respectively. For example, between the node A and the node B, the reception I/F AR2 is connected with the transmission I/F BT1, and the transmission I/F AT2 is connected with the reception I/F BR1. Further, between the node B and the node C, another set of I/Fs in the node B are connected with one set of I/Fs in the node C.

Note that the nodes shown in FIG. 1A and FIG. 1B are audio signal processors having various kinds of functions such as analog input, analog output, digital input, digital output, mixing, effect addition, recording/reproduction, remote control, or combinations thereof. It is of course adoptable that each node has different function.

The state in which the nodes are connected as one line having ends as shown in FIG. 1A shall be called cascade. In this case, the cable CBs connecting between the nodes can be used to form one circulating data transmission route as shown by a broken line, so that each node can perform transmission/reception of data to/from any node on the line by transmitting a frame over the line in a manner to circulate it in a constant period and reading/writing necessary information from/into the frame.

In the audio network system 1, one node becomes a master node, which generates a frame for transporting audio signals, periodically circulates the frame over the transmission route, and manages the network. The frame generated by the master node shall be called an "audio transport frame" distinguished from other frames.

Note that although two cables are shown in FIG. 1A and FIG. 1B, one cable which is made by bundling the two cables together can also be used to establish connection between one set of I/Fs, as long as the reception I/F and transmission I/F in one set are adjacently or integrally provided.

Further, provision of a necessary I/F for each node allows an external device N to be connected thereto as shown in FIG. 1B to write data received from the external device N into the audio transport frame and transmit the frame to another node, and to transmit the data read out from the audio transport frame to the external device N.

As such external device N, for example, an external console is conceivable. It is also conceivable that the console transmits a command in accordance with an operation accepted from a user to the node B, thereby causing operations such that the node B writes the command into the audio transport frame and transmits it to another node, or the node B reads out a response, level data or the like written into the audio transport frame and transmitted by another node, and transmits it to the console, so as to use it for display of the control state or level display in the console.

1.2 Configuration of Audio Transport Frame

Next, a configuration example of the audio transport frame in the Ethernet (registered trademark) format transported over the above-described transmission route is shown in FIG. 2.

As shown in FIG. 2, the audio transport frame 100 has a size of 1282 bytes, and is composed of regions such as a header 101, management data 102, waveform data (audio data) 103, control data 104, FCS (Frame Check Sequence) 105 in sequence from the head. The size of each region is fixed irrespective of the data amount to be described in the region. Further, the sizes of the regions other than the header 101 and the FCS 105 shown here are examples and may be changed as required.

The header 101 is data of 22 bytes in total, describing preamble defined by IEEE (Institute of Electrical and Electronic Engineers) 802.3, SFD (Start Frame Delimiter), destination address, transmission source address, and length.

Note that it is not so worthwhile to describe the address in the audio network system 1 because the frame transmitted from a transmission I/F arrives only to the reception I/F which is connected by one connecting cable CB. Hence, for example, an address indicating a broadcast is described as the destination address, and MAC (Media Access Control) address of the transmission source node is described as the transmission source address.

Each node includes the transmission I/Fs and the reception I/Fs two each, which do not have discrete MAC addresses respectively but have one MAC address as a node. Further, as the destination address, the MAC address of the transmission destination node may be described instead of describing the broadcast address. Further, the ID of each node may be described in place of the MAC address.

Further, the management data 102 is data of 8 bytes, describing a frame serial number, a frame number in each sampling period, and the number of channels of waveform data in the waveform data 103, as the data to be used in management of data contained in the audio transport frame by each node in the audio network system 1.

As the region of the waveform data 103, 1024 bytes are secured, so that waveform data of 32 bits for 1 sample can be described for 256 channels as data of audio signals. In other words, in this system, the audio signals corresponding to the 256 channels can be transferred by circulating one audio transport frame 100. Note that it is not necessary to concern about what is described in regions of channels not in use for transport (empty channels) in the 256 channels. In this embodiment, even when the number of bits of the waveform data to be transported is not 32 but, for example, 16 or 24, the 32-bit region is prepared for each channel to describe it therein. However, the size of the regions for each channel may be changed depending on the number of bits of the waveform data. In this case, the 16-bit waveform data corresponding to 512 channels can be transported, and the 24-bit waveform data corresponding to 340 channels can be transported.

As the region of the control data 104, 224 bytes are secured, in which an IP packet region describing various kinds of data such as a packet for communication between nodes based on an IP (Internet Protocol), a level data region describing the level data used for level display, and a network configuration region describing network configuration information to manage and control the configuration of the audio network system 1, are provided. In the communication by the IP packet, a command to instruct each node to do the corresponding action and a response to the command are transmitted and received between the nodes.

Note that the reason why the dedicated regions (for example, 10 bytes) are provided for the level data and the network configuration information respectively is to steadily transfer those kinds of data.

Into the IP packet region among the above regions, the packet in the IEEE (Institute of Electrical and Electronic Engineers) 802.3 format made by packetizing the data to be transferred into IP packet and further packetizing the IP packet, is divided to fall into the prepared size (204 bytes here) and then described on the transmission side of the packet. The data is then read out from a plurality of audio transport frames 100 on the reception side of the packet and coupled to restore the packet before division, whereby the IP packet can be transported between the nodes in a similar manner to the normal transport based on the Ethernet (registered trademark). The maximum size of the packet in the IEEE 802.3 format is 1526 bytes, while about 200 bytes can be transmitted for each one audio transport frame even if division control data of several bytes is added for controlling division and restoration, so that transmission of one IP packet is completed by eight frames at maximum.

The FCS 105 is a field for detecting an error of the frame, defined by the IEEE 802.3.

1.3 Method of Transporting Audio Transport Frame

Next, a transport timing of the audio transport frame 100 shown in FIG. 2 is shown in FIG. 3.

As shown in this drawing, in the audio network system 1, one audio transport frame 100 is circulated among the nodes every 10.4 μsec (microseconds) that is one period of a sampling period of 96 kHz, and each node writes the audio signals into a desired channel of the audio transport frame or reads the audio signals from a desired channel. Accordingly, one sample of the waveform data can be transported between the nodes for each of the 256 channels in each sampling period.

When data transfer in the Ethernet (registered trademark) system of 1 Gbps (gigabit per second) is employed, the time length of the audio transport frame 100 is 1 nanosecond×8 bits×1282 bytes=10.26 μsec, so that the transmission of the audio transport frame 100 from the master node is completed in one sampling period.

Note that the audio transport frame having 1282 bytes is adaptable for a sampling period up to 1 sec/10.26 μsec=97.47 kHz, and a frame size up to 10.4 μsec/8 bits/1 nanosecond=1300 bytes can be adaptable for sampling frequency of 96 kHz, in terms of calculation with neglecting intervals between the frames. However, since an empty interval of a predetermined time period or more is necessary between the frames and the transport timing of the frame can advance or delay, the size (time length) of the audio transport frame is determined upon consideration of these situations.

Next, the state of transporting the audio transport frame shown in FIG. 2 during transport of the audio signals (in the audio transport mode) on the audio network system is shown in FIG. 4.

An audio network system in which four nodes, the node A to the node D, are cascaded is discussed here. When the audio transport frame 100 shown in FIG. 2 is circulated through the nodes in the system, any one of the nodes is determined as a master node, and only that master node generates the audio transport frame in a new sampling period (an audio transport frame with a different serial number) and transmits the audio transport frame generated in each sampling period to the next node. The nodes other than the master node are slave nodes which perform transfer processing of receiving the audio transport frame from their respective preceding nodes and transmitting it to the respective next nodes.

When the master node B first transmits the audio transport frame, rightward in the drawing, toward the node C in accordance with the timing of a wordclock, the audio transport frame is transported to the nodes B, C, D, C, B, A, and B in order as shown by the broken line and thus returned to the node B. As seen from the master node, the side on which the master node first transmits the circulating audio transport frame is called a forward side, and the side on which the master node secondly transmits it is called a backward side. While the audio transport frame circulates through the transmission route, each node reads, from the audio transport frame, the waveform data and the control data which the node should receive from another node, and writes, into the audio transport frame, the waveform data and the control data which the node should transmit to the other node, during the time period that the audio transport frame is flashing through the node, namely from reception to transmission of each portion of the audio transport frame in the node.

When the audio transport frame returns after circulating through the transmission route, the master node rewrites the management data 102 of the audio transport frame to generate the audio transport frame in the later sampling period, and provides it to transmission in an appropriate sampling period. In this event, the master node also reads/writes data from/to the audio transport frame as with the other nodes. The generation of the audio transport frame will be described later in detail.

In a field of professional audio, when an audio processing system is consisted of plural equipments for processing audio waveform data, such as digital mixers, digital recorders, digital effectors, analog to digital converters, and digital to analog converters, a clock, called "wordclock" in this technical field, generated at the sampling frequency of the waveform data is used to synchronize the equipments in the system each other. One of the equipments (a master equipment) generates the word clock at the sampling frequency, and supplies the word clock to the other equipments. Each of the other equipments (slave equipments) synchronously generates its own wordclock (sampling clock) based on the supplied word clock. Each of the equipments in the system processes the waveform data synchronously with the own wordclock. Any one of the equipments can transmit the processed waveform data to any other one of the equipments in digital domain, because all of the equipments in the system is synchronized based on the only one wordclock generated by the master equipment.

By repeating the above, one audio transport frame can be circulated for one sampling period, among the nodes as shown in (a) to (e) in time sequence. In these drawings, a block arrow shows the head of the audio transport frame, a black circle shows the end of the audio transport frame, and a bold line connected to the block arrow and/or the black circle shows the audio transport frame itself. The arrow of a line connected to the bold line is indicating the return of the audio transport frame to the master node after circulating through the transmission route.

Note that each slave node receiving the audio transport frame, before the node completes receiving all the audio transport frame (from the head to the tail), starts to read/write data from/to the audio transport frame from the head and transmit the audio transport frame from the head to the next node at a timing when the node has received necessary bytes of the audio transport frame from the head. Thereafter, the slave node reads/writes and transmits the audio transport frame to the end at substantially the same speed as the node receives the audio transport frame. On the other hand, the master node receives all the audio transport frame and then generates a new transport frame based on the contents of the received frame as will be described later.

The audio transport frame flashes through each of the nodes other than nodes at both ends in the network system twice in one circulation, but the node reads/writes audio data from/to the audio transport frame on only one occasion of them. On which occasion the node reads/writes audio data is selectable. In one case, the node reads/writes audio data at the first time when the frame flashes through the node. In another case, the node reads/writes audio data at the time when the frame flashes through the node rightward in the drawing. When the node does not read/write audio data from/to the audio transport frame, the node rewrites only information in the audio transport frame and transmits the frame to the next node.

Since each node needs to perform buffering at the time of receiving the audio transport frame, in order to rewrite the data of the audio transport frame or to absorb the difference in frequency and timing between the network clock on the receiving side (corresponding to the operation clock of the transmission source node) and the network clock on the transmitting side (corresponding to the operation clock of that node), there is a time lag between the timing when the node starts to receive a audio transport frame and the timing when the node starts to transmit the received frame.

The transport delay of the audio signals transported over the network is in the unit of sampling period and is minimal in a condition that the audio transport frame transmitted by the master node at a timing of a wordclock in S-th period returns to the master node, after circulating the transmission route, at a timing earlier than a wordclock in (S+2)-th period by a predetermined time a (corresponding to a time necessary to generate a new audio transport frame in (S+2)-th period based on the received frame in S-th period).

As will be described later, in this case, for example, the (S+2)-th audio transport frame which will be transmitted 2 sampling periods later is generated based on the S-th audio transport frame.

However, it is not essential to generate the audio transport frame which will be transmitted 2 sampling periods later, but it is also possible to generate the (S+k)-th audio transport frame which will be transmitted k sampling periods later based on the S-th audio transport frame, wherein the k is positive integer being not less than 2. In this case, the k shall be called a “periodic update value k.”

Generally, by configuring such that the master node can complete reception of the audio transport frame whose transmission has been started by the master node at a certain timing of a wordclock, at a timing before the k sampling periods later wordclock by a predetermined time a according to the value of k, the transmission of the audio signals is possible. Accordingly, even when the number of nodes in the network system is increased and the circulation time from the timing when the master node transmits an audio transport frame to the transmission route to the timing when the same frame returns to the master node after passing through the transmission route is thus increased, the network system can operate by increasing the value of k. Thus, the value of k defines a time limit of the circulation time of the audio transport frame in the network system.

The periodic update value k can be arbitrarily set by the master node and its contents are transferred to all of the nodes in the system by broadcasting a parameter setting frame indicating the setting of the periodic update value k or describing them into the IP packet region in the audio transport frame.

However, since the timings of using (outputting to some blocks) the audio signals received by the nodes are synchronized each other in this system, when the k is increased to extend the time limit of the circulation time (the time limit is variable in the unit of the wordclock), the transport delay of the audio signals is also extended correspondingly on the wordclock basis.

In this system, by performing data transport in the above-described method, a fixed transport bandwidth according to the size of the audio transport frame in the network can be secured at all times, independent of the number of nodes in the network system as long as the circulation time is in the limit. The bandwidth is not affected by the magnitude of the data transport amount between specific nodes.

1.4 Hardware Configuration and Basic Operation of Processors Constituting System Next, the hardware for transporting the audio transport frame as has been described above and its operation will be described.

The hardware configuration of an audio signal processor that is each of the nodes constituting the above-described audio network system 1 is shown in FIG. 5.

As shown in FIG. 5, the audio signal processor 2 includes a CPU 201, a flash memory 202, a RAM 203, an external device I/F (interface) 204, a display device 205, and controls 206, which are connected via a system bus 207. The audio signal processor 2 further includes a card I/O (input/output section) 210 connecting the external device I/F 204 and the system bus 207.

The CPU 201, which is a controller that comprehensively controls the audio signal processor 2, can execute a required control program stored in the flash memory 202, thereby controlling display on the display device 205, setting the value of the parameter according to the manipulation of the control 206, controlling the operation of each unit, transmitting a command to another audio signal processor via the card I/O 210, and performing processing according to the command received from the other audio signal processor via the card I/O 210.

The flash memory 202 is a non-volatile memory that stores data which should be left even after the power is turned off, such as the control program executed by the CPU 201.

The RAM 203 is a memory that is used to store data which should be temporarily stored and used as a work memory of the CPU 201.

The external device I/F 204 is an interface for connecting various kinds of external devices to perform inputting/outputting, for example, an external display, a mouse, a keyboard for inputting characters, a control panel, a PC (personal computer), and the like.

The external device I/F 204 is also connected to an audio bus 217 of the card I/O 210 and can transmit the waveform data flowing through the audio bus 217 to the external device and input the waveform data received from the external device into the audio bus 217.

The display device 205 is a display device for displaying various kinds of information according to control by the CPU 201, and can be composed, for example, of a liquid crystal display (LCD), a light emitting diode (LED), or the like.

The controls 206 are for accepting the operation to the audio signal processor 2 and can be composed of various keys, buttons, dials, sliders, and the like.

The card I/O 210 is an interface including the audio bus 217 and a control bus 218, and allowing inputting/outputting of the audio signals and the control signal to/from the audio signal processor 2 and processing on them to be performed by attaching various kinds of card modules to these buses. The card modules attached thereto transmit/receive the waveform data to/from each other via the audio bus 217 and transmit/receive the control signal to/from the CPU 210 via the control bus 218 to be controlled by the CPU 201.

The audio bus 217 is an audio signal transporting local bus which transports the waveform data of a plurality of channels from an arbitrary card to an arbitrary card sample by sample in a time division manner at a sampling period based on the wordclock. Any one of the plurality of connected cards becomes a master, and the reference timing for the time division transport of the audio bus 217 is controlled based on the wordclock generated and supplied by that card. The other cards become slaves and generate wordclocks of the cards based on the reference timing.

More specifically, the wordclock generated in each card is a common clock in synchronization with the wordclock of the card which has become the master, and a plurality of cards in a node process the waveform data at a common sampling frequency. Each card further transmits and receives the waveform data processed based on its own wordclock and the waveform data which should be processed, to/from the other card via the audio bus 217 at a time division timing based on the above-described reference timing.

FIG. 5 shows an example in which DSP (digital signal processor) cards 211 and 212, an analog input card 213, an analog output card 214, and a network I/F card 215 are attached to the card I/O 210.

Each of the various cards attached to the card I/O 210 executes processing for the waveform data according to the function of that card at a timing based on the wordclock (sampling period of the waveform data).

The DSP cards 211 and 212 of them are signal processors which perform various kinds of processing including mixing, equalizing, and effect addition on the waveform data acquired from the audio bus 217 at a timing based on the wordclock. They output the processed data to the audio bus 217. They can further accept inputs of the waveform data of a plurality of channels and output the waveform data of a plurality of channels and process the waveform data.

The analog input card 213 includes an A/D (analog/digital) conversion circuit and has a function of converting the analog audio signals inputted from the audio input device such as a microphone to digital waveform data and supplying it to the audio bus 217. The analog input card 213 can process the signals of a plurality of channels in parallel.

The analog output card 214 includes a D/A (digital/analog) conversion circuit and has a function of converting the digital waveform data acquired from the audio bus 217 to analog audio signals and outputting them to the audio output device such as a speaker or the like.

The network card I/F 215 includes two sets of transmission I/Fs and reception I/Fs and has a function of performing transport of the audio transport frame 100 and read/write of the waveform data, the control data, and the like from/to the audio transport frame 100, which have been described using FIG. 1A to FIG. 4. Details thereof will be described later. It is also possible to attach a plurality of network I/F cards to the card I/O 210, and each network I/F can be connected to a different audio network. In this case, the audio signal processor 2 performs the operation as a bridge to connect a plurality of audio networks.

In addition to the aforementioned, it is conceivable that various kinds of card modules such as a digital input/output, a sound source, a recorder, an effector, and so on can be attached as another card 216.

Note that the cards attached to the card I/O 210 as described above perform processing of the audio signals according to the common wordclock, and when the audio signal processor 2 is the master node, any one of the attached cards supplies the wordclock to the other cards including the network I/F card 215, and the network I/F card 215 transmits, as the master node, an audio transport frame in each sampling period. When the audio signal processor 2 is a slave node, the network I/F card 215 generates (reproduces) the wordclock based on the reception timing of the audio transport frame and supplies the wordclock to the other cards attached to the card I/O 210.

Next, the configuration of the network I/F card 215 is shown in more detail in FIG. 6.

As shown in FIG. 6, the network I/F card 215 includes first and second data input/output sections 10 and 20, first and second reception I/Fs 31 and 33, first and second transmission I/Fs 34 and 32, selectors 35 to 38, an audio bus I/O 39, a control bus I/O 40, a control circuit 41, and a wordclock generating unit 42.

Among of them, the first and second reception I/Fs 31 and 33, and the first and second transmission I/Fs 34 and 32 are communication devices corresponding to the two sets of reception I/Fs and transmission I/Fs shown in FIG. 1A and FIG. 1B, each including a predetermined connector (a female side) for connecting a communication cable thereto. For connection of the communication cable, the first reception I/F 31 and the first transmission I/F 34 shall be one set, and the second transmission I/F 32 and the second reception I/F 33 shall be one set. These I/Fs can be I/Fs which perform data communication by any communication system as long as they have enough ability for transport of the audio transport frame in the above-described one sampling period, and an I/F performing data transfer by the Ethernet system of 1 Gbps is employed here.

Currently, the 1G Ethernets include two kinds, such as 1000BASE-T using a CAT5e cable with an RJ45 connector (an unshielded twisted pair cable) as the communication cable CB, and 1000 BASE-X using an optical fiber or an STP cable (a shielded twisted pair cable), any of which can be used in this embodiment. Further, broadband network technologies other than the 1G Ethernet may be used. For example, they are FiberChannel, SDH (Synchronous Digital Hierarchy)/SONET (Synchronous Optical NETwork) and so on.

The reception I/F extracts the network clock being a carrier from an electric signal or an optical signal propagating through the communication cable CB, and demodulates and outputs a data stream of the digital data in a byte unit (or word unit) from the electric signal or the optical signal based on the extracted clock. The transmission I/F receives the network clock and the digital data stream in a byte unit (or word unit) which should be transmitted, and modulates it to an electric signal or an optical signal for transport using the network clock as a carrier and outputs it to the communication cable CB.

The audio bus I/O 39 is an interface for inputting/outputting the waveform data to the audio bus 217.

The control bus I/O 40 is an interface for inputting/outputting data such as a controlling packet, the level data, the network configuration information, and the like to the control bus 218.

The control circuit 41 includes a CPU, a ROM, a RAM, and the like, and conducts general control relating to the operation of the network I/F card 215 and control relating to frames other than the audio transport frame, such as presence confirmation and connection possibility confirmation and the like as described later. The control circuit 41 can also transmit/receive data to/from the CPU 201 via the control bus I/O 40 and a control bus 28.

The wordclock generating unit 42 is a wordclock generating device that generates the wordclock being the reference of timings for the transfer of the waveform data in the audio bus 217 and the signal data processing in the various kinds of card modules connected to the audio bus 217 as will be described later.

The wordclock generating unit 42 in the master node generates the wordclock at its own timing of the network I/F card 215 or a timing in synchronization with the wordclock supplied via the audio bus 217 from the other card, and uses the clock as the reference of the transmission timing of the audio transport frame, whereas the wordclock generating unit 42 in the slave node generates the wordclock using the reception timing of the audio transport frame as a reference.

Each of the first and second data input/output sections 10 and 20 is a reader that operates based on the operation clock generated by a not-shown operation clock generating unit to read desired data from various kinds of frames (including the audio transport frame) received by a corresponding reception I/F, and is a writer that writes desired data into the received audio transport frame. The functions of these input/output sections are identical, and therefore the first data input/output section 10 will be described as representative.

The first input/output section 10 includes a data extracting unit 11, a waveform inputting FIFO 12, a waveform outputting FIFO 13, a control inputting FIFO 14, a control outputting FIFO 15, and a frame buffer 16. Upon receiving a supply of a network clock NC1 extracted by the first reception I/F 31 as a carrier, the first input/output section 10 receives the data from the first reception I/F 31 in synchronization with the supply. Each FIFO here is a register of first-in/first-out in which firstly written data is firstly read out.

In other words, the data extracting unit 11 retrieves the data (the various kind of frames) outputted from the first reception I/F 31 in synchronization with the network clock NC1, and the frame buffer 16 retrieves the data (the audio transport frame) outputted from the first reception I/F 31 in synchronization with the network clock NC1. (It is assumed that input from the first reception I/F 31 is selected here by the selector 38.)

Among them, the data extracting unit 11 has a function of writing the waveform data of a transport channel to be read out among the retrieved data, into the waveform inputting FIFO 12, writing the control data to be read out into the control inputting FIFO 14, and discarding other data. The waveform data of each transport channel written into the waveform inputting FIFO 12 is read out by the audio bus I/O 39 sample by sample in synchronization with the wordclock, and transported to another card via the audio bus 217. The control data written into the control inputting FIFO 14 is read out in sequence by the CPU 201 via the control bus I/O 40 and used for control of the audio signal processor 2.

For the waveform data to be received from other node, the control circuit 41 grasps at least the transport channel number of the waveform data, therefore can calculate the byte positions of the waveform data in the audio transport frame based on the channel number. The control circuit 41 indicates the positions to the data extracting unit 11 and instruct it to write only the data at those positions into the waveform inputting FIFO 12.

For the control data, the data extracting unit 11 does not make judgment but writes the retrieved data, if it is the control data, into the control inputting FIFO 14, and the CPU 201 reads out the control data from the control inputting FIFO 14 and analyses the transmission destination address and the like contained in the control data to judge whether or not the it is the control data to be referred to. As has been described above, as regards transport of the control data a packet may be divided into a plurality of portions on the transmission side and transmitted as control data, and it is preferable to leave the judgment to the CPU 201 in order to flexibly cope with such data. Alternatively, a function of processing the divided packet may be imparted to the data extracting unit 11, and the control circuit 41 in the processor indicates the address of the own processor to the data extracting unit 11 to enable the data extracting unit 11 to judge whether or not the control data is addressed to the node based on a matching of the transmission destination address contained in the control data with the address of the own processor.

On the other hand, the waveform outputting FIFO 13 is a buffer that stores waveform data to be written in the audio transport frame and outputted, and the audio bus I/O 39 acquires the waveform data to be outputted in each sampling period from the audio bus 217 and writes the data therein. It is of course possible to write the waveform data corresponding to a plurality of transport channels, and it is only necessary to firstly write, into the waveform outputting FIFO 13, the data to be written into a byte close to the head of the audio transport frame.

Further, the control outputting FIFO 15 is a buffer that stores control data to be written into the audio transport frame and outputted, and the control bus I/O 40 acquires the control data to be outputted from the control bus 218 and writes the data therein.

In the case where the own processor is a slave node, when a predetermined amount (a first predetermined amount) of data of the audio transport frame, outputted from the first reception I/F 31, is accumulated (stored) in the frame buffer 16, the data in the waveform outputting FIFO 13 and the control outputting FIFO 15 is written into an appropriate address of the frame buffer 16 in accordance with progression of the accumulation whereby the contents in the audio transport frame are rewritten.

For the waveform data to be transported to other node, the control circuit 41 calculates the byte positions of the waveform data in the audio transport frame, based on the transport channel into which the waveform data should be written, and indicates it to the frame buffer 16, and the frame buffer writes the waveform data supplied from the outputting FIFO 15 into the byte positions in the audio transport frame. Also for the control data, the byte positions in the audio transport frame which the data should be written into is automatically determined for each kind of data according to the frame construction shown in FIG. 2.

When it is desired to transport another kind of data, a portion of the region of “IP packet” may be used as a region for the another kind of data. Note that detecting a lapse of a predetermined time from start of retrieving the audio transport frame may be utilized as a trigger to start writing into the frame buffer in place of detecting the accumulation of the first predetermined amount and using it as a trigger for writing.

In the case where the own processor is a slave node, when a second predetermined amount, which is larger than the first predetermined amount, of data of the audio transport frame is accumulated in the frame buffer 16, the frame buffer 16 starts outputting the audio transport frame so that if the selector 35 selects output to the second transmission I/F 32, the frame buffer 16 passes the data of the audio transport frame to the second transmission I/F 32 in sequence from its head to cause the second transmission I/F 32 to transmit the data.

In this event, the operation clock of the first data input/output section 10 is supplied as it is as the network clock NC2 to the second transmission I/F 32, and the second transmission I/F modulates in sequence the data of the audio transport frame using the network clock NC2 as a carrier and outputs it to the communication cable CB. Note that detecting a lapse of a predetermined time from start of retrieving the audio transport frame may be utilized as a trigger to start transmission of the audio transport frame in place of detecting the accumulation of the second predetermined amount and using it as a trigger for transmission.

In this case, the first data input/output section 10 functions as a transmission controller.

Although the process for rewriting the contents of the audio transport frame stored in the frame buffer 16 with the data from the waveform outputting FIFO 13 and the data from the control outputting FIFO 15 and the process for outputting the audio transport frame from the frame buffer 16 are individually performed in this embodiment, the rewriting process and the outputting process may be performed at a time. In the variation, the received audio transport frame is written into the frame buffer 16, a reading out process of the audio transport frame in the frame buffer 16 is started using the accumulation of the predetermined amount as a trigger, and the audio transport frame read out is supplied to the second transmission I/F 32 while some portions of the audio transport frame are being replaced with the data from the waveform outputting FIFO 13 and the data from the control outputting FIFO 15.

In this embodiment, the rewriting process of the data in the audio transport frame is not performed after the audio transport frame received once is stored in the frame buffer 16, but the rewriting process could be performed before the frame is stored in the frame buffer. In the variation, an appropriate one of the data from the first reception I/F 31, the data from the waveform outputting FIFO 13, and the data from the control outputting FIFO 15 is selected and written at the time of writing the audio transport frame into the frame buffer 16. In this case, the data which has not been selected among the data in the audio transport frame from the first reception I/F 31 is discarded.

In the case of the cascade as described above, each node reads/writes only once while the audio transport frame circulates once through the transmission route. Accordingly reading/writing of the data is performed in only one of the first and second data input/output sections 10 and 20. When the data input/output section performs neither the reading process nor writing process, the audio transport frame just flashes therethrough. Note that the FIFOs 22, 23, and 25 are not necessary in this embodiment because the data just flashes through the frame buffer 26, but these FIFOs are provided for another operation mode which is not described here.

The master node updates the audio transport frame after completion of the reception of the whole audio transport frame as will be described later, so the timing of writing data into the audio transport frame and the timing of starting transmission of the audio transport frame are different from those of the slave node. However, the position for writing data in the audio transport frame can be determined as in the case of the slave node. The master node also rewrites the management data 102 in the audio transport frame, and the rewrite can also be performed such that data to be described into a new audio transport frame is written into the control outputting FIFO 15 and the data is written over that in the audio transport frame accumulated in the frame buffer.

The foregoing is the function of the data input/output section relating to transmission of the audio transport frame.

Besides, as can be seen from FIG. 1A and the like, the transmission destination of the audio transport frame from a node that has received it may be a node other than the transmission source of the audio transport frame (the case of the node B in FIG. 1A) or may be the same node as the transmission source (the case of the nodes A and C). In the former case, the audio transport frame is transmitted from a transmission I/F in another set different from the set of the reception I/F which has received the audio transport frame, whereas in the latter case, it is transmitted from a transmission I/F in the same set.

The selectors 35 to 38 are provided to switch the transmission destination as described above.

The selector 35 and the selector 36 operate in cooperation such that when the selector 35 flows the output of the frame buffer 16 to the second transmission I/F 32, the selector 36 writes the data received at the second reception I/F 33 into the frame buffer 26 so as to make the node possible to communicate with the node on the second I/F side.

When the selector 35 and the selector 36 are switched to a loopback line TL1 side, the output of the frame buffer 16 is written into the frame buffer 26 and passed to the first transmission I/F 34 therefrom and transmitted to the connection destination. Accordingly, the received audio transport frame will be transmitted back to its transmission source. It is also adoptable to configure such that, in this event, the data is not written into the frame buffer 26 but just passed through it so that the output of the frame buffer 16 can be directly passed to the first transmission I/F 34. The operation clock of the first data input/output section 10 which supplies the data to be transmitted can be supplied as the network clock, and if the first data input/output section 10 and the second data input/output section 20 are operated by the common operation clock, it is not necessary to switch the supply source of the network clock.

In this state, even if any frame is received from the second reception I/F 33, its contents are not written into the frame buffer 26. However, the contents are written into the data extracting unit 21, and the data extracting unit 21 inputs all the contents into the control circuit 41. In this state, the output of the frame buffer 16 is not supplied to the second transmission I/F 32, but a line to pass the data directly from the control circuit 41 to the second transmission I/F 32 for transmission is provided.

These input/output lines are used for transmission/reception of a presence confirmation frame, a connection possibility confirmation frame, and a response thereto which will be described later, or for transmission/reception of a notification and a command when assembling the audio network system in the initial processing and performing processing relating to the change of the system configuration.

Although the selectors 35 and 36 have been described here, the selectors 37 and 38 operate in cooperation and thereby have a similar function. They can switch whether or not to perform loopback for the audio transport frame received from the second reception I/F 33.

In summary, in the audio signal processor 2, the hardware of the network I/F card 215 shown in FIG. 6 performs any of the processing in the following Table 1 and Table 2 according to the detected event, depending on the connection state of each node in the audio network system in which the own processor is included, and on whether the own processor is the master node or the slave node, whereby the function relating to transmission of the audio transport frame and data as described using FIG. 1A to FIG. 4 can be realized. Incidentally, these tables show an embodiment in which the first data input/output section 10 is used for input/output of data at all times, and if using the second data input/output section 20, it is only required to swap the contents of processing between the first data input/output section 10 and the second data output/output section 20 such that the functions of the first data input/output section 10 and the second data output/output section 20 are reversed.

TABLE 1

Figure 22:
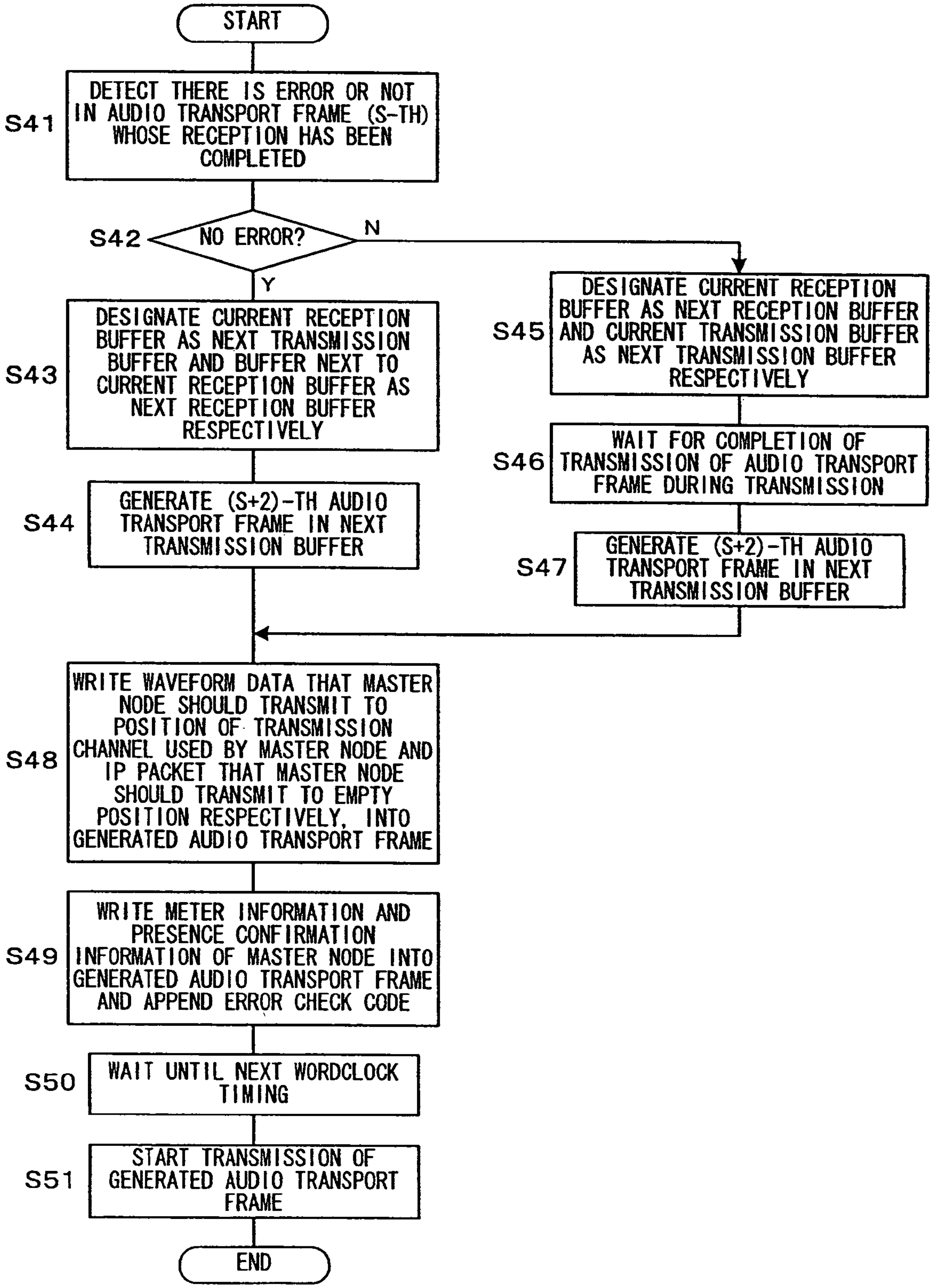
FIG. 22 is an illustration showing a flowchart of processing executed when the master node detects the completion of reception of the S-th audio transport frame.
Figure 25:
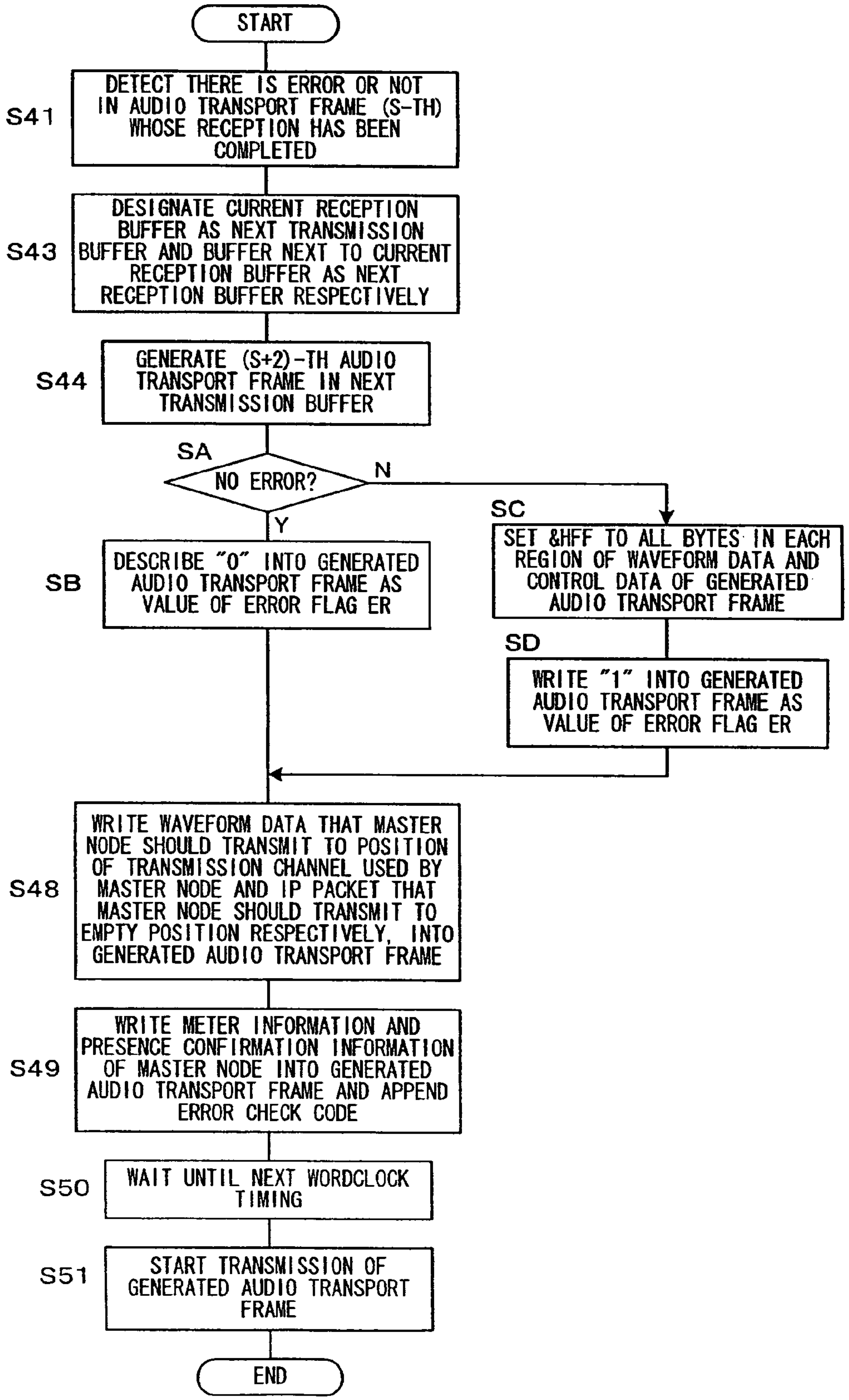
FIG. 25 is a chart showing another example of the processing in FIG. 22.

| Frame Transport Processing Performed by Hardware of Master Node | |
|---|---|
| Detected Event | Processing to be Executed |
| Reception of Frame from First Reception I/F | Receive Each Data of Frame in Sequence, while Writing That Data into Data Extracting Unit 11 and Frame Buffer 16 |
| Presence of Data in Data Extracting Unit 11 | Write Data to be Received into Waveform Inputting FIFO 12 or Control Inputting FIFO 14 |
| Completion of Reception of One Audio Transport Frame at First Reception I/F | Processing Shown in FIG. 22 or FIG. 25 |
| Reception of Wordclock | Read out Contents of Audio Transport Frame to be Transmitted Next in Sequence from Head from Frame Buffer 16, and Transmit That Contents by Second Transmission I/F (Non-Loopback State) or Write Contents Into Frame Buffer 26 (Loopback State) |
| Reception of Frame from Second Reception I/F | Receive Each Data of Frame in Sequence, while Writing That Data into Frame Buffer 26 |
| Presence of Data in Frame Buffer 26 | Read out Contents of Frame Buffer 26 in Sequence from Head, and Transmit That Contents by First Transmission I/F (Non-Loopback State) or Write Contents into Frame Buffer 16 (Loopback State) |

TABLE 2

| Frame Transport Processing Performed by Hardware of Slave Node | |
|---|---|
| Detected Event | Processing to be Executed |
| Reception of Frame from First Reception I/F | Receive Each Data of Frame in Sequence, while Writing That Data into Data Extracting Unit 11 and Frame Buffer 16 |
| Presence of Data in Data Extracting Unit 11 | Write Data to be Received into Waveform Inputting FIFO 12 or Control Inputting FIFO 14 |
| Presence of First Predetermined Amount of Data in Frame Buffer 16 | Write Data to be transmitted into Appropriate Position of Frame Written in Frame Buffer 16 from Waveform Outputting FIFO 13 and Control Outputting FIFO 15 |
| Presence of Second | Read out Contents of Frame Buffer 16 in |

TABLE 2-continued

| Frame Transport Processing Performed by Hardware of Slave Node | |
|---|---|
| Detected Event | Processing to be Executed |
| Predetermined Amount of Data in Frame Buffer 16 | Sequence from Head, and Transmit That Contents by Second Transmission I/F (Non-Loopback State) or Write Contents into Frame Buffer 26 (Loopback State) |
| Reception of Frame form Second Reception I/F | Receive Each Data of Frame in Sequence, while Writing That Data into Frame Buffer 26 |
| Presence of Data in Frame Buffer 26 | Read out Contents of Frame Buffer 26 in Sequence from Head, and Transmit That Contents by First Transmission I/F (Non-Loopback State) or Write Contents into Frame Buffer 16 (Loopback State) |

2. Formation and Change of Configuration of Audio Network System 2.1 Operation on Starting Up System Next, processing relating to construction and change of configuration of the network, executed by the CPU of the control circuit 41 in the audio signal processor 2 shown in FIG. 5 will be described.

Figure 7:
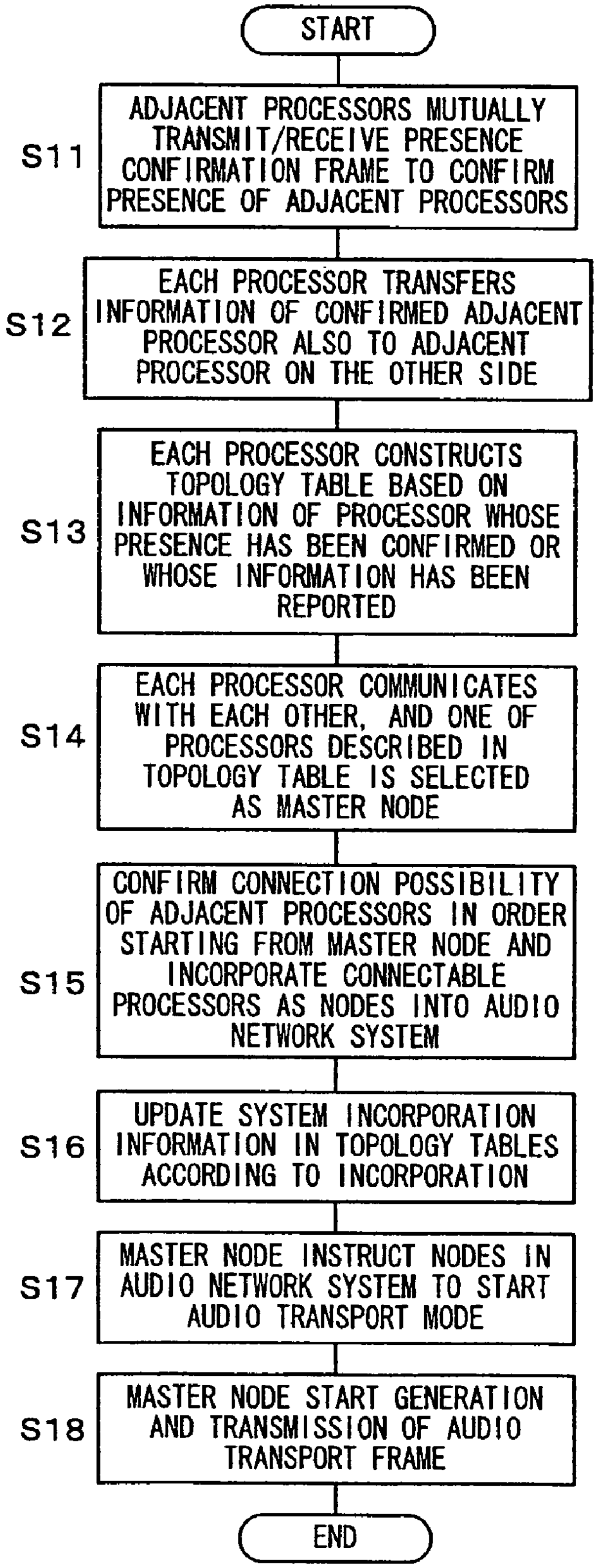
FIG. 7 is an illustration showing a procedure of processing as a whole to form the audio network system executed by each individual audio signal processor at the time of starting up, in a flowchart.

FIG. 7 shows a procedure of processing as a whole to form the audio network system executed by each individual audio signal processor 2 at the time of starting up, in a flowchart.

In this flowchart, the operations shown at Steps S11 to S14 are the operations in the "detection mode" to perform confirmation of presence of another processor, and the operations shown at Steps S15 and S16 are operations in the "construction mode" to incorporate the processor, whose presence has been confirmed, into the audio network system. In addition, the operations to circulate the audio transport frame after the incorporation into the system are the operations in the "audio transport mode." These modes are determined for each processor.

In the processing shown in FIG. 7, the selectors 35 to 38 first select the loopback line in the initial state in the audio signal processor 2. Upon power-on, adjacent processors mutually transmit/receive the presence confirmation frame to thereby confirm the presence of the adjacent processors (S11). Note that the adjacent processors mean processors directly connected over communication cables. When a processor can confirm the presence of the adjacent processors, the processor transfers the information of the confirmed adjacent processor also to the adjacent processor on the other side (the side where it is connected to the I/F in another set) (S12).

Figures 8, 9, 10:
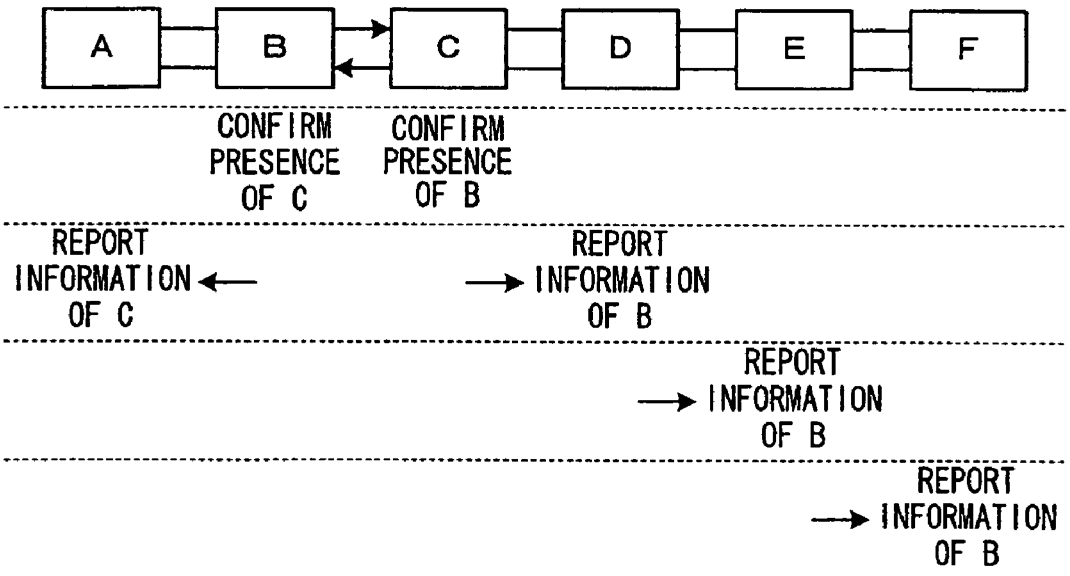
FIG. 8 is an illustration for explaining the presence confirmation and information transfer shown at Steps S11 and S12 in FIG. 7.
FIG. 9 is an illustration showing the configuration of a presence confirmation frame.
FIG. 10 is a chart showing an example of a topology table.

The procedure of the presence confirmation and the transfer is schematically shown in FIG. 8. The configuration of the presence confirmation frame is shown in FIG. 9.

FIG. 8 shows, as a representative, the procedure of transferring the information of the processor B and the processor C in a state in which six audio signal processors A to F are cascaded.

In the audio signal processor 2, when the power is turned on, the control circuit 41 of the network I/F card 215 judges whether or not another processor is connected to the own processor, based on, for example, the presence or absence of connection of a communication cable to each of the reception I/F and transmission I/F detected by a physical switch provided at a connector or the measured impedance between terminals, the presence or absence of an electric signal inputted into the reception I/F, or the presence or absence of an extracted network clock (incidentally, it is not necessary at this stage to judge whether or not the processor being the connection partner has already configured the audio network system, and whether or not that processor can configure the audio network system). When it is judged that another processor is connected, the presence confirmation frame is transmitted to the another processor from the transmission I/F.

The presence confirmation frame is a frame in the Ethernet format shown in FIG. 9 and includes information indicating that the frame is the presence confirmation frame, the ID of the own processor (transmission source processor), and information indicating whether or not the own processor has already belonged to the audio network system 1. The presence confirmation frame may further include information indicating the connection state with the other processor whose presence has been confirmed. The ID of the audio signal processor 2 is preferably set in advance by a manufacturer as with the MAC address to prevent its duplication. As the ID of the own processor, not the ID set for the processor itself, but the ID of the network I/F card 215 may be used.

In the processor which has received the presence confirmation frame, the control circuit 41 receives the presence confirmation frame via the first reception I/F 31 and the data extracting unit 11. The control circuit 41 generates a presence confirmation response frame in the Ethernet format according to the presence confirmation frame and transmits it to the transmission source of the presence confirmation frame. The transmission from the transmission I/F in the same set with the reception I/F which has received the presence confirmation frame will allow the presence confirmation response frame to the transmission source of the presence confirmation frame without considering the destination. The configuration of the presence confirmation response frame can be the same as that of the presence confirmation frame shown in FIG. 9 except that the it includes information indicating that the frame is the presence confirmation response frame.

In the processor which has transmitted the presence confirmation frame, when it receives the presence confirmation response frame from the transmission destination, it judges that a processor having a communication function for constituting the audio network system 1 is surely connected to the own processor and therefore the presence of the processor connected by the communication cable is confirmed.

In the example shown in FIG. 8, for example, when the processor B transmits the presence confirmation frame to the processor C and receives the presence confirmation response frame which is transmitted from the processor C in response to the transmission of the presence confirmation frame, the processor B judges that the presence of the processor C has been confirmed.

In accordance with the above-described transmission/reception, the processor C may judge that the presence of the processor B has been confirmed. In other words, in accordance with the reception, the processor which has received the presence confirmation frame may confirm the presence of the processor which has transmitted the presence confirmation frame. However, transmission of the presence confirmation frame and reception of the presence confirmation response frame may be performed again.

In any case, the processor which has confirmed the presence of the adjacent processor transmits, if there is a processor connected to the I/F on the opposite side, a presence report frame in the Ethernet format indicating a processor (call it a newly found processor) whose presence has been newly confirmed. In the example show in FIG. 8, the processor B transmits to the processor A the presence report frame indicating the presence of the processor C, and the processor C transmits to the processor D the presence report frame indicating the presence of the processor B. In this case, it is the assumption that the processor transmitting the presence report frame has confirmed the presence of the processor at the transmission destination, that is, that the presence of the processor at the transmission destination is described in the topology table (described later) of the processor performing the transmission.

The processor which has received the presence report frame indicating the presence of the newly found processor transmits, if there is a processor connected to the I/F on the side opposite to the transmission source, the received presence report frame to that processor. In the example shown in FIG. 8, the processor D transmits the presence report frame which has been received from the processor C indicating the presence of the processor B, to the processor E. The processor E also transmits the presence report frame which has been received from the processor D indicating the presence of the processor B, further to the processor F. Also in this case, it is the assumption that the processor transmitting the presence report frame has confirmed the presence of the processor at the transmission destination.

The presence report frame, used when reporting the presence of the processor as described above, includes the information indicating the positional relationship (connection order of processors) between the processors. The information indicates, for example, that "the processor B is located at a position beyond C, from the viewpoint of processor D" (D, C, and B in the order) when the processor C reports the presence of the processor B to the processor D, and that "the processor B is located at a position beyond D, and C from the viewpoint of processor E" (E, D, C, and B in the order) when the processor D reports the presence of the processor B to the processor E, and so on.

Returning to explanation of FIG. 7, each processor constructs a topology table based on the information of the processor whose presence has been confirmed or whose information has been reported (S13). This topology table is a table which records in what order the processors are connected by the communication cables and information of the processors.

FIG. 10 shows an example of the topology table.

As shown in this drawing, the IDs of the processors whose presence has been confirmed or whose information has been reported are described in order of the connection of the processors, and information of master priority, delay time, system incorporation about each processor are described here in the topology table.

The master priority among them is information indicating what level of priority is given to each processor, which is referred when determining the master node of the audio network system, and the processor having the highest master priority becomes the master node. The master priority is set in advance by the user or the manufacturer for each processor.

The delay time is information indicating time length of propagation delay which occurs when a frame propagates forth and back between two adjoining nodes, namely, the frame goes from one node to another node, then returns from the another node to the one node, and can be measured, for example, by transmitting/receiving the frame for measurement between the processors at the time of later-described connection possibility confirmation. The delay time caused by buffering the audio transport frame and reading/writing the data in each processor is preferably designed to be substantially same value (designed value) each other. Then, the transport delay becomes (the designed value)+(the increment depending on the physical distance between processors). The delay time stored in the topology table may be only (the increment depending on the physical distance between processors) or a sum of the increment and (the designed value).

When the processor is cascaded to two adjacent processors respectively, the time length of propagation delay for both of them would be different. In this specification, the two cascade connections of one processor are discriminated as the head side and a connection at tail side. In this embodiment, the transport delay amount occurring when transporting the audio transport frame to/from the adjacent processor on the tail side is described as the delay time in the topology table. Alternatively, the delay time that occurs between the own processor and the adjacent processor on the head side and the delay time occurs between the own processor and the adjacent processor on the tail side may be separately described.

The system incorporation is information indicating whether or not the processor has been already incorporated in the audio network system and, if incorporated, the information indicating its system ID. The system ID is a unique ID imparted to each audio network system, and is determined by the master node of the system. In this embodiment, a plurality of audio network systems can be constructed on one or more audio networks formed by cascade of the audio signal processors 2, and the system IDs can be used to individually identify the plurality of audio network systems existing at the same time.

Figure 11:
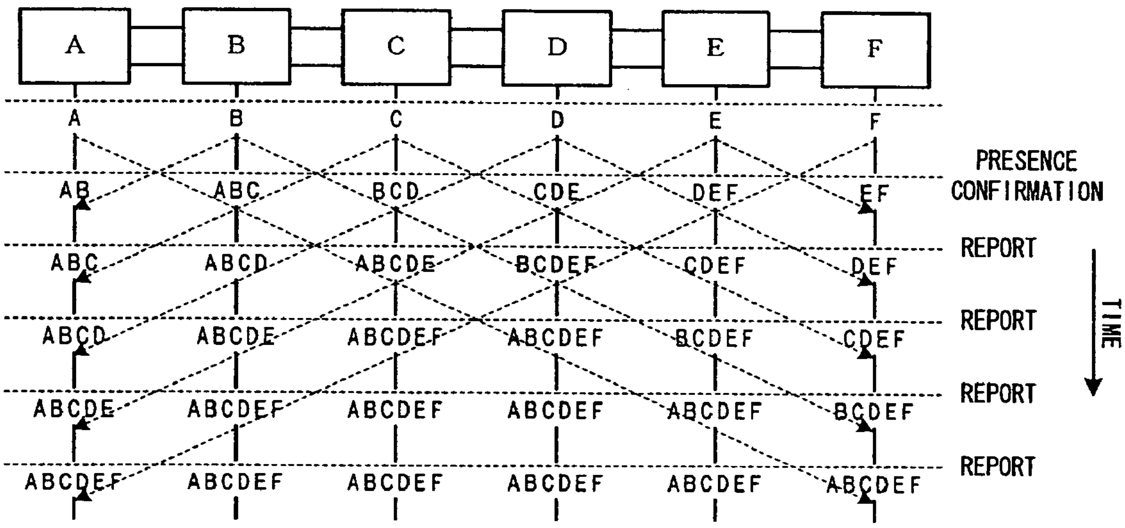
FIG. 11 is a chart showing a procedure example of constructing the topology table at Step S13 in FIG. 7.

FIG. 11 shows a procedure of constructing the topology table in each processor.

As has been described, upon power-on, each of audio signal processors A to F confirms the presence of an adjacent processor and reports information of that processor to the processor on the opposite side in sequence. Accordingly, the information of each of the processors A to F is delivered firstly by the presence confirmation and then by report to all of the processors cascaded as shown by a broken line. Every time each processor receives information of a newly found processor, the information of that processor is added to an appropriate position in the topology table to thereby construct the topology table in each processor as sequentially shown in FIG. 11.

In this figure, the construction of the topology table is performed step by step such that the presence of the adjacent processor can be confirmed in all of the processors, and then reported to the processor on the opposite side, but it is not always necessary to take those steps. For example, the presence of the processor A might be reported down to the processor E before the processor E confirms the presence of the processor F.

The head and the tail of the cascade connection are defined in the topology table, for example, based on the I/F in the (master) node to be connected to other processor such that the first transmission and reception I/Fs 31 and 34 cascade another processor at the head side and the opposite I/Fs 32 and 33 cascade another processor at the tail side.

In such a configuration, if the first transmission and reception I/Fs are connected to each other, the directions of the topology table may be different for each processor (for example, when the first transmission and reception I/Fs of the processor B are connected to the first transmission and reception I/Fs of the processor C, the processor B recognizes the processor F as the head of the cascade, while the processor C recognizes the processor A as the head).

However, if there is no contradiction in the connection of every two adjacent nodes in the system, namely a transmission I/F at a side of one processor is connected to a reception I/F at a side of other processor and a reception I/F at the same side of the one processor is connected to a transmission I/F in the same side of the other processor, then, there is no trouble in forming the audio network system. The master node notifies the processors in the system after the formation of the system to align the direction of the topology table in the processor same as the direction in the master node. The master node of the system defines here the side, to which the master node transmits an audio transport frame first in each sampling period (the front side in FIG. 29), as the tail side, and notifies each slave node to regard the same side as the tail side (front side) and the opposite side as the head side (rear side).

As can been seen from FIG. 11, when all of the cascaded processors are registered in the topology table in each processor, the contents of the topology table do not change any more. Hence, if there is no change in the topology table for a predetermined time, the processors shift to the processing of constructing the audio network system at Steps S14 and subsequent thereto in FIG. 7. In the processor not incorporated in the audio network system, it is assumed that the selectors 35 to 38 select the loopback line side.

If it is found that the own processor is not connected to another processor, there is no advantage to newly construct a system, so the processor temporarily finishes the processing, and waits a connection of another processor. When the processor is connected to the another processor, the processing shown in FIG. 7 is started again and the processor might be incorporated into the system.

In the processing of constructing the audio network system, each processor first communicates with each other, and one of the processors described in the topology table is selected as the master node (S14). The processor having the highest master priority can be the master here. If there are a plurality of processors having the same value of master priority, the selection of the master node can be made by any method, such as selecting the processor having a smaller character code of the processor ID as the master node. When a processor having unmatched contents of the topology table (to which all the information of the processors has not been reported yet) is discovered, the processing at Step S14 may be suspended until the processors exchange each other the presence or absence of processors adjoining to the processor to correct the topology table and consequently the topology tables in all of the processors have a match. In this processing, the control circuit 41 in each processor functions as a master node setting device.

Upon completion of the selection of the master node, the processors other than the master node stop the operation of independently constructing the system, and follow the instruction from the master node to construct the audio network system. The processors confirm the connection possibility of the adjacent processors in order starting from the master node so that connectable processors are incorporated as nodes into the audio network system (S15). Note that the audio transport by the audio transport frame is performed among the nodes incorporated into the audio network system out of the plurality of nodes existing in the audio network. The nodes on one audio network can be incorporated into only one of the audio network systems on the audio network, and cannot be incorporated into a plurality of systems on the audio network at the same time.

According to the incorporation, the system incorporation information in the topology tables in the processors is updated (S16). Specifically, the master node notifies the processors in the audio network (also including the processors not incorporated in the system) of the processor IDs of the processors incorporated in the system and the system ID of that system to cause the processors to register the IDs in the topology tables thereof.

Figure 12:
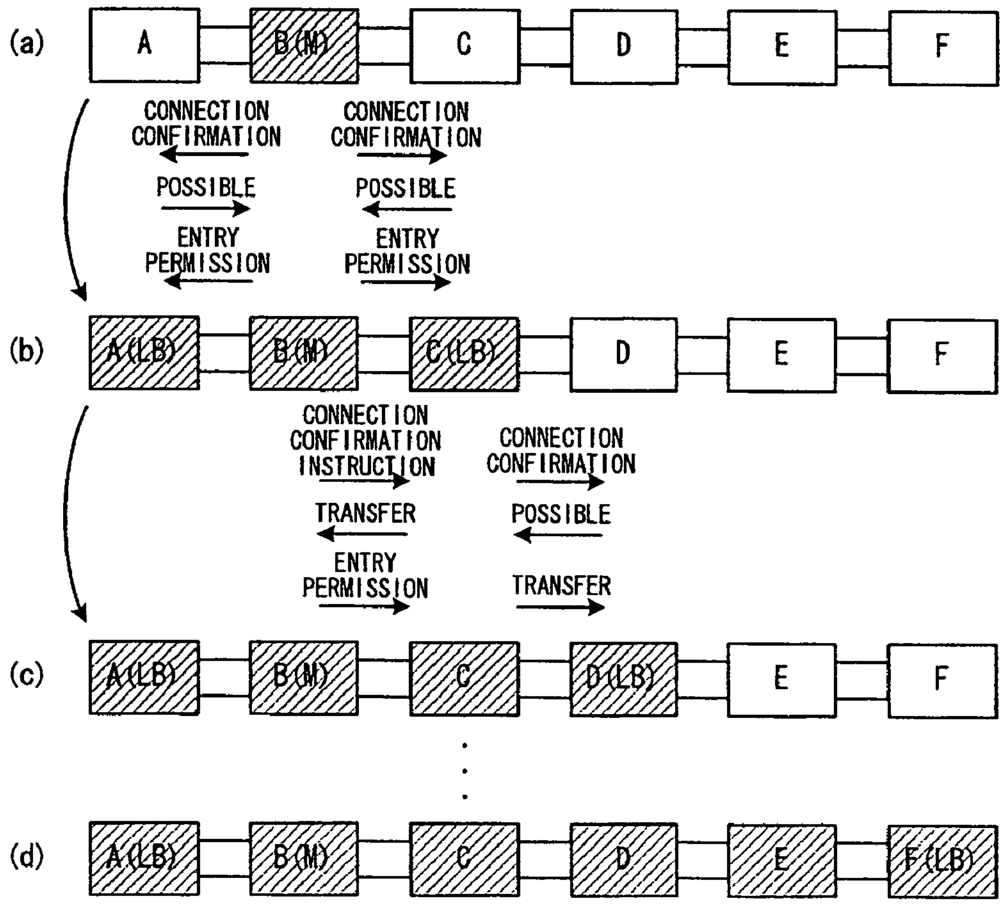
FIG. 12 is an illustration showing an example of the procedure of incorporating the processors into the audio network system at Step S15 in FIG. 7.

FIG. 12 shows a procedure of incorporating the processors into the audio network system at Step S15. This drawing shows an example in which the processor B becomes the master node, in which drawing "M" represents the master node. The processors with hatchings are processors which have been incorporated into the audio network system, and "LB (LoopBack)" represents a state in which the selectors on one side are switched to the loopback side to loop back the audio transport frame.

When newly configuring an audio network system, the master node B transmits a connection possibility confirmation frame to processors on both adjacent processors (target processors) as shown at (a) in FIG. 12. This frame is used for inquiring whether or not the processor can enter the audio network system. The processor whose presence has already been confirmed and has not been incorporated in another system can be normally considered to be in a state capable of entering the system, and returns a connection possibility response frame indicating whether or not the processor can be incorporated into the system in response to the connection possibility confirmation frame from the master node.

In this event, the node transmits/receives a delay time confirmation frame to measure how long transport delay occurs when transporting the audio transport frame between the processors, and its result is registered into the topology table as delay time information. It is not essential for the processors other than the master node to have the delay time information, so it is only necessary for the master node to register it.

The master node B confirms from the delay time information that even though the processor that returns the response indicating that the processor can be incorporated into the system to the master node B would be added to the system, the audio transport frame can circulate through all of the nodes in the system within a predetermined upper-limit time according to the periodic update value k currently tried in the system.

If the audio transport frame cannot circulate, the periodic update value k is incremented by one and the confirmation processing is performed once more, and thereafter the increment of the periodic update value k and the confirmation processing are repeatedly executed until the circulation can be confirmed. A predetermined upper limit is set for the periodic update value k, so that unless the master node B can confirm that circulation is possible even though the periodic update value k reaches the upper limit, the master node B judges that that processor cannot be incorporated into the system, and stops the incorporation processing (S15, S16) and proceeds the processing to Step S17. Note that since the minimum value of the periodic update value k in this embodiment is 2 (periods), the periodic update value cannot be incremented when the upper limit is 2.

When the circulation can be confirmed, the master node transmits (broadcasts) an entry permission frame indicating entry permission to the audio network system for the target processor to all of the processors whose presence have been confirmed in the audio network, and switches the selectors on the side on which the target processor is connected, to the transmission and reception I/Fs side to release the loopback of the audio transport frame. The target processor which has received the entry permission frame also switches the selectors on the side on which the master node is connected, to the transmission and reception I/Fs side to release the loopback. The transmitted entry permission frame is reported to a plurality of processors constituting the audio network in sequence, and the processors which have been notified of the entry permission frame register, into the respective topology tables, the incorporation of the target processor into the system With the above, the master node B can incorporate the adjacent processors A and C into the audio network system as nodes to produce the state shown at (b) in FIG. 12. Note that it is not essential to incorporate the processors on both adjacent sides in synchronization.

Since the processor A is the processor at the end of cascade, the incorporation on this side is completed with the above incorporation, but the processor C has a processor connected thereto ahead, so that the processor is incorporated as a target processor.

As a substitute for the master node, automatically according to the presence of an adjacent unincorporated processor or according to the instruction from the master node B, the processor C transmits a connection possibility confirmation frame to the processor D (target processor) and receives the connection possibility response frame, and transfers the response contents to the master node B. In this event, the processor C transmits/receives the connection possibility confirmation frame to/from the processor D to measure its transport delay time, and also transfers its result to the master node B. Note that in place of the processor C serving as a substitute, the master node B may send the connection possibility confirmation frame to the processor D via the processor C and receive the connection possibility response frame from the processor D via the processor C.

The master node B confirms from the delay time information that even though the processor that returns the response indicating that the processor can be incorporated into the system would be added to the system, the audio transport frame can circulate through all of the nodes in the system within the predetermined upper-limit time according to the currently periodic update value k. If it is judged that the audio transport frame cannot circulate, the periodic update value k is repeatedly incremented until the master node B confirms that or it is judged that the incorporation is impossible when the value k is reached to the maximum number, but the master node B still confirms that the audio transport frame can't circulate through all of the nodes within the predetermined upper-limit time according the value k.

When the circulation can be confirmed, the master node B transmits to all of the processors the entry permission frame indicating that the processor D as the target processor is permitted to enter the audio network system.

The processor C which has received the entry permission frame transfers the entry permission frame to the adjacent processor D and switches the selectors on the side on which the processor D is connected, to the transmission and reception I/Fs side to release the loopback of the audio transport frame. The processor D which has received the entry permission frame also transfers the entry permission frame to the adjacent processor E and switches the selectors on the side on which the processor C is connected, to the transmission and reception I/Fs side to release the loopback. The processors which have received the entry permission frame register, into the respective topology tables, the incorporation of the target processor into the system.

With the above, the master node B can incorporate the processor D into the audio network system as a node to produce the state shown at (c) in FIG. 12.

When the processors E and F are then incorporated into the audio network system one by one as in the same manner to produce the state shown at (d) in FIG. 12, all of the processors registered in the topology table are incorporated in the audio network system, so the master node ends the incorporation processing.

As described above, when the master node B judges that if a newly found node is added, the audio transport frame becomes unable to circulate through all of the nodes in the system within the predetermined upper-limit time corresponding to the upper limit of the periodic update value k, the master node B ends the incorporation of the newly found node even before incorporating all of the processors registered in the topology table. In this case, the processor which has not been incorporated into the audio network system will remain outside the system (it may be incorporated afterward if the number of nodes in the system is decreased because of some reasons).

In any case, after ending the processing of incorporating the processor, the master node instructs the nodes in the audio network system to start the audio transport mode to circulate the audio transport frame (S17) and starts generation and transmission of the audio transport frame (S18) as shown in FIG. 7.

With the above, the initial audio network system is automatically formed. In this audio network system, the transport of the audio transport frame is looped back at the nodes at both ends and the transport of the audio transport frame is not looped back at the other nodes, whereby a loop transmission route among the nodes constituting the system can be formed to circulate the audio transport frame through the transmission route in a fixed period. Thereafter, the circulation of the audio transport frame between the nodes is continued until the audio network system stops, regardless of the presence or absence of the waveform data and the control data to be transported. In such a state in which the circulation of the audio transport frame is actually performed, the audio network system shall be in the audio transport mode as a whole.

One of features of this embodiment is that the transport of the audio transport frame can be continued even when a node is incorporated to the system and starts the operation as a part of the transmission route or a part of the transmission route in the system is broken at any time, and this point will be described hereinafter.

2.2 Operation to Newly Add a Node

Figure 13:
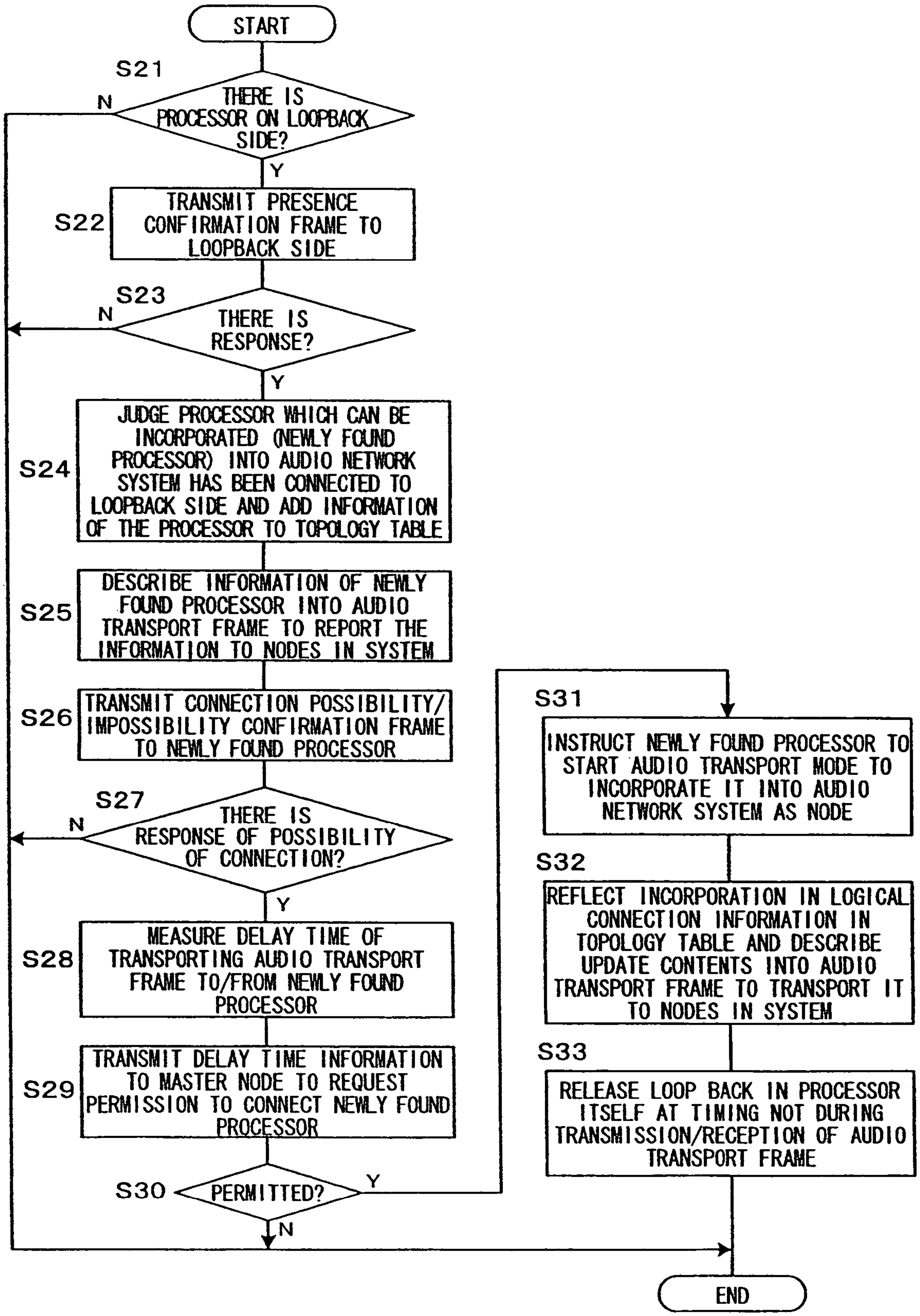
FIG. 13 is a flowchart of processing to newly add a node to the system, periodically executed in a predetermined period by the nodes at both ends in the audio network system that is an embodiment of the invention.

FIG. 13 shows a flowchart of processing to newly add a node to the system, periodically executed by the nodes at both ends in a predetermined period in the audio network system in this embodiment.

The nodes at both ends among the nodes constituting the audio network system formed as described above, that is, the nodes performing the loopback the audio transport frame periodically perform the processing shown in the flowchart in FIG. 13, as a master node if that node is the master node or as a substitute for the master node if that node is not the master node. This processing is performed by the control circuit 41 in the network I/F card 215.

In this processing, the control circuit 41 first judges whether or not a processor is connected on the side where the audio transport frame is looped back (the side where the selectors select the loopback line) (S21). This judgment can be performed based on the presence or absence of connection of communication cables to the transmission and reception I/Fs, the presence or absence of the network clock to be extracted, or the like as in the case of the start-up time.

If a processor is connected, the control circuit 41 transmits the presence confirmation frame to the loopback side (S22). The configuration of the presence confirmation frame may be the same as that shown in FIG. 9, and preferably has the information of the topology table as a “confirmed connection state.” If the processor at the transmission destination is a processor which can be incorporated into the audio network system, the processor returns the presence confirmation response frame as in the case of the processing at the start-up time. When the control circuit 41 newly confirms the presence of a processor (call it a newly found processor) based on the response, that processor is generally expected to be in the “detection mode,” and updates the topology table of its own based on the information of the received presence confirmation frame.

The control circuit 41 executing the processing in FIG. 13 judges that a processor which can be incorporated into the system has been connected to the loopback side when there is a response to the presence confirmation frame (S23), and adds information of the newly found processor to the topology table (S24). The information to be added can be acquired from the presence confirmation response frame. The control circuit 41 describes the information of the newly found processor into the audio transport frame as the network configuration information to report the information to the nodes in the audio network system to which the node itself belongs (S25). The nodes which have received the information update their own topology tables according to the contents.

Since the newly found processor that has not yet been incorporated in another system is in the “construction mode” at this moment, the control circuit 41 transmits the connection possibility/impossibility confirmation frame to that processor as a target processor (S26). This frame may be the same as that is used for the incorporation processing at the time of newly forming a system described using FIG. 12.

The processor that returns the presence confirmation response frame and has not yet been incorporated in another system is generally in the state capable to be incorporated into the system. Thus, the processor in that condition would return the connection possibility response frame indicating that the processor can be incorporated into the system responding to the connection possibility confirmation frame. With this response (S27), the control circuit 41 performs operation for incorporating the newly found processor into the audio network system to which the node itself belongs.

As the operation, the control circuit 41 first transmits/receives the delay time confirmation frame to/from the newly found processor to measure how much transport delay occurs when transporting the audio transport frame between the processors (S28), and transfers the information of the delay time to the master node to request permission to connect the newly found processor (S29). The data transmission/reception to/from the master node is performed by describing data into the IP packet region of the circulating audio transport frame. This processing also includes meaning of notifying the master node of incorporating the newly found node into the system, and thus the control circuit 41 functions as a connection notifying device in this processing.

On the other hand, the master node confirms whether or not the audio transport frame can circulate through all of the nodes in the system within the predetermined upper-limit time according to the periodic update value k at that time point even though the target processor that returns the response indicating that the processor can be incorporated into the system is add to the system. If the master node confirms that the frame can circulate, the master node generates the entry permission frame indicating entry permission and transports it to the nodes in the system by writing it into the IP packet region of the audio transport frame. If the master node confirms that the audio transport frame cannot circulate within the predetermined upper-limit time, the master node increments the periodic update value k until the master node confirms that the circulation becomes possible and changes the style of the generation of the audio transport frame. The bigger the periodic update value k becomes, from the older frame the master node generates the new audio transport frame. If the master node confirm that the circulation is possible then transmits the entry permission frame, but the master node does not transmit the entry permission frame when the master nodes confirms that the circulation is still impossible even though the periodic update value k reaches its maximum value.

The control circuit 41 which has received the entry permission frame in the audio transport frame (S30) transmits the entry permission frame to the newly found processor (a target processor) to instruct it to start the audio transport mode (S31). The control circuit 41 also registers the system ID of the system as the system incorporation information of the target processor into the topology table, and describes the information indicating that the target processor has been incorporated, into the IP packet region of the audio transport frame to report it to the nodes in the system (S32). The nodes received the information update their own topology tables according to the contents.

The newly found processor, when receiving the entry permission frame, starts the operation to circulate the audio transport frame and switches the selectors on the side on which the processor is connected to the instructing source executing the processing in FIG. 13 to the transmission and reception I/Fs side to release the loopback of the audio transport frame.

In the processor on the instructing source (executing the processing in FIG. 13), in order not to break the audio transport frame which is under reception or transmission at that time, the selectors on the side on which the processor is connected to the newly found processor are switched to the transmission and reception I/Fs side at a timing not during the transmission/reception of the audio transport frame, that is, from the completion of transmission of a certain frame to start of reception of the next frame, to thereby release the loopback of the audio transport frame (S33) and ends the processing.

In the processing at the above-described Step S28 to Step S33, the control circuit 41 functions as a change instructing device and a transmission route forming device.

If there is no processor on the loopback side at Step S21, the processing thereafter is unnecessary, so then the control circuit 41 ends the processing.

If there is no response within the predetermined time at Step S23, the control circuit 41 judges that the connected processor is a processor which does not have the function relating to transport of the audio transport frame and cannot be incorporated into the audio network system, and then the control circuit 41 ends the processing.

When receiving the connection possibility response frame indicating that the connected processor can't be incorporated into the system or when receiving no response indicating that the connected processor can be incorporated into the system within the predetermined time at Step S27, the control circuit 41 judges that the newly found processor cannot be incorporated into the audio network system for some reason, and then ends the processing.

When receiving no entry permission frame within the predetermined time at Step S30, the control circuit 41 judges that connection has not been permitted, and then ends the processing.

Note that even if the judgment is "No" at Step S27 or S30, the situation of the formed system and the processor can be changed, so the processing in FIG. 13 is periodically executed. In this case, since the presence confirmation has been completed, the processing at Steps S21 to S25 may be omitted and the control circuit 41 executes the processes beginning from Step S26.

With the above-described processing, when a processor is newly connected to the node at the end of the audio network system which has already been in operation, the newly connected processor can be automatically detected and incorporated into the audio network system to cause the audio transport frame to circulate through the transmission route including the incorporated processor. In this case, the audio transport frame is never lost.

Although the processing example in which the master node intensively judges the possibility of incorporation of the newly cascaded node has been shown here, the node at the end may have delay time information between the nodes and have the authority to judge the possibility of incorporation of the newly cascaded node. In this case, after the node having the authority confirm the capability of adding the newly cascaded node, then the newly cascaded node is incorporated, and the node which had the authority notifies afterward the master node that the newly connected node has been incorporated in the system.

Incidentally, from the standpoint of the "newly found processor" shown in FIG. 13, the newly found processor can grasp its own state but cannot grasp whether the adjacent processor next to the newly found processor is executing the processing at the start-up as shown in FIG. 7 or executing the processing relating to newly add the newly found node into the system as shown in FIG. 13, until the newly found processor receives the presence confirmation frame or the presence confirmation response frame from the adjacent processor and analyzes its contents of the received frame, but the processing on the newly found processor side is the same in either case, so there is no problem.

More specifically, each of the processors performs, according to its own state, the processing at the start-up when the processor has not been incorporated into the audio network system, or performs the processing to newly add the newly found node when the processor has been incorporated. In either case, the processor might receive the presence confirmation frame and the connection possibility confirmation frame from the adjacent processor, and it returns a response when receiving these frames.

In this event, concerning to the presence confirmation frame and its response, the newly cascaded processor transmits or receives the frames irrespective of the state of its own and the adjacent processor, but concerning to the connection possibility confirmation frame and its response, the newly cascaded processor preferably changes the way to transmit or receive the frames depending on the state of its own and the adjacent processor. This is to prevent the following possibility: in the case where processors which have already been incorporated into different audio network systems are newly connected, if the connected processors are incorporated into the audio network systems by the processing in FIG. 13, both of the systems could not operate normally.

Hence, the processor which has been already incorporated in an audio network system is designed to return the connection possibility response frame indicating that the processor can't be incorporated into another system when the processor receives the connection possibility confirmation frame from the node at the end of the another system. Further, when the processor has been identified to be incorporated in the different system in some way, it could be judged that the incorporated processor is "unconnectable" before transmitting the connection possibility confirmation frame thereto.

In summary, the processor which has detected another processor on the loopback side preferably performs the operation shown in Table 3.

TABLE 3

| System Incorporation: Own Processor | System Incorporation: Adjacent Processor | Transmission of Presence Confirmation Frame | Transmission of Presence Confirmation Response Frame (Response to Presence Confirmation) | Transmission of Connection possibility Confirmation Frame | Transmission of Connection Confirmation Response Frame (Response to Connection possibility Confirmation) |
|---|---|---|---|---|---|
| Unincorporated | Unincorporated | Transmit by Processing In FIG. 7 | Transmit | Transmit under Instruction from Master | Transmit Response Indicating Connection is Possible |
| Unincorporated | Incorporated | Transmit by Processing In FIG. 7 | Transmit | Not Transmit | Transmit Response Indicating Connection is Possible |
| Incorporated | Unincorporated | Transmit by Processing In FIG. 13 | Transmit | Transmit by Processing in FIG. 13 | Transmit Response Indicating Connection is Impossible |
| Incorporated | Incorporated | Transmit by Processing In FIG. 13 | Transmit | Not Transmit | Transmit Response Indicating Connection is Impossible |

2.3 Operation at Disconnection of Transmission Route

Next, the operation when the disconnection of the connection between the nodes occurs in the audio network system will be described.

In the audio network system, each node, when detecting that the connection with its adjacent node has been disconnected, switches the selection of the selectors on the side on which it detects the disconnection to the loopback line side to start loopback of the transport of the audio transport frame. More specifically, even if a node transmit an audio transport frame to the adjacent node the audio transport frame is transmitted to the adjacent node in the state where a transmission line between the nodes and the connection with the adjacent node is disconnected, the transmitted audio transport frame is merely lost, and therefore the nodes behind the disconnected point are removed from the system so that the remaining nodes form a new transmission route to continue the circulation of the audio transport frame.

The node may set the loopback to form the new transmission route immediately after the detection of the disconnection. However, if the node sets the loopback while the node transmits the audio transport frame, the audio transport frame will be divided in the middle and the divided frame will be sent out to the transmission route. Hence, even if the node detects the disconnection, the node preferably continues to transmit the audio transport frame to its tail if possible, and then sets the loopback before receiving the next audio transport frame. In this case, the transmitted audio transport frame will not be received by any processor and thus lost. However, even if the audio transport frame is lost, its effect exerted on the generation of the audio transport frame thereafter by the master node is slight as described later.

Figure 14:
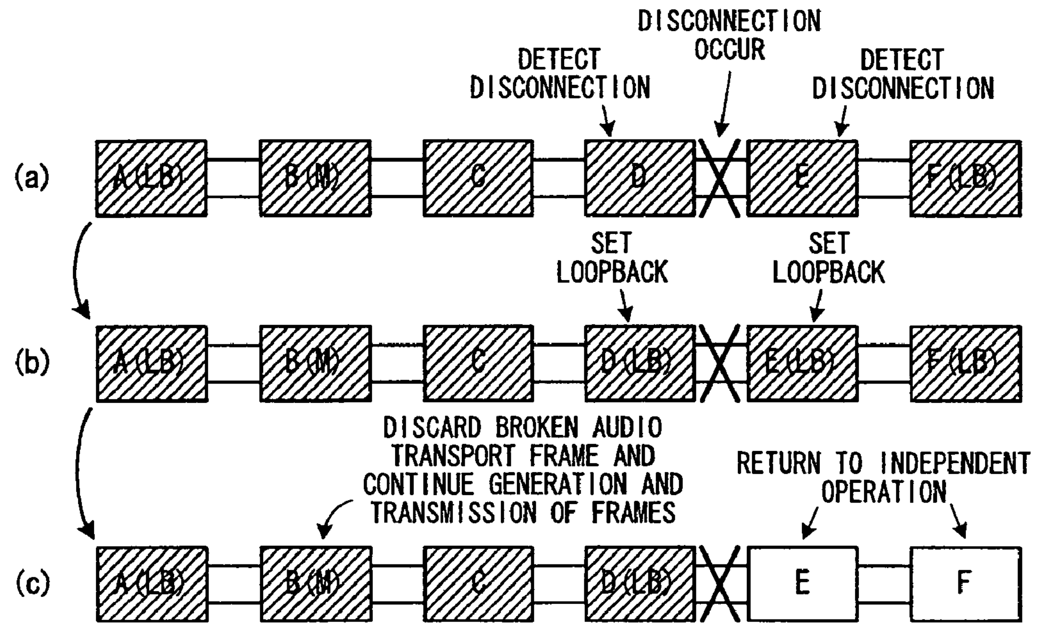
FIG. 14 is an illustration, corresponding to FIG. 12, showing an example of the procedure of changing the system configuration at the time of disconnection in the audio network system.

FIG. 14 shows an example of a procedure of changing the system configuration at the time of disconnection. The meaning of hatchings, “M” and “LB” are the same as those in FIG. 12.

This drawing shows an example when the wire between the nodes is disconnected. Examples of disconnection include the case when the communication cable is removed from the node and the case when the transmission or reception to/from the audio network becomes impossible because of failure at any one of the nodes, as well as the case when the communication itself is physically disconnected.

When the wire of both direction is disconnected, at a point between two nodes in the system, each of the two nodes can’t receive the signal of the audio transport frame from the other node or can’t extract the network clock on the side of the disconnection point hence, each of the two node detects that the disconnection has occurred and transmits (broadcasts) a disconnection report frame indicating the detection of the disconnection to the both side of the node. On the other hand, when the wire of only one direction is disconnected at a point between two nodes in the system but the wire of the other direction remains, only one of the two nodes which has been receiving the audio transmission frame via the disconnected wire can’t receive the signal of the audio transport frame from the other node or can’t extract the network clock, hence, the only one node detects that the disconnection has occurred and transmits (broadcasts) the disconnection report frame to the both side of the node. The other node receives the disconnection report frame from the only one node and recognizes (detects) that the disconnection has occurred. Thus, even when the disconnection is detected only on one side of the disconnection point, the disconnection is reported to the other side so that the nodes on both sides can recognize the disconnection ((a) in FIG. 14).

The node which has detected the disconnection sets the loopback to the side on which the disconnection has been detected as shown at (b) in FIG. 14. As shown in the drawing, for example, a transmission route to circulate the audio transport frame in the nodes A to D is formed by setting the loopback in the node D and a transmission route to circulate the audio transport frame in the nodes E and F is formed by setting the loopback in the node E. In this case, the control circuit 41 of the node which has detected the disconnection functions as a change instructing device and a transmission route forming device.

Note that the audio transport frame would be divided in the middle by the disconnection depending on the timing and the divided frame then circulates through the transmission route formed in the nodes still connected each other in the audio network system. However, the disconnection report frame is transferred to chase the broken audio transport frame, so that each node that has received the broken audio transport frame can receive the disconnection report frame immediately thereafter to thereby judge that the disconnection has occurred at the point indicated by the disconnection report frame and not along the cable on the reception side of that node.

On the other hand, as shown at (c) in FIG. 14, the master node continues to generates and transmit the new audio transport frame irrespective of change of the transmission route by the disconnection, while discarding the audio transport frame broken by the disconnection. Accordingly, the audio transport frame is periodically transported even after the occurrence of the disconnection, through the transmission route formed in the nodes A to D, so that the transport of the waveform data and the control data is continued within the nodes where the new transmission route is formed.

However, no new audio transport frame is generated on the side of the node E and the node F where the master node does not exist. When receiving no new audio transport frame for a certain period, the node E and the node F judge that they have been separated (removed) from the audio network system and switch the selectors on both side to the loopback line side to stop the operation in the audio transport mode.

Thereafter, the processor may automatically perform the processing at Step S14 and subsequent thereto shown in FIG. 7 to configure the audio network system again within a possible range, or may continue the operation by itself and wait for a connection request from another processor. In the latter case, when the disconnected wire is recovered, the node E and the node F can be incorporated into the system in sequence by the processing shown in FIG. 13.

Note that if the disconnection occurs when the head of the audio transport frame is located at the node E or the node F, the audio transport frame may continue to circulate between the nodes E and the node F forever without any measure taken against that. Hence, to avoid such a situation, it is preferable for the node to confirm the frame serial number at the reception of the audio transport frame, and to discard the audio transport frame without looping back it when receiving the audio transport frame with the same serial number twice.

Figure 15:
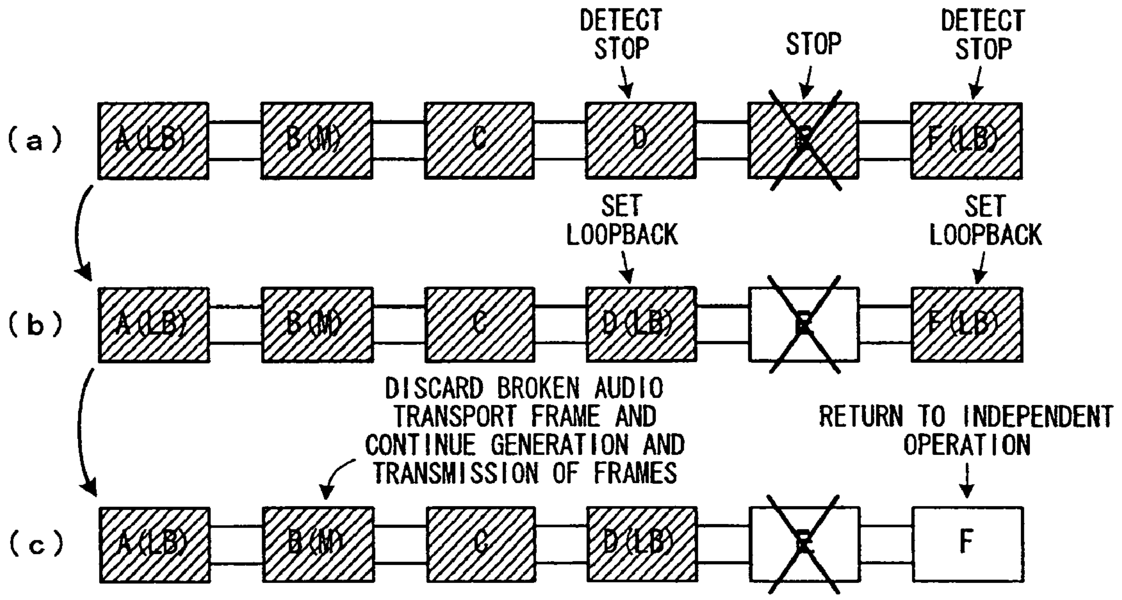
FIG. 15 is an illustration showing another example thereof.

FIG. 15 shows another example of a procedure of changing the system configuration at the time of disconnection.

This figure shows an example where an operation of a node stops in the system. Besides the change in the wire connection, the transmission route would be reconstructed when a node stops to operate because the power supply is suddenly shut down or the like. Also in this case, each of the two nodes on both sides of the stopped node becomes unable to detect the network clock from the stopped nodes, and detects the disconnection of the transmission route as shown at (a) in FIG. 15. The nodes (D, F) adjacent to the stopped node cannot distinguish the stop of the node from the disconnection of the wire, but have no problem because the countermeasure processing against them are also the same.

More specifically, as shown at (b) and (c) in FIG. 15, the node which has detected the disconnection of the transmission route sets the loopback to the side where the disconnection has been detected, and the master node discards the audio transport frame broken at the occurrence of disconnection and continues the generation and transmission of a new audio transport frame as in the case of FIG. 14. This allows the audio transport frame to be transported even after the occurrence of disconnection, through the transmission route on the side where the master node exists, so that the transport of the waveform data and the control data can be continued within the nodes on the side where the new transmission route is formed.

Note that, even if the functions in each node do not wholly stop, each node sometimes becomes unable to normally read/write data from/to the audio transport frame because of hang-up of the control circuit 41 or the like. If the node in such a situation continue to transport the audio transport frame, the data in the audio transport frame is not guaranteed. Therefore, a node in the system is brought into such a situation, and the system could detect some side effect of that, the system should execute the configuration change as shown in FIG. 15.

However, if the network I/F card 215 normally operates, the network clock is transmitted irrespective of whether or not the data is normally read from or written into the audio transport frame, therefore the detection of the network clock is solely not enough to guarantee the sanity of the node.

Hence, the control circuit 41 of each node preferably writes presence information indicating that the own node is normally operating (present) into a region of the network configuration information of the audio transport frame to be transmitted and transmits it as shown in FIG. 27, and reads the presence information of the adjacent node from the region of the network configuration information of the received audio transport frame as shown in FIG. 26 to confirm the state of the adjacent node based on the presence information. For example, the presence information includes a node (Identification) value of the node and a change value that varies according to a predetermined rule frame by frame.

This configuration makes the control circuit 41 possible to judge that the ability of reading/writing data from/to the audio transport frame in the processor at the transmission source has been lost, when the presence information of the transmission source cannot be confirmed. When a plurality of nodes are connected adjacent to a certain node via a network hub or the like and an audio transport frame is transmitted from one of the nodes that is not in the same audio network system, the control circuit 41 of the certain node can judge that the audio transport frame is not of the same audio network system to which the certain node belongs and appropriately ignore it.

In consideration of the possibility of occurrence of accidental data error, the control circuit 41 may judge that an abnormal condition has occurred only when it could not confirm the presence information about a predetermined number of audio transport frames. In using the presence information for the confirmation, it is preferable that both the first and the second data input/output sections 10 and 20 writes the own presence information into the audio transport frame to be transmitted and reads the presence information of the adjacent node in the received audio transport frame to confirm the adjacent node. This allows for confirmation of the state of the transmission source as regards both of the transfer directions.

The arrangement (topology) of the processors cascaded in series is changed by a disconnection of the wire or a stop of a node, and therefore, when a node in the audio network system detect the change, the node transmits the disconnection report frame and each node in the system changes the contents of its own topology table according to the received disconnection report frame.

FIG. 16 shows, in the same form as that of FIG. 11, a procedure of changing the topology table in the case of the example shown in FIG. 14.

As shown in the drawing, the node which has detected the disconnection of wire deletes the presence information of the processor behind the disconnection point from the topology table and transfers (broadcasts) a disconnection report frame indicating that disconnection has occurred and the node becomes unable to communicate with the nodes behind the disconnection point (indicating "D absent" and "E absent" in the figure), to the nodes on the other side where no disconnection occurs.

Each of the nodes which has received the disconnection report frame from the node on one side also deletes the presence information of the processors connected behind the disconnection point from its topology table, and transfers the disconnection report frame to the next node on the other side.

The transfer of the disconnection report frame is performed among nodes on both sides of the disconnection point and each node transmits the disconnection report frame at a timing of not transmitting the audio transport frame.

With the above, even when a disconnection of wire or a stop of a node occurs, the contents of the topology table in each node can be quickly corrected to match the current situation.

3. Reading/Writing Data from/to Audio Transport Frame 3.1 Generation of Audio Transport Frame Next, the generation of the audio transport frame in the master node will be described.

As has been described, only the master generates a new (with different serial number) audio transport frame in the audio network system in this embodiment. The master node generates the new audio transport frame by processing part of data of the audio transport frame transmitted by itself and returned thereto after circulating through the transmission route.

The processing of the returned frame to generate the new frame includes updating the header and the management data (including the serial number) in the returned frame and writing the waveform data, the control data and the like to be transmitted by the master node into the returned frame, whereas the waveform data and the control data written by other nodes in the returned frame are left in the new audio transport frame as they are.

However, in the case when employing such a generation method, if the master node generates a new audio transport frame without confirming the error in the returned audio transport frame, a large noise might be included in the waveform data to be transported. Hence, the master node in this embodiment stores once the whole audio transport frame returned thereto after circulating once through the transmission route, and confirms that it normally receives the whole audio transport frame before generating a new audio transport frame based on that audio transport frame.

When the master node could not receive the audio transport frame, the new audio transport frame should be generated based on another audio transport frame. Hence, the latest one of the audio transport frames which were normally received is stored as the another frame separately from the one for transmission/reception, if an audio transport frame is not normally received, a new audio transport frame is generated based on the stored audio transport frame, instead of the abnormally received frame.

For this end, in the master node, the frame buffer 16 in the data input/output section for generating the audio transport frame is composed of a plurality of buffers as shown in FIG. 17, and the function of a "transmission buffer (and storing buffer)" or a "reception buffer" is assigned to each buffer. In the frame buffer 16, (k+1) pieces of buffers larger than the periodic update value k by 1 are necessary.

FIG. 18 shows a timing example of transmitting/receiving and generating the audio transport frame in the master node. In this drawing, S is an integer number and represents the number indicating a period of the wordclock. This S is used also as a frame number indicating the audio transport frame transmitted by the master node in the S-th period.

The maser node transmits one audio transport frame in each sampling period as has been described using FIG. 3 and FIG. 4. The head of the transmitted audio transport frame circulates through the system in about one sampling period when the periodic update value k is "2." In many cases, as shown in FIG. 18, the transmission of the (S+1)-th audio transport frame should be started before the reception of the whole S-th audio transport frame is completed. The whole S-th audio transport frame is received by the timing earlier by a predetermined time a than the start of transmission of the (S+2)-th audio transport frame.

The upper-limit time, within which the audio transport frame has to circulate through the audio transmission route in the system, can be changed by the periodic update value k. Accordingly, when the audio transport frame cannot circulate within the time limit, the master node increments the periodic update value k to lengthen the upper-limit time. In the above example, when the reception of the audio transport frame cannot be completed within "time shorter by the predetermined time $\alpha$ than 2 sampling periods" as the predetermined upper-limit time corresponding to the periodic update value "2," the periodic update value k is incremented by 1 to be "3" if the upper limit of the periodic update value k is not "2" so that the corresponding predetermined upper-limit time becomes "time shorter by the predetermined time $\alpha$ than 3 sampling periods."

The predetermined upper-limit time is calculated here by the equation:

$$(\text{Predetermined Upper-Limit Time})=(\text{Sampling Period})\times(\text{Periodic Update Value } k)-(\text{Predetermined Time } \alpha)$$

Inversely, when the periodic update value k is constant, the master node is supposed to complete the reception of the S-th audio transport frame within a time of (sampling period)×k−$\alpha$. Hence, the master node in this embodiment is configured to generate the (S+k)-th audio transport frame based on the S-th audio transport frame. FIG. 18 is a timing example when the periodic update value is "2" and a symbol X represents the time a required for the processing of generating it.

In this case, the master node transmits the S-th audio transport frame stored in the transmission buffer while the master node receives and stores (S−1)-th audio transport frame into the reception buffer partly in parallel with the transmission. In the frame buffer 16, the reception buffer is preferably a buffer next to the current transmission buffer. The master node reads data from the audio transport frame during the master node is storing the frame into the reception buffer, or after the master node finishes the storing. Upon completion of reception of the (S−1)-th audio transport frame, the master node performs check for error of the received audio transport frame and designates that reception buffer as the next transmission buffer and the buffer next to the designated transmission buffer (the current reception buffer) as the next reception buffer if the received audio transport frame has no abnormality. The master node processes the (S−1)-th audio transport frame stored in the next transmission buffer to generate the (S+1)-th audio transport frame.

Further, since the S-th audio transport frame will return in a short time, the master node changes the prepared next buffer to the reception buffer to start storing the received S-th audio transport frame. Subsequently, when master node completes transmitting the S-th audio transport frame in the transmission buffer, the master node frees up the transmission buffer.

At the start timing of the next wordclock, the master node changes the prepared next buffer to the transmission buffer and starts transmission of the (S+1)-th audio transport frame stored therein. Upon completion of reception of the S-th audio transport frame, the master node then performs error check of the received S-th audio transport frame and designates the reception buffer storing the S-th audio transport frame as the next transmission buffer and the buffer next to the designated transmission buffer (the current reception buffer) as the next reception buffer if the received audio transport frame has no abnormality. The master node processes the S-th audio transport frame stored in the next transmission buffer to generate the (S+2)-th audio transport frame.

By repeating the above procedure, a new audio transport frame is generated at all times based on the audio transport frame which is judged as normal as a whole.

The first and second audio transport frames are preferably generated based on a predetermined model because there is no audio transport frame as a base.

Instead of processing the audio transport frame in the frame buffer, the master node may read the audio transport frame from the frame buffer at the output time, and output the header and the contents of the read audio transport frame while replacing them with the data from the waveform outputting FIFO and the control outputting FIFO and the like as in the case of the slave mode. In this variation, the number of buffers required is also (k+1), though the transmission buffer stores not the audio transport frame to be transmit but the audio transport frame received by the node.

By doubling the operation speed of each buffer and designing the buffer such that it can receive while transmitting, the "transmission buffer" at a certain timing when the audio transport frame returns to the master node can be used as the "reception buffer", consequently the number of buffers can be reduced to k that is smaller by one than that of the above-described embodiment.

FIG. 19 shows a timing of transmitting/receiving and generating the audio transport frame in the master node when the S-th audio transport frame and frames subsequent thereto aren't normally received. The case where they aren't normally received means the case where the audio transport frame is broken halfway or the case where reception has been completed but the audio transport frame is judged as abnormal by the error check.

In this case, if the master node generates the (S+2)-th audio transport frame based on the abnormal S-th audio transport frame, each of the waveform data in the audio transport frame loses the consecutiveness of the samples in time domain and may cause noise. Hence, the master node detected that the audio transport frame has not been normally received discards the audio transport frame in the reception buffer, and designates the buffer as the next reception buffer and designates the transmission buffer at that time as the next transmission buffer. At that time, the transmission buffer is still transmitting, so the generation of a new audio transport frame is performed after completion of the transmission. Namely, after the master node completes transmitting the (S+1)-th audio transport frame, the master node processes the S+1-th audio transport frame (which includes data of the (S−1)-th audio transport frame normally received in the past) stored in the next transmission buffer to generate the (S+2)-th audio transport frame.

When the master node detects that normally receive the next (S+1)-th audio transport frame hasn't been received normally either, the master node designates the transmission buffer as the next transmission buffer again when generating the (S+3)-th audio transport frame, and after the master node completes transmitting the (S+2)-th audio transport frame, the master node generates the (S+3)-th audio transport frame based on the (S+2)-th audio transport frame (which includes data of the (S−1)-th audio transport frame) stored in the transmission buffer. In the same way, the master node repeatedly uses the same buffer as the transmission buffer to generate a new audio transport frame until it normally receives the audio transport frame.

FIG. 20 and FIG. 21 respectively show data described in each audio transport frame to be transmitted/received by the master node for the case where the periodic update value k is "2" shown in FIG. 18 and FIG. 19.

As has been described, the generation of the new audio transport frame is performed by the master node includes writing the header, the management data, and the data (the waveform data and/or the control data) to be transmitted by the master node into the audio transport frame stored in the transmission buffer as a base and leaving the other data (the waveform data and/or the control data written by the other nodes) in the audio transport frame as it is. Each of the slave nodes in the system writes the waveform data and/or the control data to be transmitted by each slave node into the audio transport frame during the transport frame circulates through the transmission route in the system, and the audio transport frame including those data returns to the master node.

Accordingly, as shown in FIG. 20, in the condition where the transmission/reception of the audio transport frame is normally performed, for example, the master node writes the latest data (the waveform data and/or the control data) in the (S+1)-th (sampling) period into a portion of the (S+1)-th audio transport frame, while leaving data in the (S−1)-th period that is 2 sampling periods before written by the slave node in the other portion, and transmits the (S+1)-th audio transport frame to the transmission route. When the master node receives the (S+1)-th audio transport frame after circulating through the audio transmission route, the whole data in the (S+1)-th audio transport frame has been rewritten with the latest data in the (S+1)-th period.

Comparing the data in the audio transport frame transmitted by the master node in the consecutive periods each other, it is found that each of the data proceeds 1 sampling period frame by frame although the data of the portion written by the slave node and the data of the portion written by the master node have a deviation by 2 sampling periods therebetween.

On the other hand, in a similar comparison about FIG. 21, the data of the portion to be written by the slave node in the audio transport frame transmitted by the master node is the same frame by frame as long as the abnormality continues, but the data of the portion to be written by the master node is at all times the latest data.

Accordingly, for example, considering the waveform data, even if an abnormality occurs in the audio transport frame, the waveform data received by each node is one just having a value held at that time point. Accordingly, even if the waveform data is used for audio output, a large abnormal noise is not generated. Note that when the direct-current contained in the held waveform data causes a trouble in a power amplifier, a speaker, or etc. at the subsequent stage, it is only necessary to gradually attenuate the value of the waveform data to be closer to zero frame by frame instead of holding the value of the waveform data.

When the processing of the audio transport frame in the frame buffer 16 is not performed but the audio transport frame read from the buffer 16 is outputted while being processed, the data of the received audio transport frame is stored as it is in the transmission buffer which has completed transmission. As seen from FIG. 21, for example, when the (S+2)-th audio transport frame is generated, an audio transport frame with the same contents can be generated by the same processing even if it is generated either based on the (S+1)-th audio transport frame during transmission (or already transmitted) or based on the (S−1)-th audio transport frame which is the base of that audio transport frame. In other words, by replacing a portion of the (S−1)-th audio transport frame read from the transmission buffer with the data in the (S+2)-th period, the audio transport frame with the contents shown at "S+2 transmission" in FIG. 21 can be outputted from the master node.

Next, FIG. 22 shows a flowchart of processing executed when the master node detects the completion of reception of the S-th audio transport frame, to realize the operations shown in FIG. 18 and FIG. 19 in the master node. This processing is executed by the control circuit 41 of the network I/F card 215 and the first data input/output section 10 in cooperation.

When detecting that the writing (reception) of the S-th audio transport frame into the frame buffer 16 has been completed, the control circuit 41 and the first data input/output section 10 start the processing shown in FIG. 22. They detect whether the audio transport frame has been normally received or not, more specifically whether there is an error or not in the audio transport frame whose reception has been completed by checking the length of the audio transport frame, the frame serial number, the error check code, and the like (S41). If there is no error here (S42), the control circuit 41 and the first data input/output section 10 designate the current reception buffer as the next transmission buffer and the buffer next to the current reception buffer as the next reception buffer (S43), and update the header and the management data of the audio transport frame in the next transmission buffer to generate the (S+2)-th audio transport frame (S44).

On the other hand, if there is an error at Step S42, the control circuit 41 and the first data input/output section 10 designate the current reception buffer as the next reception buffer and the current transmission buffer as the next transmission buffer (S45), and wait for the completion of transmission of the (S+1)-th audio transport frame stored in the transmission buffer (S46) and update the header and the management data of that audio transport frame to generate the (S+2)-th audio transport frame (S47).

In the processing at Steps S44 and S47, the control circuit 41 and the first data input/output section 10 function as an audio transport frame generator.

In either case, they write various kinds of data that the master node should transmit to the other nodes into the generated audio transport frame, and append an error check code thereto (S48, S49).

Thereafter, they wait until the next wordclock timing (S50), and start output of the generated audio transport frame to the second transmission I/F 32 (in the case where the selector 35 selects the second transmission I/F 32) (S51) and end a series of processing. Note that the transmission of the audio transport frame from the master node is performed, as a new process other than the process shown in FIG. 22, by the second transmission I/F 32.

In the processing at Step S51, the first data input/output section 10 functions as a transmission controller.

By performing the above processing, the master node can generate a new audio transport frame based on the audio transport frame whose normal reception from its head to its tail has been confirmed, to thereby generate a correct audio transport frame at all times.

Since the master node generates the (S+2)-th audio transport frame based on the S-th audio transport frame, the master node can start to generate a new transport frame after confirming that the audio transport frame to be taken as a base of the new frame has been normally received from its head to its tail.

Note that the judgment in Step S42 is judgment to determine whether the master node generates an audio transport frame in the (S+2)-th period based on the audio transport frame in the S-th period or based on the past audio transport frame which has been normally received (or the later-described model for recovery). Hence, this judgment is not only judgment of whether or not the audio transport frame in the S-th period whose reception has been completed by the master node is normal or not, but also judgment of whether or not the audio transport frame in the S-th period has circulated normally along the loop transmission route.

Representative examples of "when the audio transport frame received by the master node has not circulated normally along the loop transmission route" that is the case in which Step S42 is NO in claims or description of this application include a case in which an FCS error occurs at any point after the audio transport frame is transmitted from the master node before it returns to the master node after circulating through the transmission route in the system and a case in which the audio transport frame transmitted from the master node does not return to the master node after circulating through the transmission route.

The function of the judging device in the master node corresponds to such processing in Step S42.

Further, the operation as has been described in relation with FIG. 18 to FIG. 22 is for the case when the periodic update value k is "2" and when the periodic update value k is a value greater than 2, the master node generates the (S+k)-th audio transport frame based on the S-th audio transport frame, and other than that point, the operation of the master node is basically same as the operation where the periodic update value k is "2".

More specifically, in the operation corresponding to the timing chart in FIG. 18, when the master node has completed normal reception of the S-th audio transport frame, it generates the (S+k)-th audio transport frame based on the S-th audio transport frame and starts transmission of the (S+k)-th audio transport frame at the timing of the (S+k)-th wordclock. In the operation corresponding to the timing chart in FIG. 19, when the master node could not normally receive the S-th audio transport frame, the master node waits for the completion of transmission of the (S+k−1)-th audio transport frame, and then generates the (S+k)-th audio transport frame based on. "the data of the audio transport frame which has normally received last" included in the (S+k−1)-th audio transport frame stored in the transmission buffer, and starts transmission of the (S+k)-th audio transport frame at the timing of the (S+k)-th wordclock.

In the processing corresponding to FIG. 22, the control circuit 41 and the first data input/output section 10 designate the S-th reception buffer storing the normally received S-th audio transport frame as the (S+k)-th transmission buffer which stores the audio transport frame to be transmitted at the timing of the (S+k)-th wordclock and the buffer next to that buffer as the next (S+1)-th reception buffer at Step S43, and process the S-th audio transport frame stored in the (S+k)-th transmission buffer to generate the (S+k)-th audio transport frame at Step S44.

At Step S45, they designate the S-th reception buffer storing the audio transport frame which could not been normally received as the (S+1)-th reception buffer, and the (S+k−1)-th transmission buffer as the (S+k)-th transmission buffer, and in response to the completion of transmission of the (S+k−1)-th transmission buffer (S46), process the (S+k−1)-th audio transport frame stored in the (S+k)-th transmission buffer at that time to generate the (S+k)-th audio transport frame at Step S47.

By incrementing the periodic update value k, the upper-limit time for circulation of the audio transport frame in the audio network system can be increased to correspondingly increase the distance between the nodes and increase the number of nodes to be incorporated into the system. However, there is tradeoff that the delay in transfer of the audio signals in the audio network increases corresponding to the increase in the periodic update value k.

3.2 Modification of Generation of Audio Transport Frame

Note that it is also conceivable to use a model of the audio transport frame instead of "the audio transport frame normally received last" to generate a new frame when the audio transport frame has not circulated normally through the transmission route, wherein a model for recovery is prepared in advance. When the master node detects that the master node has not normally received the S-th audio transport frame, the master node generates, based on the aforementioned model, the (S+k)-th audio transport frame that was to be generated based on the S-th audio transport frame.

FIG. 23 and FIG. 24 are charts corresponding to FIG. 19 and FIG. 21, respectively, showing a processing timing and contents of data in the audio transport frame configured as described above.

Employment of such a technique eliminates the need to designate the transmission buffer at a certain time as the next transmission buffer, thereby simplifying the management of a plurality of buffers in the master node.

As can been seen from FIG. 24, when the audio transport frame is generated from the model, the data of the model is left as it is in the portion of the audio transport frame into which the slave nodes will write data. Hence, the model is formed such that all bytes of the audio transport frame are "&HFF" (&H indicates a hexadecimal digit) and data ER indicating that the audio transport frame is derived from the model is written into the management data region. Each of the slave nodes can judge from the management data whether or not the received audio transport frame is derived from the model, and, when the slave node judges that the audio transport frame is derived from the model, the slave node further can judge whether or not the waveform data and the level data in the audio transport frame are derived from the model for each channel depending on whether or not the waveform data and the level data have all bytes of &HFF (for example, the 32-bits waveform data, having all bytes of &HFF, is &HFFFFFFFF or &B1111 . . . ("1"×32)), and processes the waveform data adequately according to the judgment.

FIG. 25 shows a flowchart of the processing corresponding to that in FIG. 22 when using the model.

In the drawing, the contents of the processing at the step with the same number as that in FIG. 22 are the same as those in FIG. 22, so only the difference points will be described.

First, in the processing shown in FIG. 25, irrespective of whether or not the S-th audio transport frame has been normally received, the current reception buffer is designated as the next transmission buffer and the buffer next to the current reception buffer is designated as the next reception buffer (S43), and the header and the management data in the audio transport frame in the next transmission buffer are updated to generate the (S+2)-th audio transport frame (S44). When the audio transport frame has been normally received (SA), "0" indicating that there was no error is written in the (S+2)-th audio transport frame as the value of the error flag ER (SB).

If the audio transport frame could not be normally received (SA), &HFF is set to all bytes in each region of the waveform data and the control data of the (S+2)-th audio transport frame in the next transmission buffer (SC). In the frame buffer, a dedicated circuit for setting all bits of these regions to 1 is provided and can set it in one or several operations clocks. Into the (S+2)-th audio transport frame, "1" indicating that there was an error is written as the value of the error flag ER (SD).

Note that the error flag ER is data to make the slave node possible to grasp whether the received audio transport frame is generated based on the previously received audio transport frame or generated based on the model, and is preferably written into a portion of the management data 102 close to the head. If the slave node grasps such a derivation of the audio transport frame from some other contents (for example, waveform data) of the model themselves as described above, the error flag ER could be eliminated from the audio transport frame.

3.3 Use of Data in Slave Node

As has been described using FIG. 4 and FIG. 6, each node operating in the audio transport mode in the audio network system reads the data to be processed by the node from the audio transport frame, and writes the data to be transmitted to the other nodes, into the audio transport frame.

Distinctively, in the audio network system in this embodiment, the nodes write data into an audio transport frame in turn while the audio transport frame transmitted from the master node circulates once through the transmission route. Accordingly, the contents even in the audio transport frame having the same serial number will be different depending on in which position on the transmission route the data is read. Specifically, for example, the data in the S-th period is written in a portion of the S-th audio transport frame when the data in the portion is to be written by a node at the upper stream of the node on the transmission route, and the data in the (S−2)-th period is written in the other portion of the S-th audio transport frame when the data in the other portion is to be written by a node at the lower stream of the node (see FIG. 20).

Therefore, a FIFO memory is prepared for each channel of the waveform data to be read in the waveform inputting FIFO 12 in each node, to delay the data written by the node which is located at the upper stream of the node to synchronize the period of the data with the period of the other data written by the other node which is located at the lower stream of the node, before supplying data to the audio bus I/O 39. The FIFO memories are not necessarily independent memory units, but a memory unit which operates as a plurality of ring buffers by controlling plural address sets comprising an address for reading and an address for reading and accessing the memory unit using the address sets.

Note that when the master node receives the S-th audio transport frame, the waveform data all in the S-th period should have been written therein (see FIG. 20), so with respect to the master node, such measures are not necessary.

FIG. 26 shows the condition of reading the waveform data and other data from the audio transport frame in the slave node with the delay different between portions as described above. This drawing shows an example of reading the waveform data in the node E when the system composed of six nodes A to F is operating in the state with the periodic update value k of "2" and the node B of them being the master node as shown at (d) in FIG. 12.

As has been described, the region for the waveform in the audio transport frame stores 256 channels of the waveform data, and the master node allocates, to each of the node, channels which each node writes the waveform data into. In FIG. 26, the region into which each node writes the waveform data is indicated by the symbol of that node.

In the case of this example, it is assumed that the audio transport frame is circulated rightward in the drawing, the nodes B, C, and D exist at the upper stream of the node E on the transmission route of the audio transport frame. Hence, the regions whose waveform data are rewritten with the latest ones (the data in the S-th period) at the upper stream of the node E until the audio transport frame reaches the node E are hatched to distinct them.

On the other hand, the node E reads the waveform data of the channels to be processed by the node E itself out of the waveform data in the audio transport frame and supplies the data to the audio bus I/O 39. Hence, the FIFO memory (FIFOs $1_{in}$ to $k_{in}$) is provided for each channel so that the waveform data read from the audio transport frame is written thereinto. In FIG. 26, the "SD" in each FIFO indicates the waveform data corresponding to one sample, and there are three values in parentheses, the first value indicates the node which has written the sample into the audio transport frame, the second value indicates a channel in the audio transmission frame that the sample is written in, and the third value indicates a period that the sample is in. The data on the upper side in each of the FIFO memories is data written later into the FIFO memory.

As shown in this drawing, the data to be written into the FIFO, even if they are read from the same S-th audio transport frame, include the data in the S-th period and the data in the (S−2)-th period. The node E determines each of the data written into the FIFOs is which of the two based on whether the data is derived from an upstream node or from a downstream node, and each of the nodes that writes the data in the audio transport frame is at the upper stream or the lower steam is grasped by referring to the topology table.

Hence, when supplying the data written into the FIFO memory to the audio bus I/O 39, the node E delays the data derived from the upstream node more by 2 sampling periods than the data derived from the downstream node. As a result, each of the FIFOs supplies the waveform data in a same period to the audio bus I/O 39 at the timing synchronized with the wordclock of the node E, irrespective of which node writes the waveform data in the audio transport frame.

Note that in consideration of the processing when the audio transport frame has not been normally delivered, the FIFO memory should perform delay by at least one sampling period to store the waveform data in the previous sampling period.

In other words, the storage (namely, 1 sample delay) makes the network I/F card 215 possible to supply the audio signals contained in the received audio transport frame to another card which is performing signal processing and the like in the node, after confirming that the audio transport frame has been normally received from its head to its tail. If the audio transport frame could not be normally received to its tail, for example, because the audio transport frame is broken halfway or the like, there are possible measures of discarding the waveform data read from the audio transport frame and written into the FIFO memory to prevent the abnormal data from being supplied to another card.

In such a case, by copying the waveform data in the previous period remaining in the FIFO memory and supplying it to signal processing in place of the discarded data, the signal processing can be continued using the waveform data that is flat (held) for a while as long as the abnormality continues, whereby the signal processing can be continued while avoiding the occurrence of a conspicuous noise.

Note that since there is no point to reuse the data in the previous period for the control data, the read data is preferably just discarded if the audio transport frame has not been normally received to its tail.

The presence information is information indicating that the adjacent node has the ability of reading/writing data as has been described.

Next, FIG. 27 shows the condition of writing the waveform data and other data corresponding to FIG. 26.

As shown in this drawing, since the timing never deviates for each channel in the waveform data outputted from the node itself, the node can write the waveform data in the S-th period into the S-th audio transport frame. In order to adjust the timing of writing into the audio transport frame, it is preferable to accumulate (stock), all the waveform data to be written into the audio transport frame into the FIFO memory before receiving the audio transport frame, but the delay could be shorten to one sampling period so that the waveform data as latest as possible can be written thereinto.

FIG. 27 shows the example in which the FIFO memory (FIFOs $1_{out}$ to $j_{out}$) is provided for each channel also on the writing side, but it is not necessary to change the delay amount for each channel, so a common FIFO may be provided for all channels.

Incidentally, as has been described in the "3.2 Modification of Generation of Audio Transport Frame," in the case where the model is used to recover the audio transport frame in the master node, even if the slave node has normally received the audio transport frame, the waveform data written in the audio transport frame is possibly inappropriate for the slave node to receive and process the data. In other words, in the portion into which no waveform data has been written in the audio transport frame upstream from the own node, the data of the model is left, and supply of that data for signal processing can be considered to cause a noise. Hence, it is preferable to determine whether or not the data of the model is left when receiving the audio transport frame, and to prevent the data from being supplied for signal processing if it is left.

FIG. 28 shows a flowchart of the processing executed by the data extracting unit 11 and the control circuit 41.

In the case of employing the processing shown in FIG. 28, when detecting the reception of the audio transport frame, the hardware of the data extracting unit 11 and the CPU of the control circuit 41 start that processing as the processing for writing the content of the received audio transport frame into the waveform inputting FIFO 12 in the slave node. Note that in this flowchart, illustration of the processing for writing the control data into the control inputting FIFO 14 is omitted.

In the processing in FIG. 28, the data extracting unit 11 first acquires a predetermined number of bytes of the received data of the audio transport frame (S61). If the acquired data is the waveform data of the channel from which the own node should read out (S62), the data extracting unit 11 writes the acquired data into an appropriate FIFO memory (S63). The processing is repeated until the processing for the audio transport frame to its tail is completed (S64). Note that when NO is judged at Step S62, the data extracting unit 11 proceeds to Step S64 without writing into the FIFO memory.

Upon completion of the processing for the audio transport frame to its tail, the data extracting unit 11 checks whether the received audio transport frame has an error or not, using the frame serial number described in the portion of the management data 102 of the audio transport frame, the FCS 105, the size of the audio transport frame, and the like (S65). It is only necessary for this check to judge whether the audio transport frame whose reception has been completed is normal or not, unlike the case of Step S42 in FIG. 19 and FIG. 23. Based on the judgment result, the slave node determines whether or not the slave node utilizes various kinds of data read from the audio transport frame. The function of the judging device in the slave node (the node other than the master node) corresponds to such processing in Step S65'.

If there is an error (S66), it is conceivable that the waveform data described in the audio transport frame received this time is not normal waveform data, and therefore the data extracting unit 11 notifies the control circuit 41 that the waveform data in the audio transport frame is not normal. In response to that, the control circuit 41 overwrites the sample in the current period written at Step S63 with the data attenuated by multiplying the sample in the preceding period by a predetermined attenuation rate for all the FIFO memories in the waveform inputting FIFO 12 (S68) and ends the processing in FIG. 28.

When there is no error at Step S66, the data extracting unit 11 judges the value of the error flag ER in the audio transport frame received this time. If this is not "0" (S67), it is conceivable that the audio transport frame received this time has been generated using the model, and therefore the data extracting unit 11 notifies the control circuit 41 that the audio transport frame is generated using the model. In response to that, the control circuit 41 overwrites the sample in the current period written at Step S63 with the data attenuated by multiplying the sample in the preceding period by a predetermined attenuation rate for the FIFO memory in which the waveform data of the channel into which writing has not been performed from the master node to the own node has been written, in the waveform inputting FIFO 12 (S69) and ends the processing in FIG. 28.

Note that each node can detect whether or not waveform data in each of the channels in the audio transport frame is written by any node, on the way that the frame passes through from the master node to the own node, by referring the topology table to check whether a node which writes the waveform data into the channel is located at the upper stream of the node or the lower stream of the node in the network system. Alternatively, when the audio transport frame is generated based on the model frame (FIG. 23), each node can detect that by checking whether the contents of the waveform data written in the channel is same as the model frame (for example, all byte is &HFF). In this case, "1" of the error flag ER and the data of the model are abnormality notification data.

If the error flag ER is "0" at Step S67, the waveform data written at Step S63 is conceivable to be all normal, the data extracting unit 11 ends the processing without performing anything.

In the above processing, the control circuit 41 functions as a supplementing device in the processing at Steps S68 and S69.

Even when the audio transport frame could not be normally received or the data of the model is left in the audio transport frame, the occurrence of noise caused by them can be prevented by performing the above processing. Note that the reason why the sample in the preceding period is attenuated at Steps S68 and S69 is to prevent the possibility that a direct current, which is produced when reproducing a flat waveform which is generated by overwriting with the sample in the preceding period, can damage the speaker, amplifier or the like. Further, low cut filter which cuts direct current can be also adapted instead of above described attenuation.

4. Adjustment of Timing of Wordclock

As has been described, in the audio network system 1, the master node generates the wordclock, and the timing of transmitting the audio transport frame is defined according to the wordclock. The slave node generates a wordclock using the reception timing of the audio transport frame as a reference to obtain the wordclock in the same period as that of the master node.

With such a method, however, the wordclock obtained for each node is different in phase, and if the configuration of the audio network system 1 is changed because of addition of a node, break of a cascade connection or the like, the reception timing of the audio transport frame deviates in each node, thereby fluctuating the wordclock.

Hence, in the audio network system 1, the wordclocks in the nodes are aligned in phase, and a function is provided for adjusting the timing of the wordclock to prevent the clock from fluctuating even when the system configuration is changed.

Figure 29:
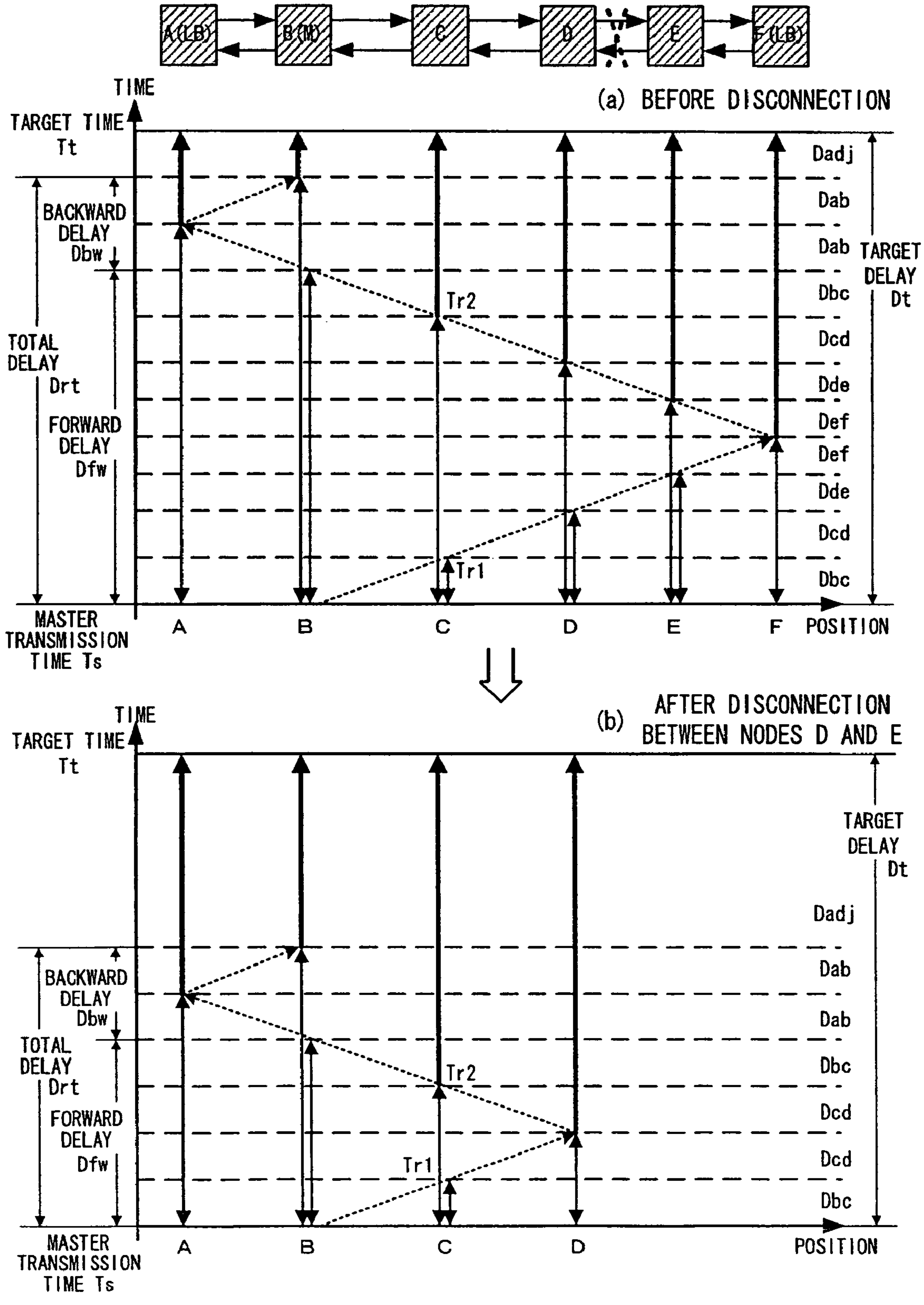
FIG. 29 is a chart showing an arrival timing of the head of the audio transport frame in each of nodes constituting the audio network system.

FIG. 29 shows an arrival timing of the head of the audio transport frame in each of nodes constituting the audio network system. (a) shows an example in which the audio network system is composed of six nodes A to F, and the node B of them is the master node, and (b) shows an example in which a disconnection of wire occurred between the node D and the node E of them so that the system configuration is changed to the audio network system composed of four nodes A to D.

What is shown by a broken line with an arrow in this drawing is the arrival timing of the audio transport frame and, as can be seen from this chart, the audio transport frame passes through each node, other than two nodes at both ends, twice with a time difference therebetween. In another sense, it is possible to say that the audio transport frame also passes through each of the nodes at both ends twice with a time difference of (substantially) zero therebetween. It is assumed that the time when the slave node receives the audio transport frame for the first time of them is a first reception time Tr1, and the time when the slave node receives the audio transport frame for the second time is a second reception time Tr2. For the nodes at both ends, it can be considered that Tr1=Tr2.

In this chart, D represents time required for transport of the audio transport frame between nodes, for example, Dab indicates time required between the node A and the node B, and Dbc indicates time required between the node B and the node C. This transport time is the same in the case of transporting in either direction.

A forward delay Dfw is time period between the timing when the master node transmits from the front side of the node the audio transport frame at a transmission time Ts and the timing when the audio transport frame returns to the master node for the first time. A backward delay Dbw is time period between the timing when the audio transport frame returns to the master node for the first time and is transmitted from the rear side of the node and the timing when the audio transport frame returns to the master node for the second time. Accordingly, Dfw+Dbw is a total delay Drt required for the audio transport frame to circulate once through the transmission route. Note that if the master node is located at an end of the audio network system 1, one of Dfw and Dbw (the delay on the side on which no node is connected) may be zero.

In the audio network system 1, the timing of the wordclock to be used for signal processing is adjusted to a target time Tt in all nodes by conducting control according to the target delay Dt on the assumption that the transport of the audio transport frame as described above is performed.

Such timing adjustment of the wordclock is performed by the wordclock generating unit 42 in the network I/F card 215.

Figure 30:
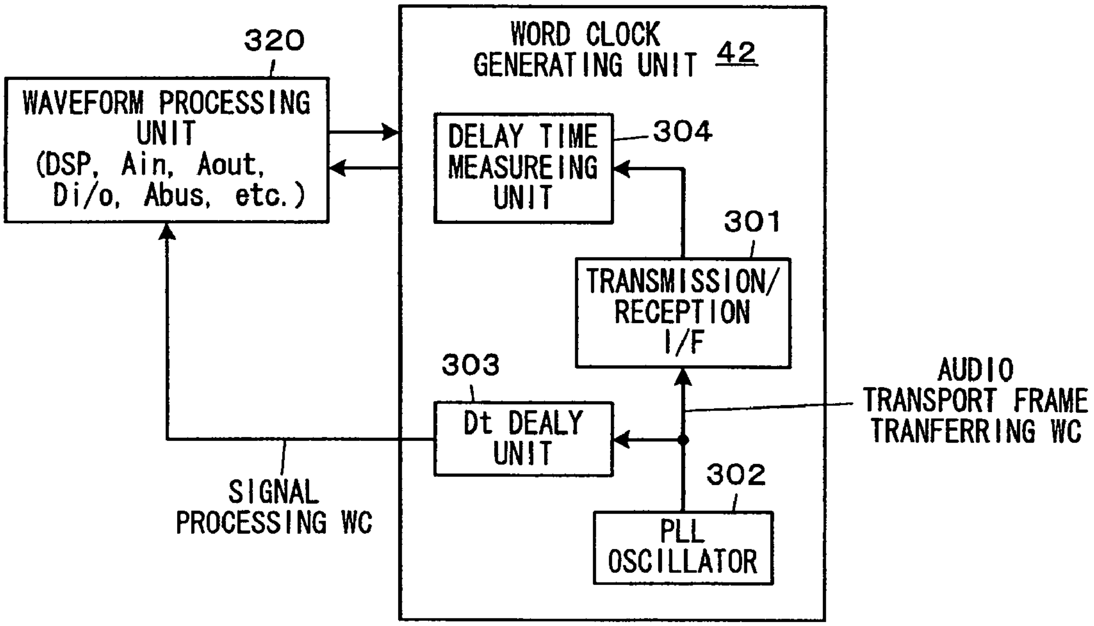
FIG. 30 is a diagram showing a configuration of a word-clock generating unit in the master node.
Figure 31:
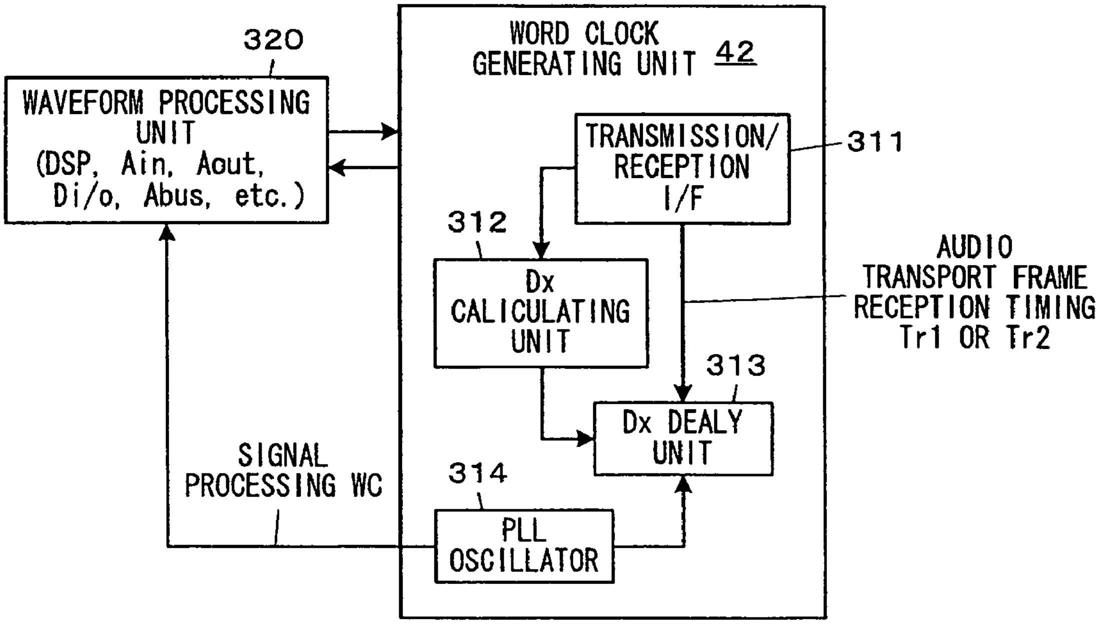
FIG. 31 is a diagram showing a configuration of a word-clock generating unit in the slave node.

FIG. 30 and FIG. 31 show configurations of the wordclock generating unit 42. FIG. 30 shows a configuration in the maser node, and FIG. 31 is a configuration in the slave node.

As shown in FIG. 30, in the master node, a PLL (Phase Locked Loop) oscillator 302 generates an audio transport frame transferring wordclock (WC), for controlling the transmission of the audio transport frame, at the same frequency as the sampling frequency of the waveform data based on the reference timing of the audio bus 217, and supplies it, as a signal indicating a transmission time Ts, to the transmission I/F which first transmits the audio transport frame in each sampling period in a transmission/reception I/F 301. The transmission/reception I/F 301 is collectively showing the first and second transmission and reception I/Fs 31 to 34 shown in FIG. 6.

A waveform processing unit 320 shows the signal processing units in the other cards connected to the audio bus 217, and the signal processing WC supplied to the waveform processing unit 320, wherein the plurality of cards including the network I/F card 215 in the node commonly use the signal processing WC as a sampling clock to process the waveform data.

A Dt delay unit 303 (a timing adjusting device) in the drawing here shows that there is a timing difference corresponding to the target delay Dt shown in Formula 1 between the audio transport frame transferring WC and the signal processing WC. The target delay Dt is set in advance prior to the switching of the system to the audio transport mode, and reported from the master node to all of the nodes in the system. This report can be performed, for example, by transmitting (broadcasting) a parameter setting frame indicating the setting of the target delay Dt or describing it into the IP packet region of the audio transport frame.

$$\text{Target Delay } Dt = \text{Target Time } Tt - \text{Master Transmission Time } Ts \quad \text{Formula 1}$$

The wordclock generating unit 42 in the master node generates the signal processing WC based on the reference timing of the audio bus 217 and delays the signal processing WC by (sampling period−target delay Dt), thereby generating the audio transport frame transferring WC at the timing preceding by the target delay Dt (note that the sampling period is an inverse of the sampling frequency).

The delay time measuring unit 304 is a first timer that measures the forward delay Dfw and the backward delay Dbw based on the transmission/reception timing of the audio transport frame in the transmission/reception I/F 301. The information of the delay time is written into the network configuration data region of the audio transport frame in each sampling period and notified to the other nodes in the system.

As has been described using FIG. 18, the master node generates the (S+2)-th audio transport frame based on the received S-th audio transport frame. However, the delay time of the (S+1)-th audio transport frame is available before start of transmission of the (S+2)-th audio transport frame by the measuring it with reference to the head of the audio transport frame, so the information of the (S+1)-th delay time is preferably written into the (S+2)-th audio transport frame during waiting for transmission and then transmitted. This allows the information of the delay time to be quickly reported to the slave node, thereby reducing the fluctuation in wordclock.

Next, as shown in FIG. 31, in the slave node, the signal processing WC is generated by a PLL oscillator 314, wherein the timing signal generated by the transmission/reception I/F 311, at the timing when the transmission/reception I/F 311 receives the head of the audio transport frame, is supplied to the PLL oscillator 314 to synchronize and stabilize the period of the signal processing WC. In this event, a Dx delay unit 313 delays the reception timing signal by the amount corresponding to the information of the delay time described in the frame, so that even if the reception timing of the audio transport frame in the slave node changes because the number of the nodes in the audio network system increases/decreases, the timing (target time Tt) of supplying the timing signal to the PLL oscillator 314 never changes. This Dx delay unit 313 functions as the timing adjusting device.

The delay amount Dx in this event can be obtained in a Dx calculating unit 312 by measuring the two reception times Tr1 and Tr2 while the audio transport frame circulates once through the transmission route, and calculating Formula 2 or Formula 3 using the reception times Tr1 and Tr2, the forward delay Dfw and the backward delay Dbw read from the audio transport frame, and an adjustment delay Dadj which has been calculated based on the target delay Dt notified from the master node in advance. The adjustment delay Dadj can be found from Formula 4. This Dx calculating unit 312 has a function of a second timer.

Calculation expression for the delay Dx in a forward side node $$Dx = Dbw + (Dfw - (Tr2 - Tr1))/2 + Dadj \ldots \text{ Delay from } Tr2$$

$$Dx = Dbw + (Dfw + (Tr2 - Tr1))/2 + Dadj \ldots \text{ Delay from } Tr1 \quad \text{Formula 2}$$

Calculation expression for the delay Dx in a backward side node $$Dx = (Dbw - (Tr2 - Tr1))/2 + Dadj \ldots \text{ Delay from } Tr2$$

$$Dx = (Dbw + (Tr2 - Tr1))/2 + Dadj \ldots \text{ Delay from } Tr1 \quad \text{Formula 3}$$

$$\text{Total Delay } Drt = \text{Forward Delay } Dfw + \text{Backward Delay } Dbw$$

$$\text{Adjustment Delay } Dadj = \text{Target Delay } Dt - \text{Total Delay } Drt \quad \text{Formula 4}$$

Note that the forward side node in Formula 2 and Formula 3 is a node through which the audio transport frame passes after it has been transmitted from the master node until it returns to the master node for the first time, and the backward node is a node through which the audio transport frame passes thereafter until it returns to the master node for the second time. The timing signal generated at time Tr1 or the timing signal generated at time Tr2 by the transmission/reception I/F 311 is supplied to the Dx delay unit 313 to delay the timing signal, and the case using the latter will be described hereinafter.

Figure 32:
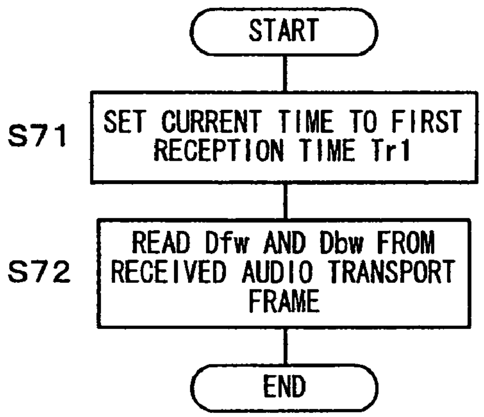
FIG. 32 is a flowchart of processing executed by a Dx calculating unit shown in FIG. 31 using the first-time reception event of the audio transport frame as a trigger.
Figure 33:
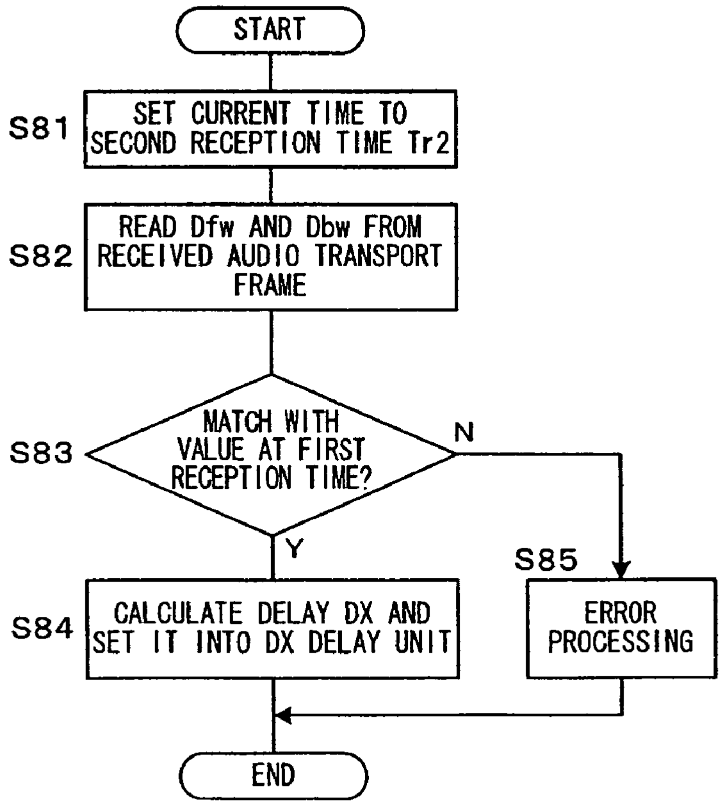
FIG. 33 is a flowchart of processing executed by the Dx calculating unit shown in FIG. 31 using the second-time reception event of the audio transport frame as a trigger.

FIG. 32 and FIG. 33 show flowcharts of processing executed by the Dx calculating unit 312.

FIG. 32 is the processing executed using a first-time reception event of the audio transport frame as a trigger, and in this case, the Dx calculating unit 312 sets the current time to the first reception time Tr1 (S71), and reads Dfw and Dbw from the received audio transport frame (S72) and ends the processing.

FIG. 33 is the processing executed using a second-time reception event of the audio transport frame as a trigger, and the timing signal is supplied to the Dx delay unit 313 at the same timing as the processing is triggered. In this processing, the Dx calculating unit 312 first sets the current time to the second reception time Tr2 (S81), and reads Dfw and Dbw from the received audio transport frame (S82). If that value matches with the value read at Step S72 (S83), the Dx calculating unit 312 calculates the delay amount Dx using the upper expression of Formula 2 or Formula 3 and sets it into the Dx delay unit 313 (S84), and ends the processing. If there is not a match at Step S83, the Dx calculating unit 312 performs the error processing (S85) and ends the processing.

These kinds of processing may be performed by the control circuit 41.

Note that the timing signal supplied to the Dx delay unit 313 is delayed by the set delay amount Dx, and supplied from the Dx delay unit 313 to the PLL oscillator 314 at the timing of time Tt. The PLL oscillator 314 uses the timing signal supplied from the Dx delay unit 313 in each sampling period as a reference signal to generate the signal processing word-clock (WC) that is substantially the same in frequency, more stabilized, and substantially the same in phase as those of the timing signal.

Thus, the signal processing WC is generated at substantially the same timing as the target time Tt in both of the master node and the slave node. As has been described above, since the network I/F card 215 is the master of the audio bus 217 in the slave node, other cards in the card I/O generate the wordclocks in synchronization with the signal processing wordclock, respectively.

The above-described timing adjustment is similarly performed also in the case where the configuration of the system changes due to removal or addition of a node during execution of signal processing. In this case, the individual values of Dfw, Dbw, Tr1, and Tr2 vary according to the configuration of the system, but if there is no fluctuation in the wordclock generated by the master node and the target delay Dt is constant, the value of the delay time Dx is adjusted in each slave node using the measured values at that time, whereby the wordclock at the timing made by delaying the audio transport frame transferring WC of the master node by Dt can be accurately obtained in all nodes. Accordingly, even if Dfw, Dbw, Tr1, and Tr2 are vary greatly, the fluctuation of the wordclock can be suppressed and the phases of wordclocks in the nodes can be adjusted to each other.

To normally operate the system, the target delay Dt should be larger than the total delay Drt at all times. For example, when the system can operate with the periodic update value k of "2", the total delay Drt is about one sampling period or less even if it changes, so the target delay Dt is preferably set to be slightly larger than that value (one sampling period).

If the target delay Dt is set to exactly one period of the wordclock, the signal before delay by the Dt delay unit 303 and the signal after delay are same in phase in the master node, so that even if the delay is not performed, the signal substantially the same as in the case where the delay is performed can be supplied to the waveform processing unit 320. Accordingly, the Dt delay unit 303 can be omitted in this case.

Although the transmission/reception timing is measured using the head of the audio transport frame as a reference here, another position of the audio transport frame may be used as the reference. However, it is preferable to use the head as a reference because its position is clearer and the processing can be simplified.

In the case where the Dx delay unit 313 is supplied with the timing signal generated at the timing of the first-time reception event of the audio transport frame, that is, time Tr1, the lower expression in Formula 2 or Formula 3 is used to calculate the delay amount Dx at Step S84.

5. Modifications

The explanation of the embodiments comes to an end, and it is of course that the configuration of processor, the configuration of data, concrete processing contents, and the so on are not limited to those in the above-described embodiments.

For example, there is no function provided in the above-described embodiments for repairing the audio transport frame before the frame returns to the master node, even if the audio transport frame circulating along the transmission route in the audio network system 1 is broken at any point along the transmission route. Accordingly, the audio transport frame broken on the transmission route will return to the master node in the broken state.

Also in this case, an error is detected in the FCS of the received frame in the nodes behind the point where the audio transport frame is broken, according to which the past value of the waveform data is used as the readout value as shown at Step S68 in FIG. 28, whereby occurrence of noise can be prevented. However, since the accuracy of the data cannot be ensured in the nodes behind the point where the audio transport frame is broken, the waveform data written therein is not utilized, and the communication between nodes using the management data 102 and the control data 104 cannot be performed. Thus, the audio transport frame is merely transported behind the point where the audio transport frame is broken.

To improve the above point, it is conceivable to provide a function for repairing the broken frame. For example, it is conceivable that the node which has received the broken frame repairs the FCS and then transmits the frame, in place of transmitting the broken frame to the next node. The accuracy of the waveform data 103 cannot be ensured in the repaired frame, but the management data 102 and the control data 104 written after the repair can be transported to the downstream nodes and utilized for communication between the nodes.

More specifically, if the function for repairing the broken frame is provided in each node, it is only necessary to add the following modification to the above described embodiments.

First of all, each node needs to be able to judge whether the received audio transport frame is one that has been once broken and then repaired during transport or that has not been broken. Hence, an error repair flag RP for judging the break is provided immediately before the FCS (in the network configuration data of the control data 104 shown in FIG. 2) in the audio transport frame. When the value of the RP is "0 (not repaired)," each node recognizes that there has been no break in the received audio transport frame during transport, whereas when the value of the RP is "1 (repaired)," each node recognizes that the received audio transport frame is one that has been once broken and then repaired and that even if no error is detected in the FCS, the waveform data in the frame is broken.

The master node refers to the above-described error repair flag RP in the processing of generating a new audio transport flame shown in FIG. 22 or FIG. 25. That is, in the processing at Step S42 in FIG. 22, when the value of the RP is "1" in addition to the case in which there is an error, the processing also proceeds to Step S45, and the master node generates a new audio transport frame based on the latest audio transport frame that has not been repaired in the node on the transmission route and has been normally received. Alternatively, in the processing at Step SA in FIG. 25, when the value of the RP is "1" in addition to the case in which there is an error, the processing also proceeds to Step SC, and the master node, generates to generate a new audio transport frame based on the model for recovery. This is because the waveform data written in the received frame is broken (the reliability cannot be ensured) also when the value of the RP is "1". In addition, the value of the error repair flag RP is reset to "0" at Step S49 in both cases.

Besides, when there is an error in the received audio transport frame, the slave node sets the error repair flag RP with a value "1" and repairs the FCS to the right value when writing data into the received frame, and then transmits the audio transport frame from an appropriate transmission I/F. Writing into the regions of the management data 102 and the control data 104 is similarly performed irrespective of existence of an error. It is not necessary to write the waveform data into the audio transport frame when there is an error.

Performing the above repair allows the audio transport frame in which an error has occurred at any point to be repaired instantly in the subsequent node, though the reliability of the waveform data is not ensured. Accordingly, communication using the management data 102 and the control data 104 can be performed utilizing the audio transport frame.

On the other hand, the slave node refers to the value of the error repair flag RP when reading out data from the received audio transport frame. That is, in the processing in FIG. 28 for reading out the waveform data from the received audio transport frame, when the value of the RP is "1" in addition to the case in which there is an error at Step S66, the processing also proceeds to Step S68, and the slave node writes a sample made by attenuating the sample in the preceding period by a predetermined attenuation rate over the sample read out from the audio transport frame and written into the waveform input FIFO. Since the audio transport frame which has been repaired is judged as having no error but the reliability of waveform data in the frame is not ensured, the processing similar to that in the case of error is performed. On the other hand, when there is no error and the value of the RP is "0," the processing according to the value of the error flag ER is performed at Steps S67 and S69 as shown in FIG. 28.

When there is an error in the received audio transport frame, all of the management data 102 and the control data 104 read out from the received audio transport frame are discarded as described in the explanation for FIG. 26. However, in the case where there is no error in the frame, it is conceivable that the portion written by the upstream node after repair is normal even if the value of the RP is "1", the portion written after repair is normally read out to be used for processing.

With the above arrangement, even if the audio transport frame is broken at any point on the transmission route, the nodes behind the point can perform communication using the regions of the management data 102 and the control data 104 of the broken (and then repaired) frame. Further, the effect of preventing noise by avoiding use of the waveform data 103 for signal processing that becomes impossible to ensure the accuracy because of break of the frame can be achieved as in the case of the above-described embodiments.

Note that when the value of the error repair flag RP is "1," it is conceivable that the master node writes the contents of the management data 102 and the control data 104 written in the received audio transport frame into the new audio transport frame generated using the model or the like. With this arrangement, the contents of the management data 102 and the control data 104 written by the nodes behind the point where the audio transport frame has been repaired can be written in the new audio transport frame and transmitted to the nodes on the transmission route the master node.

As another modification, if the master node is performing the processing shown in FIGS. 19, 21 and 22 as the processing of generating the next audio transport frame, it is also conceivable that the slave node ends the processing at all times without branching at Step S67 in FIG. 28. This is because, in this case, even if an error occurs in the transmission of the frame and the master node therefore generates the next audio transport frame based on the old audio transport frame, the value written in a specific frame is continuously remained into the region of the waveform data 103 (see FIGS. 19, 21 and 22). Accordingly, even if the waveform data 103 having the value is read out as it is, a flat waveform is merely obtained, thus rarely causing noise.

It should be noted that when the processing shown in FIGS. 23 to 25 using the model is being performed, branching at Step S67 in FIG. 28 is necessary.

Further, as another modification, it is not essential to circulate one audio transport frame in one sampling period, but it is also conceivable to circulate a plurality of audio transport frames in one sampling period, or to circulate one audio transport frame in a plurality of sampling periods (constant time length) into which, for each channel, plural samples of waveform data corresponding to the plurality of sampling periods are written.

Although the explanation has been made such that the master node and the slave node are different in function in the above-described embodiments, what processor becomes the master node is often unknown until the audio network system is actually constituted. Hence, each processor is preferably configured to be able to function selectively as the maser node or as the slave node so that, at the stage when the detection of nodes connected to the audio network is completed and the master node is determined to construct the audio network system, the processor activates an appropriate function of them depending on whether or not the processor itself becomes the master node. Even in the case employing such measures, the function of the master node may not be provided in the processor that is not expected to become the master node because its master priority is 0 or the like.

It is of course possible to change the ratio of the waveform data to the control data in the audio transport frame. The size of either region could be reduced to 0.

In addition to the above, the periodic update value k is a variable value in the above-described embodiments, and may also be a fixed value. In this case, the upper-limit time corresponding to the periodic update value k is also a fixed value, and the number of nodes which can be added to the system is limited by that upper-limit time.

The various kinds of frames including the audio transport frame are not limited to the IEEE 802.3 format but may be in any format.

Although the sampling frequency is 96 kHz in the above-described embodiments, the system can be designed with any frequency such as 88.2 kHz, 192 kHz, or the like. The system may be designed such that the sampling frequency can be switched.

Although the selectors 35-38 select the loopback route in the audio signal processor 2 when the node is not incorporated into the audio network system 1 yet in the above-described embodiments, the setting of the selectors are not necessarily done in the processor not yet been incorporated in the transmission route. The setting of the selectors for the loopback can be performed at any time before the processor is incorporated in the transmission route for the audio transport frame.

When newly detecting a processor in the audio network, the newly detected processor is automatically incorporated into the audio network system, without any instruction from the user, in the above-described embodiments, instead that, a dialog box for confirmation such as "A new processor is detected. Incorporate into the system?" or the like may be displayed first on a display device when the presence of the processor is newly detected, and then the processor may be incorporated in response to the user's instruction, "incorporate" on the dialog box.

Although one node is automatically selected and set as the master node according to the mater priority of each of the nodes in the audio network in the above-described embodiments, one node designated by the user may be set as the master node.

These modifications and modifications described in the explanation of the embodiments are applicable in any combination in a range without contradiction. Inversely, it is not always necessary for the network system and the audio signal processor to have all of the features which have been described in the explanation of the embodiments.

As is clear from the above description, the network system and the audio signal processor of the invention makes it possible that, in the case where audio signals are transported among a plurality of processors, the transported waveform data are easily synchronized each other in the sampling period domain, while easily ensuring a transport bandwidth for the waveform data corresponding to a fixed number of channels in the network.

Accordingly, application of the invention can improve convenience of the network system.

What is claimed is:

1. A network system configured such that a plurality of nodes each comprising receivers and transmitters are connected in series by communication cables to form a loop transmission route along which an audio transport frame periodically circulates in a single direction, said audio transport frame generated by a master node in said plurality of nodes, said audio transport frame including a plurality of storage regions for audio signals, wherein each of said nodes other than said master node of said network system comprises:

a wordclock generator that generates a wordclock based on a reception timing of the audio transport frame received by said receiver, a signal processor that processes audio signals in synchronization with the wordclock generated by said wordclock generator;

a reader that reads out, when said receiver receives an audio transport frame, audio signals from a predetermined storage region of the audio transport frame, and supplies the audio signals to said signal processor, and/or a writer that writes audio signals in an S-th period supplied from said signal processor into a predetermined storage region of the audio transport frame in the S-th period received by said receiver; and a transmission controller that supplies the audio transport frame in the S-th period that has been read out by said reader and/or written by said writer to said transmitter after a lapse of a predetermined time from the reception of the audio transport frame by said receiver, and controls said transmitter to transmit the audio transport frame, wherein said master node comprises:

a buffer that stores the audio transport frame received by said receiver;

a wordclock generator that generates a wordclock at constant period;

a signal processor that processes audio signals in synchronization with the wordclock generated by said wordclock generator;

an audio transport frame generator that generates the audio transport frame in the S-th period based on the audio transport frame in an (S−k)-th period earlier than the S-th period by k period(s) (where k is an integer of 1 or more) stored in said buffer at said constant period;

a transmission controller that supplies the audio transport frame generated by said audio transport frame generator to said transmitter, and controls said transmitter to transmit the audio transport frame in synchronization with the wordclock; and a reader that reads out, when said receiver receives an audio transport frame in the (S−k)-th period, audio signals from a predetermined storage region of the audio transport frame or an audio transport frame in the S-th period generated by said audio transport frame generator based on the received audio transport frame, and supplies the audio signals to said signal processor, and/or a writer that writes audio signals in the S-th period supplied from said signal processor into a predetermined storage region of the audio transport frame in the (S−k)-th period or the audio transport frame in the S-th period; and wherein said reader of said each node delays, if the audio signals read out from the storage region of the audio transport frame in the S-th period received by said receiver are written by another node in the transmission route from said master node to the node, the audio signals by k period(s) and does not delay, if the audio signals read out are not written by another node in the transmission route, the audio signal before supplying the audio signal to said signal processor.

2. A network system according to claim 1, wherein said k is a fixed value.

3. A network system according to claim 1, wherein any of said nodes is provided with a setting device that sets the value of k common to said each node, and wherein the transmission delay of audio signals, from a timing one node writes the audio signals in the audio transport frame to a timing another node reads out the audio signals from the audio transport frame and supplies the audio signals to said processor in the node, becomes longer as said device sets the value of k larger.

4. The network system of claim 1 wherein one of said plurality of nodes is an audio signal processor, said audio signal processor comprising:

receivers and transmitters, wherein said audio signal processor comprises, as devices operating when at lest said audio signal processor functions as a processor other than said master node in said network system:

a signal processor that processes audio signals;

a reader that reads out, when said receiver receives an audio transport frame, audio signals from a predetermined storage region of the audio transport frame, and supplies the audio signals to said signal processor; and a transmission controller that supplies the audio transport frame in the S-th period from which reading-out by said reader has been performed, to said transmitter after a lapse of a predetermined time from the reception of the audio transport frame by said receiver, and controls said transmitter to transmit the audio transport frame, and wherein said reader of said each node delays, if the audio signals read out from the storage region of the audio transport frame in the S-th period received by said receiver are written by another node in the transmission route from said master node to the node, the audio signals by k period(s) and does not delay, if the audio signals read out are not written by another node in the transmission route, the audio signal before supplying the audio signal to said signal processor.

* * * * *